US012671738B2

(12) United States Patent
Xin et al.

(10) Patent No.: US 12,671,738 B2
(45) Date of Patent: Jun. 30, 2026

(54) COMMUNICATION METHOD, APPARATUS, AND SYSTEM FOR CREATING A USER PLANE FUNCTION (UPF) NETWORK ELEMENT FOR SERVING AN APPLICATION IN A LOCAL AREA

(71) Applicant: HUAWEI TECHNOLOGIES CO., LTD., Shenzhen (CN)

(72) Inventors: Yang Xin, Shanghai (CN); Xiaobo Wu, Shenzhen (CN); Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/974,998

(22) Filed: Oct. 27, 2022

(65) Prior Publication Data

US 2023/0037402 A1     Feb. 9, 2023

Related U.S. Application Data

(63) Continuation of application No. PCT/CN2021/075125, filed on Feb. 3, 2021.

(30) Foreign Application Priority Data

Apr. 30, 2020    (CN) .......................... 202010368218.8

(51) Int. Cl.
*H04L 67/141* (2022.01)
*H04L 41/14* (2022.01)
*H04L 41/5054* (2022.01)

(52) U.S. Cl.
CPC ............ *H04L 67/141* (2013.01); *H04L 41/14* (2013.01); *H04L 41/5054* (2013.01)

(58) Field of Classification Search
CPC ... H04L 67/141; H04L 41/14; H04L 41/5054; H04L 67/51; H04W 88/14; H04W 76/10; H04W 76/11
See application file for complete search history.

(56) References Cited

U.S. PATENT DOCUMENTS 11,224,093 B2 * 1/2022 Bharatia ............... H04W 80/10
11,363,103 B2 * 6/2022 Afzal .................... H04L 67/141
(Continued)

FOREIGN PATENT DOCUMENTS

CN    109889586 A    6/2019
CN    110019511 A    7/2019
(Continued)

OTHER PUBLICATIONS

3GPP, "Technical Specification Group Services and System Aspects", TR 23.502 V15.0.0, Dec. 2017 (Year: 2017).*
(Continued)

*Primary Examiner* — Ramy M Osman
(74) *Attorney, Agent, or Firm* — HAUPTMAN HAM, LLP

(57)    ABSTRACT

A communication method, apparatus, and system for improving service experience when a terminal accesses an application. A network management network element receives, from a data analytics network element, first information of an application accessed by a terminal within a first area. The first information includes a quantity of access times and/or service experience for the application. The network management network element determines, based on the first information, to create, within the first area, a first user plane function network element serving the application. The network management network element sends a first message to an application function network element. The first message indicates that the network management network element triggers creation, within the first area, of the (Continued)

first user plane function network element serving the application.

19 Claims, 25 Drawing Sheets

(56)  References Cited

U.S. PATENT DOCUMENTS

| | | | | |
|---|---|---|---|---|
| 2017/0289270 | A1* | 10/2017 | Li | ................. H04W 64/006 |
| 2017/0332282 | A1 | 11/2017 | Dao | |
| 2018/0324646 | A1* | 11/2018 | Lee | ............... H04W 36/0011 |
| 2020/0186462 | A1* | 6/2020 | D'Acunto | ............... H04L 67/14 |
| 2020/0259878 | A1* | 8/2020 | Yang | ................. H04L 65/765 |
| 2020/0287975 | A1* | 9/2020 | Li | ................. H04L 41/0893 |
| 2021/0051437 | A1* | 2/2021 | Mukherjee | ........... H04W 4/022 |
| 2021/0144630 | A1* | 5/2021 | Wang | ................. H04W 76/15 |
| 2021/0243826 | A1* | 8/2021 | Hoffmann | ............. H04W 76/14 |
| 2021/0258374 | A1* | 8/2021 | Wang | ................. H04L 67/1021 |
| 2022/0150816 | A1* | 5/2022 | Albasheir | ............. H04W 48/20 |
| 2022/0191763 | A1* | 6/2022 | Roeland | .......... H04W 36/00837 |
| 2022/0353746 | A1* | 11/2022 | Zhou | ................. H04L 65/80 |
| 2023/0007485 | A1* | 1/2023 | Maria | ................. H04W 88/16 |
| 2023/0008647 | A1* | 1/2023 | Yao | ................. H04W 76/10 |
| 2023/0037402 | A1* | 2/2023 | Xin | ................. H04L 67/51 |
| 2023/0091077 | A1* | 3/2023 | Yao | ................. H04W 76/12 |
| | | | | 455/456.1 |
| 2023/0106757 | A1* | 4/2023 | Tang | ................. H04W 40/246 |
| | | | | 370/252 |
| 2023/0180038 | A1* | 6/2023 | Chen | ................. H04L 41/14 |
| | | | | 370/252 |

FOREIGN PATENT DOCUMENTS

| | | | |
|---|---|---|---|
| CN | 110149657 | A | 8/2019 |
| CN | 110149675 | A | 8/2019 |
| CN | 110972193 | A | 4/2020 |
| CN | 110972200 | A | 4/2020 |
| WO | 2017219972 | A1 | 12/2017 |
| WO | 2019137142 | A1 | 7/2019 |
| WO | 2019228214 | A1 | 12/2019 |

OTHER PUBLICATIONS

PCT, "Translation of PCT Chapter I Preliminary Report", PCT/CN2021/075125, Feb. 3, 2021 (Year: 2021).*

European Patent Office, "European Search Opinion for Appliction No. 21797413.8", Sep. 28, 2023 (Year: 2023).*

Chinese Office Action issued in corresponding Chinese Application No. 202010368218.8, dated Apr. 26, 2023, 127 pages.

3GPP TS 28.531 V16.5.0 (Mar. 2020), 3rd Generation Partnership Project; Technical Specification Group Services and System Aspects; Management and orchestration; Provisioning; (Release 16), 71 pages.

3GPP TR 23.791 V16.0.0 (Dec. 2018), 3rd Generation Partnership Project; Technical Specification Group Services and System Aspects; Study of Enablers for Network Automation for 5G (Release 16), 121 pages.

3GPP TS 23.288 V16.3.0 (Mar. 2020), 3rd Generation Partnership Project; Technical Specification Group Services and System Aspects; Architecture enhancements for 5G System (5GS) to support network data analytics services (Release 16), 62 pages.

International Search Report issued in corresponding International Application No. PCT/CN2021/075125, dated Apr. 29, 2021, pp. 1-9.

Chinese Office Action issued in corresponding Chinese Application No. 202010368218.8, dated Dec. 20, 2022, pp. 1-6.

3GPP TS 23.502 V15.0.0 (Dec. 2017), 3rd Generation Partnership Project; Technical Specification Group Services and System Aspects; Procedures for the 5G System; Stage 2(Release 15), 258 pages.

Extended European Search Report issued in corresponding European Application No. 21797413.8, dated Sep. 28, 2023, pp. 1-9.

* cited by examiner

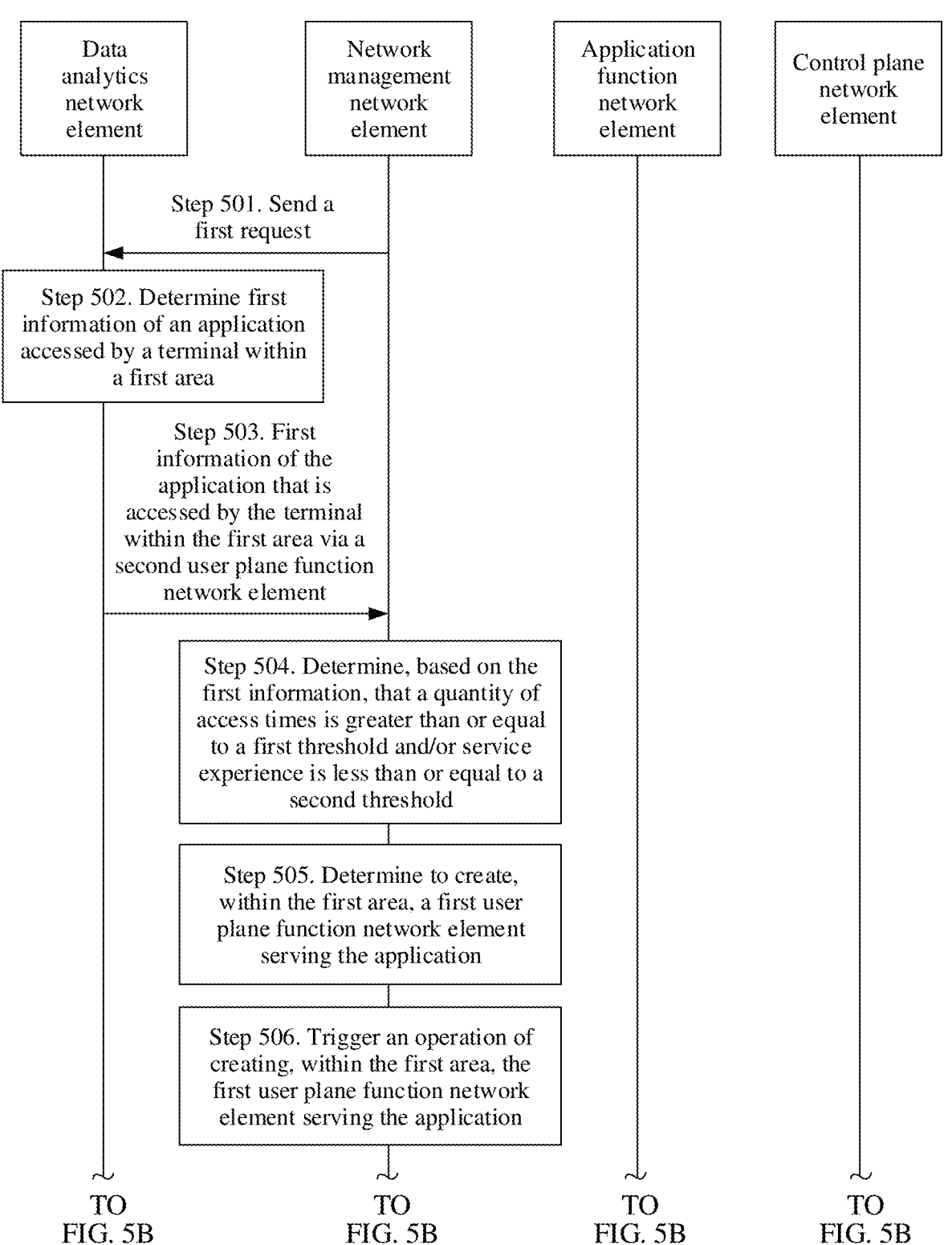

| Data analytics network element | Network management network element | Application function network element | Control plane network element |
|---|---|---|---|

Step 501. Send a first request

Step 502. Determine first information of an application accessed by a terminal within a first area Step 503. First information of the application that is accessed by the terminal within the first area via a second user plane function network element Step 504. Determine, based on the first information, that a quantity of access times is greater than or equal to a first threshold and/or service experience is less than or equal to a second threshold Step 505. Determine to create, within the first area, a first user plane function network element serving the application Step 506. Trigger an operation of creating, within the first area, the first user plane function network element serving the application

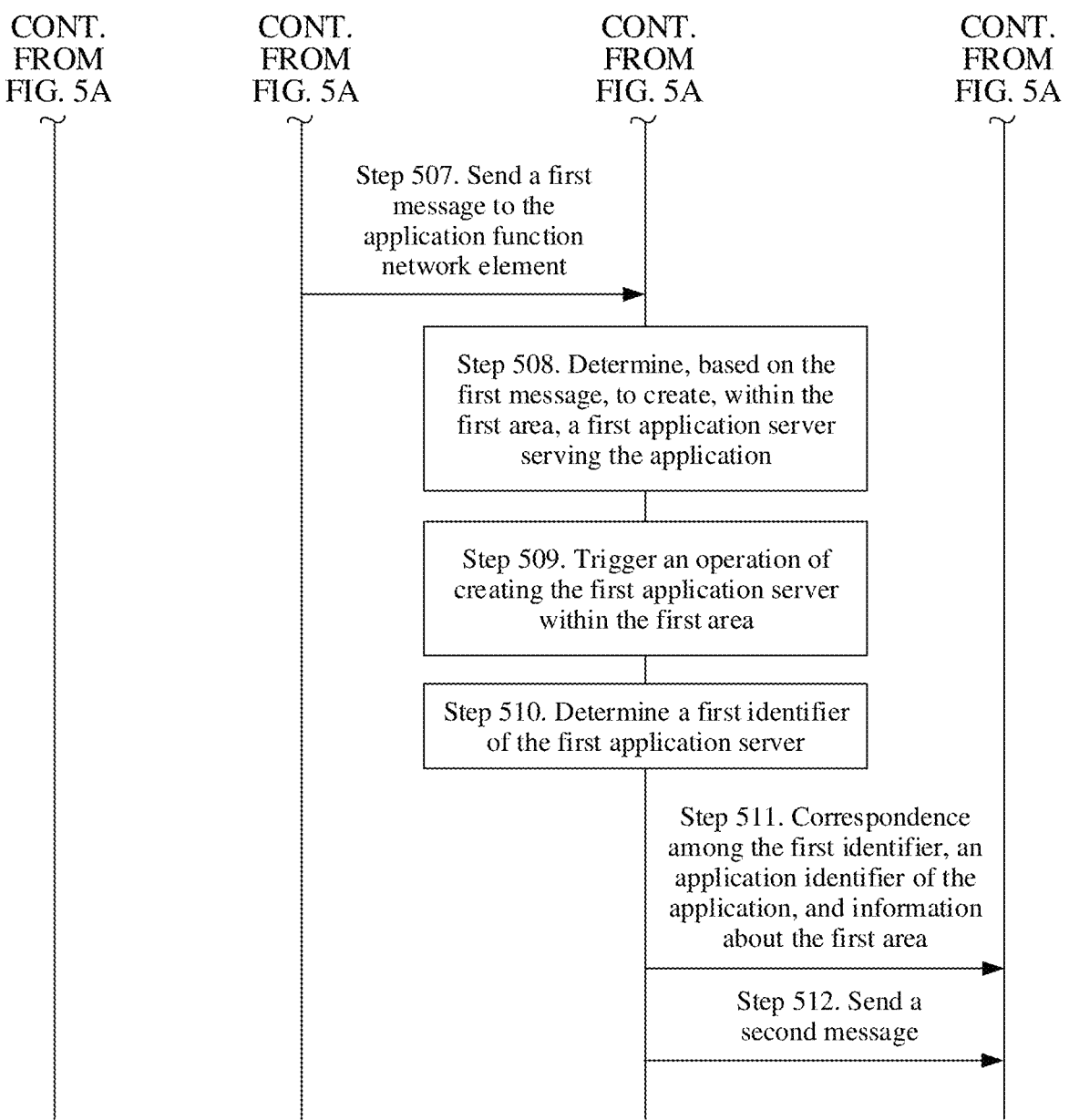

CONT.
FROM
FIG. 5A

CONT.
FROM
FIG. 5A

CONT.
FROM
FIG. 5A

CONT.
FROM
FIG. 5A

Step 507. Send a first
message to the
application function
network element

Step 508. Determine, based on the
first message, to create, within the
first area, a first application server
serving the application Step 509. Trigger an operation of
creating the first application server
within the first area Step 510. Determine a first identifier
of the first application server Step 511. Correspondence
among the first identifier, an
application identifier of the
application, and information
about the first area Step 512. Send a
second message

FIG. 5B

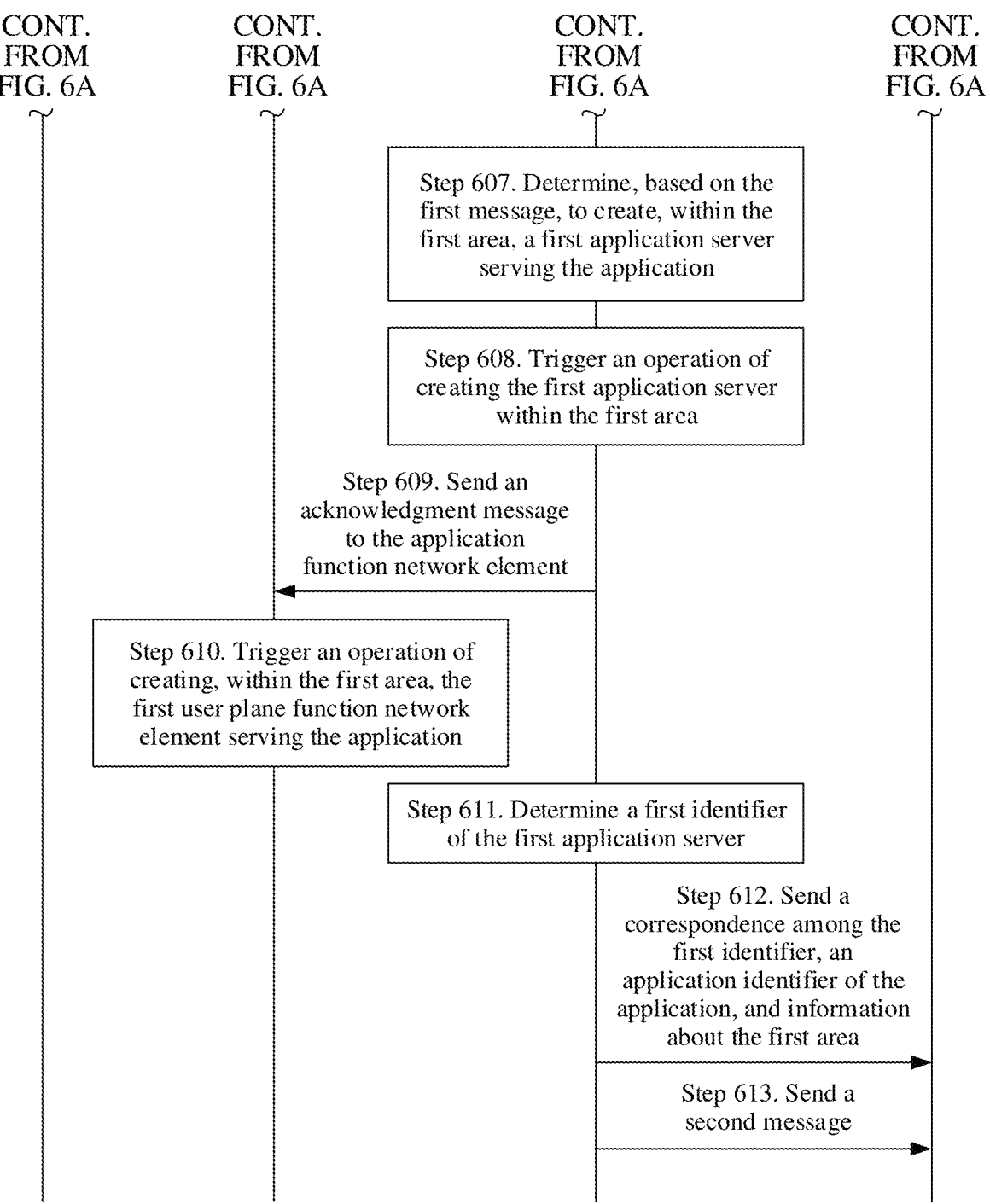

CONT.
FROM
FIG. 6A

CONT.
FROM
FIG. 6A

CONT.
FROM
FIG. 6A

CONT.
FROM
FIG. 6A

Step 607. Determine, based on the first message, to create, within the first area, a first application server serving the application Step 608. Trigger an operation of creating the first application server within the first area Step 609. Send an acknowledgment message to the application function network element Step 610. Trigger an operation of creating, within the first area, the first user plane function network element serving the application Step 611. Determine a first identifier of the first application server Step 612. Send a correspondence among the first identifier, an application identifier of the application, and information about the first area Step 613. Send a second message

FIG. 6B

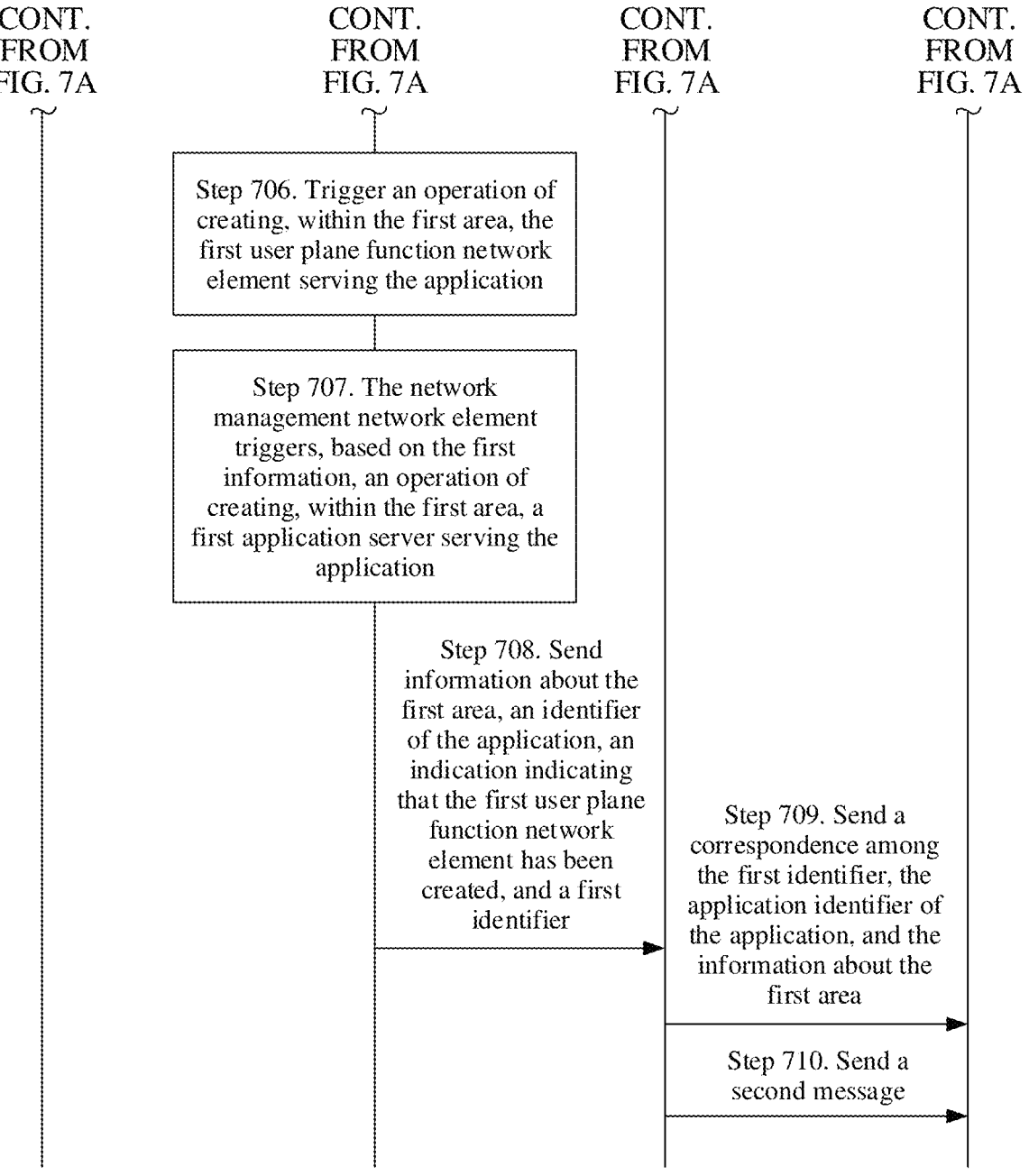

CONT.
FROM
FIG. 7A

CONT.
FROM
FIG. 7A

CONT.
FROM
FIG. 7A

CONT.
FROM
FIG. 7A

Step 706. Trigger an operation of creating, within the first area, the first user plane function network element serving the application Step 707. The network management network element triggers, based on the first information, an operation of creating, within the first area, a first application server serving the application Step 708. Send information about the first area, an identifier of the application, an indication indicating that the first user plane function network element has been created, and a first identifier Step 709. Send a correspondence among the first identifier, the application identifier of the application, and the information about the first area Step 710. Send a second message

FIG. 7B

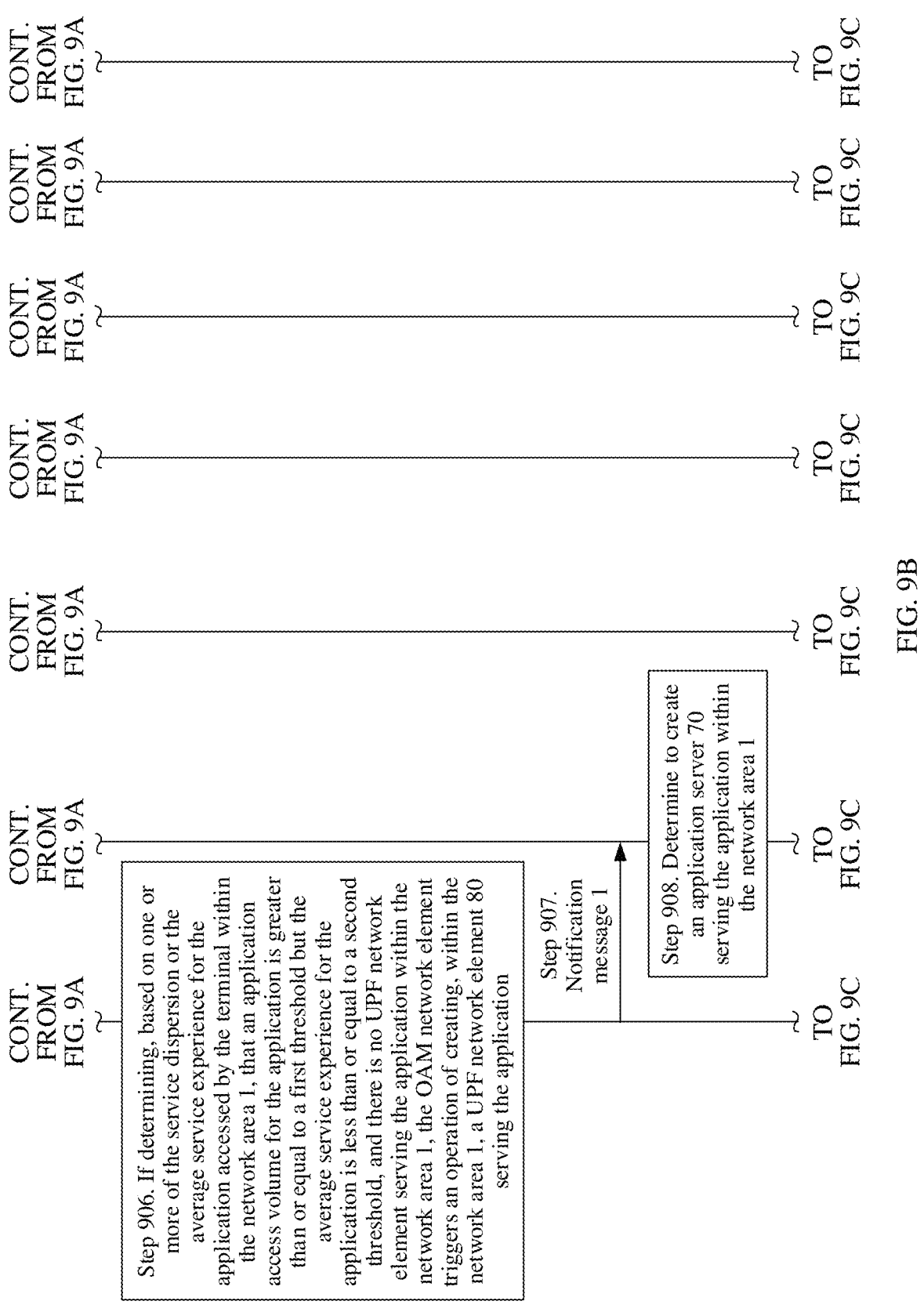

CONT. FROM FIG. 9A

CONT. FROM FIG. 9A

CONT. FROM FIG. 9A

CONT. FROM FIG. 9A

CONT. FROM FIG. 9A

CONT. FROM FIG. 9A

CONT. FROM FIG. 9A

Step 906. If determining, based on one or more of the service dispersion or the average service experience for the application accessed by the terminal within the network area 1, that an application access volume for the application is greater than or equal to a first threshold but the average service experience for the application is less than or equal to a second threshold, and there is no UPF network element serving the application within the network area 1, the OAM network element triggers an operation of creating, within the network area 1, a UPF network element 80 serving the application Step 907. Notification message 1

Step 908. Determine to create an application server 70 serving the application within the network area 1

FIG. 9B

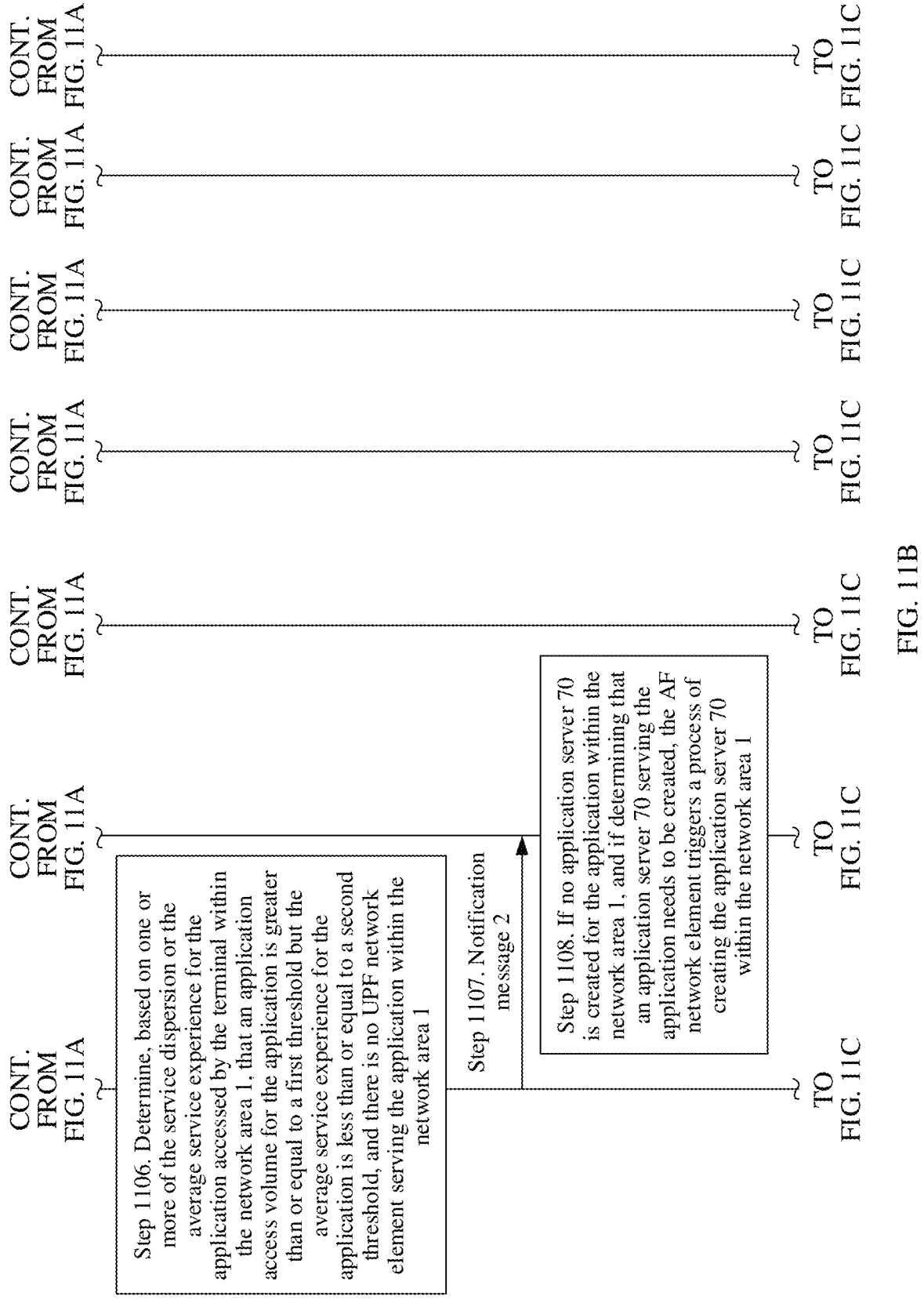

Step 1106. Determine, based on one or more of the service dispersion or the average service experience for the application accessed by the terminal within the network area 1, that an application access volume for the application is greater than or equal to a first threshold but the average service experience for the application is less than or equal to a second threshold, and there is no UPF network element serving the application within the network area 1

Step 1107. Notification message 2

Step 1108. If no application server 70 is created for the application within the network area 1, and if determining that an application server 70 serving the application needs to be created, the AF network element triggers a process of creating the application server 70 within the network area 1

FIG. 11B

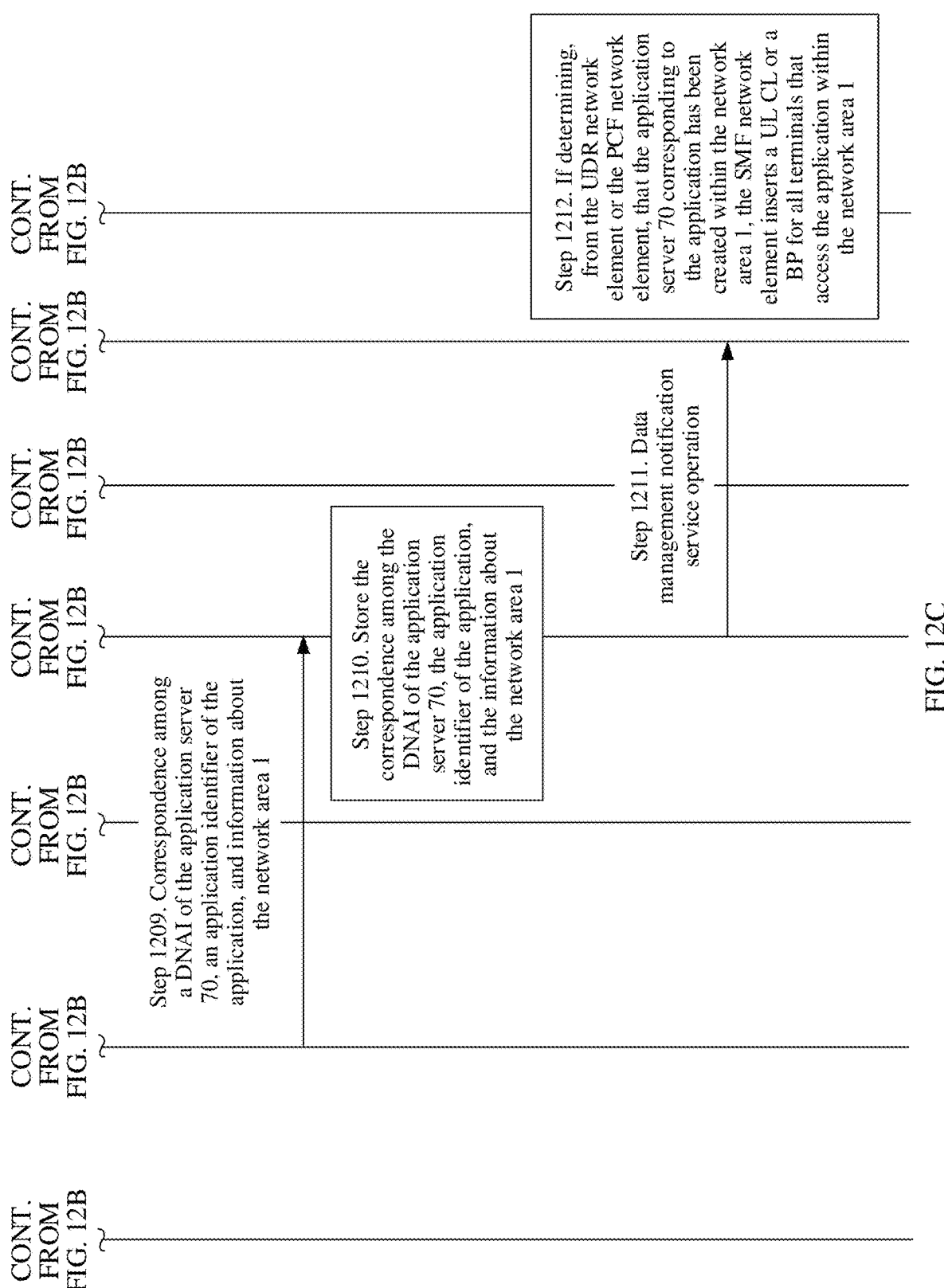

FIG. 12C

Step 1209. Correspondence among a DNAI of the application server 70, an application identifier of the application, and information about the network area 1

Step 1210. Store the correspondence among the DNAI of the application server 70, the application identifier of the application, and the information about the network area 1

Step 1211. Data management notification service operation

Step 1212. If determining, from the UDR network element or the PCF network element, that the application server 70 corresponding to the application has been created within the network area 1, the SMF network element inserts a UL CL or a BP for all terminals that access the application within the network area 1

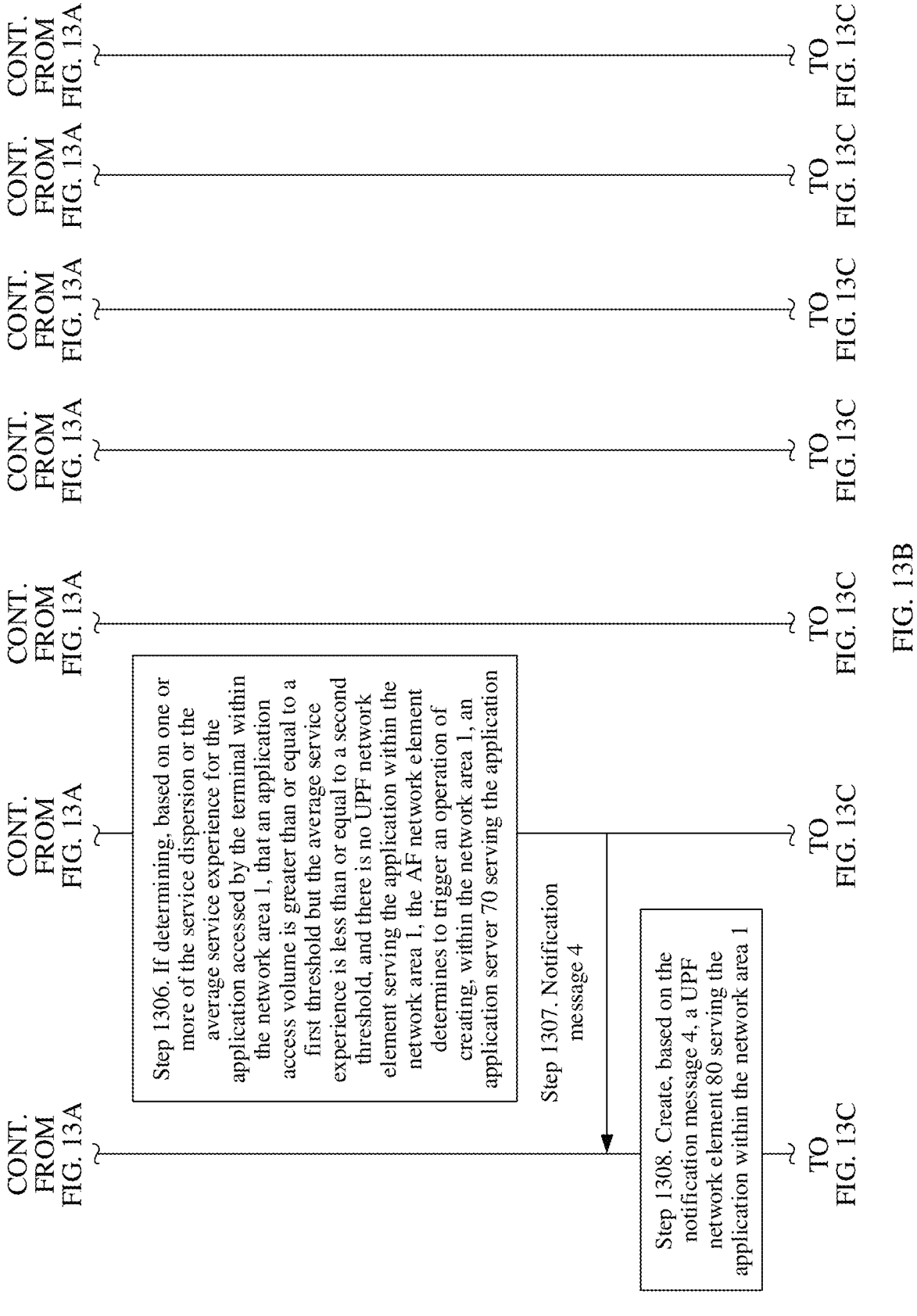

CONT. FROM FIG. 13A — TO FIG. 13C

CONT. FROM FIG. 13A — TO FIG. 13C FIG. 13C

CONT. FROM FIG. 13A — TO FIG. 13C

CONT. FROM FIG. 13A — TO FIG. 13C

CONT. FROM FIG. 13A — TO FIG. 13C

Step 1306. If determining, based on one or more of the service dispersion or the average service experience for the application accessed by the terminal within the network area 1, that an application access volume is greater than or equal to a first threshold but the average service experience is less than or equal to a second threshold, and there is no UPF network element serving the application within the network area 1, the AF network element determines to trigger an operation of creating, within the network area 1, an application server 70 serving the application

CONT. FROM FIG. 13A — TO FIG. 13C

Step 1307. Notification message 4

Step 1308. Create, based on the notification message 4, a UPF network element 80 serving the application within the network area 1

CONT. FROM FIG. 13A — TO FIG. 13C

FIG. 13B

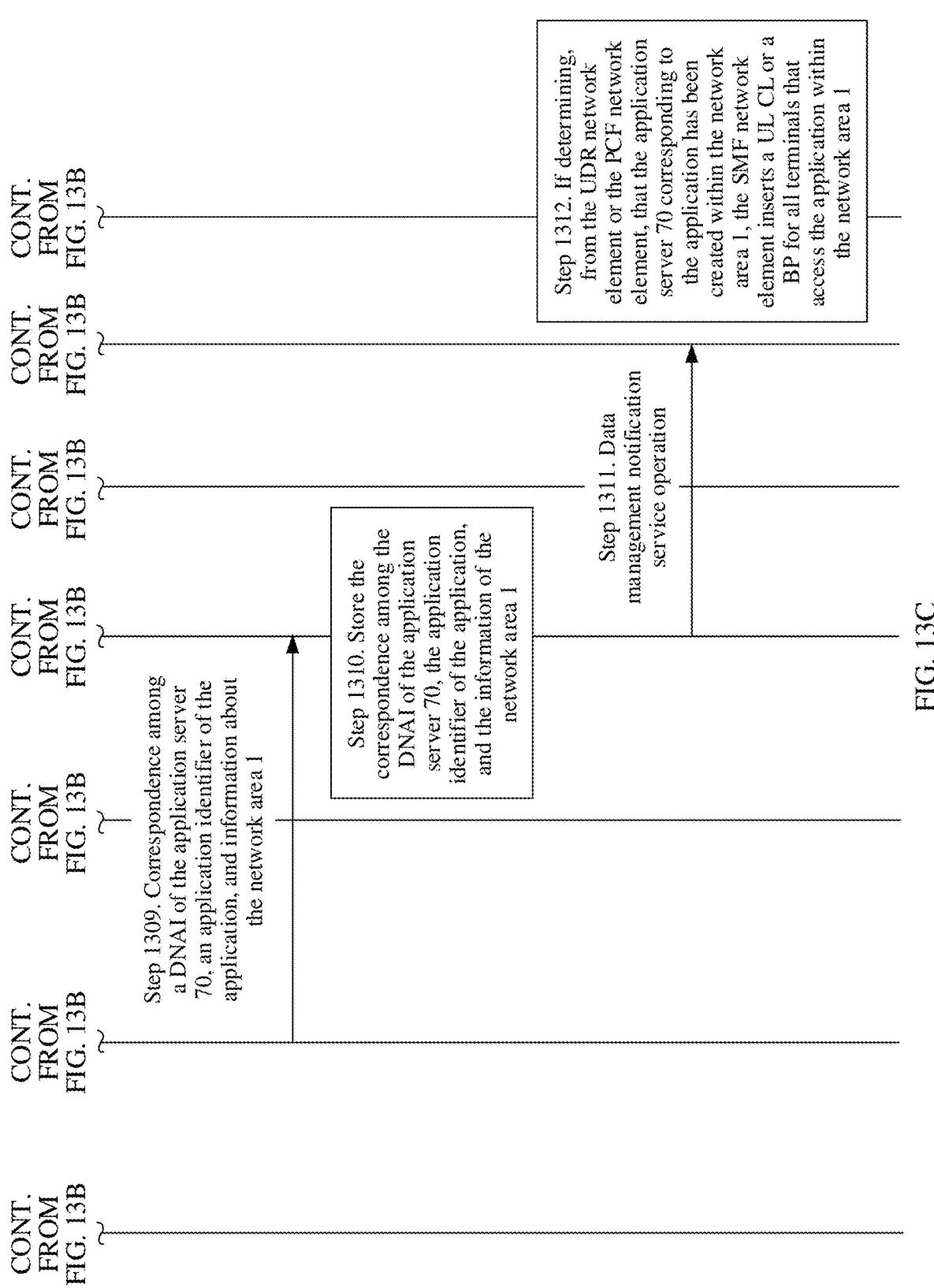

FIG. 13C

CONT. FROM FIG. 13B

CONT. FROM FIG. 13B

CONT. FROM FIG. 13B

CONT. FROM FIG. 13B

CONT. FROM FIG. 13B

CONT. FROM FIG. 13B

CONT. FROM FIG. 13B

Step 1309. Correspondence among a DNAI of the application server 70, an application identifier of the application, and information about the network area 1

Step 1310. Store the correspondence among the DNAI of the application server 70, the application identifier of the application, and the information of the network area 1

Step 1311. Data management notification service operation

Step 1312. If determining, from the UDR network element or the PCF network element, that the application server 70 corresponding to the application has been created within the network area 1, the SMF network element inserts a UL CL or a BP for all terminals that access the application within the network area 1

COMMUNICATION METHOD, APPARATUS, AND SYSTEM FOR CREATING A USER PLANE FUNCTION (UPF) NETWORK ELEMENT FOR SERVING AN APPLICATION IN A LOCAL AREA

CROSS-REFERENCE TO RELATED APPLICATIONS

This application is a continuation of International Application No. PCT/CN2021/075125, filed on Feb. 3, 2021, which claims priority to Chinese Patent Application No. 202010368218.8, filed on Apr. 30, 2020. The disclosures of the aforementioned applications are hereby incorporated by reference in their entireties.

TECHNICAL FIELD

Embodiments of this application relate to the field of data analytics technologies, and in particular, to a communication method, apparatus, and system.

BACKGROUND

In a process in which a terminal initially establishes a session, a session management function (SMF) network element does not know which application the terminal is to use in the future or where the terminal is to move in the future. Therefore, a user plane function (UPF) network element 1 located at a remote end may be selected for the terminal, so that the terminal accesses, via the UPF network element 1, a remote application server with rich applications, but a delay generated when the terminal accesses an application 1 (for example, virtual reality (VR) live broadcast) created on the remote application server is larger than a delay generated when the terminal accesses the application 1 created on a local application server. In this case, service experience may not be guaranteed.

SUMMARY

Embodiments of this application provide a communication method, apparatus, and system, to improve service experience when a terminal accesses an application.

To achieve the foregoing objective, embodiments of this application provide the following technical solutions.

According to a first aspect, an embodiment of this application provides a communication method, including: A network management network element receives, from a data analytics network element, first information of an application accessed by a terminal within a first area, where the first information includes a quantity of access times and/or service experience for the application; the network management network element determines, based on the first information, to create, within the first area, a first user plane function network element serving the application; and the network management network element sends a first message to an application function network element, where the first message indicates that the network management network element triggers creation, within the first area, of the first user plane function network element serving the application.

According to the communication method provided in this embodiment of this application, the network management network element determines, based on the first information that is from the data analytics network element and that is of the application accessed by the terminal within the first area, that the first user plane function network element serving the application needs to be created within the first area. Then, the network management network element sends the first message to the application function network element, where the first message indicates that the network management network element triggers creation, within the first area, of the first user plane function network element serving the application, so that the application function network element determines, based on the first message, to create, within the first area, a first application server serving the application. In this solution, the network management network element determines, based on the quantity of access times and/or the service experience for the application accessed by the terminal within the first area, to create, within the first area, the first user plane function network element serving the application. In this way, the first user plane function network element created within the first area can meet an application access requirement. In addition, based on triggering by the first message, the application function network element and the network management network element may collaboratively create the first user plane function network element and the first application server within the first area, so that a control plane network element subsequently offloads a service flow of the terminal to the first user plane function network element within the first area. In this way, the terminal accesses, within the first area via the first user plane function network element, the application created on the first application server, thereby laying a basis for service offloading, and improving service experience for accessing the application by the terminal.

In a possible implementation, before the network management network element sends the first message to the application function network element, the method provided in this embodiment of this application further includes: The network management network element triggers an operation of creating, within the first area, the first user plane function network element serving the application. In this way, before the application function network element triggers, based on the first message, creation, within the first area, of the first application server serving the application, the first user plane function network element serving the application has been created within the first area.

In a possible implementation, after the network management network element sends the first message to the application function network element, the method provided in this embodiment of this application further includes: The network management network element receives an acknowledgment message from the application function network element, where the acknowledgment message indicates that the network management network element is allowed to create, within the first area, the first user plane function network element serving the application, the acknowledgment message indicates that the network management network element is allowed to create, within the first area, the first application server serving the application, the acknowledgment message indicates that the network management network element is allowed to trigger the operation of creating, within the first area, the first user plane function network element serving the application, or the acknowledgment message indicates that the network management network element is allowed to trigger an operation of creating, within the first area, the first application server serving the application; and then the network management network element triggers the operation of creating the first user plane function network element within the first area. In this solution, the network management network element and the application function network element can negotiate to create the first user plane function network element and/or the first application server. In other words, when obtaining the consent, from the application function network element, to creation of the first user plane function network element within the first area or when the application function network element determines to create, within the first area, the first application server serves the application, the network management network element triggers the operation of creating the first user plane function network element within the first area.

In a possible implementation, that the network management network element determines, based on the first information, to create, within the first area, a first user plane function network element serving the application includes: The network management network element determines, based on the first information, that the quantity of access times is greater than or equal to a first threshold and/or the service experience is less than or equal to a second threshold; and the network management network element determines to create, within the first area, the first user plane function network element serving the application. When the quantity of access times is greater than or equal to the first threshold and/or the service experience is less than or equal to the second threshold, creation, within the first area, of the first user plane function network element serving the application not only can implement collaboration between application access, network creation, and application creation, but also can ensure service experience for the application accessed by the terminal within the first area via the first user plane function network element.

In a possible implementation, that the network management network element determines to create, within the first area, the first user plane function network element serving the application includes: If the first user plane function network element serving the application does not exist within the first area, the network management network element determines to create, within the first area, the first user plane function network element serving the application. For example, if the terminal needs to access an application within the first area, but a first user plane function network element serving the application does not exist within the first area, the network management network element determines to create, within the first area, the first user plane function network element serving the application.

In a possible implementation, the method provided in this embodiment of this application further includes: The network management network element triggers, based on the first information, the operation of creating, within the first area, the first application server serving the application. In this way, the network management network element not only can trigger the operation of creating the first user plane function network element within the first area but also can trigger the operation of creating the first application server within the first area.

In a possible implementation, that the network management network element triggers, based on the first information, the operation of creating, within the first area, the first application server serving the application includes: The network management network element creates, within the first area based on the first information, the first application server serving the application. In other words, the network management network element creates, within the first area, the first application server serving the application.

In a possible implementation, that the network management network element triggers, based on the first information, the operation of creating, within the first area, the first application server serving the application includes: The network management network element determines, based on the first information, that the quantity of access times is greater than or equal to a third threshold and/or the service experience is less than or equal to a fourth threshold; and the network management network element triggers the operation of creating, within the first area, the first application server serving the application.

In a possible implementation, that the network management network element triggers the operation of creating, within the first area, the first application server serving the application includes: The network management network element triggers, based on the acknowledgment message from the application function network element, the operation of creating, within the first area, the first application server serving the application.

In a possible implementation, before the network management network element triggers the operation of creating, within the first area, the first application server serving the application, the first application server serving the application does not exist within the first area, or although an application server serving the application exists within the first area, load of the application server serving the application is greater than or equal to a preset load threshold.

In a possible implementation, the first information is information about the application that is created on a second application server and that is accessed by the terminal within the first area via a second user plane function network element. In other words, that a network management network element receives, from a data analytics network element, first information of an application accessed by a terminal within a first area includes: The network management network element receives, from the data analytics network element, the first information that is of the application created on the second application server and that is accessed by the terminal within the first area via the second user plane function network element. The second user plane function network element and/or the second application server are/is created within a second area, and the first area and the second area are different areas.

In a possible implementation, that the network management network element sends the first message to the application function network element in this embodiment of this application includes: The network management network element sends the first message to the application function network element via the data analytics network element and/or a network exposure network element.

In a possible implementation, before the network management network element receives, from the data analytics network element, the first information of the application accessed by the terminal within the first area, the method provided in this embodiment of this application further includes: The network management network element sends, to the data analytics network element, a first request that is for requesting the first information of the application accessed by the terminal within the first area. In this way, the data analytics network element sends, to the network management network element based on triggering of the network management network element, the first information of the application accessed by the terminal within the first area.

In a possible implementation, the first request includes one or more of the following information: an application identifier of the application and information about a third area, where the first area is a sub-area of the third area, or the first area is the third area. In this way, the data analytics network element determines, based on the application identifier, the application accessed by the terminal, and determines, based on the information about the third area, an area in which the terminal is located.

In a possible implementation, the first request further includes information about a first time period. Correspondingly, the first information includes a quantity of access times and/or service experience for the application in a second time period, and the second time period is a sub-time period of the first time period, or the second time period and the first time period are a same time period. In this way, the network management network element determines that the first information reflects the quantity of access times and/or service experience for the application in the second time period.

In a possible implementation, the first message may further carry indication information, and the indication information indicates the application function network element to trigger the operation of creating, within the first area, the first application server serving the application.

In a possible implementation, before the network management network element sends the first message to the application function network element, if the network management network element has triggered the operation of creating the first user plane function network element within the first area, the first message may indicate that the network management network element has triggered the operation of creating the first user plane function network element within the first area. Before the network management network element sends the first message to the application function network element, if the network management network element prepares to trigger the operation of creating the first user plane function network element within the first area, the first message may indicate that the network management network element is to trigger the operation of creating the first user plane function network element within the first area. Before the network management network element sends the first message to the application function network element, although the network management network element determines that the first user plane function network element needs to be created within the first area, if the network management network element does not trigger the operation of creating the first user plane function network element within the first area, the first message may indicate that the network management network element expects to trigger the operation of creating the first user plane function network element within the first area, or the first message may indicate that the network management network element queries whether to create the first user plane function network element within the first area. Before the network management network element sends the first message to the application function network element, if the network management network element determines that the first user plane function network element has been created within the first area, the first message may indicate that the network management network element determines that the first user plane function network element has been created within the first area.

In a possible implementation, the first message may further carry the first information, so that the application function network element autonomously determines, based on the first information, to create the first application server within the first area.

According to a second aspect, an embodiment of this application provides a communication method, including: An application function network element receives a first message from a network management network element, where the first message indicates that the network management network element triggers an operation of creating, within a first area, a first user plane function network element serving an application, where the application is an application accessed by a terminal within the first area; and the application function network element determines, based on the first message, to create, within the first area, a first application server According to the method provided in this embodiment of this application, the first message is received by the application function network element. Because the first message reflects that the network management network element needs to create, within the first area, the first user plane function network element serving the application, the application function network element determines, based on the first message, to create, within the first area, the first application server serving the application. In this way, the first application server and the first user plane function network element serving the application can be collaboratively created within the first area in which the terminal is located.

In a possible implementation, the application function network element triggers an operation of creating the first application server within the first area.

In a possible implementation, that the application function network element determines, based on the first message, to create, within the first area, a first application server serving the application includes: If the first application server serving the application does not exist within the first area, the application function network element determines to create, within the first area, the first application server serving the application.

In a possible implementation, after the application function network element triggers the operation of creating the first application server within the first area, the method provided in this embodiment of this application further includes: The application function network element sends an acknowledgment message to the network management network element, where the acknowledgment message indicates that the network management network element is allowed to create, within the first area, the first user plane function network element serving the application, or the acknowledgment message indicates that the network management network element is allowed to create, within the first area, the first application server serving the application. In this solution, the first message may indicate that the network management network element expects to trigger, within the first area, the operation of creating the first user plane function network element serving the application.

In a possible implementation, after the first application server is successfully created, the application function network element determines a first identifier of the first application server. The application function network element sends one or more of the first identifier, an application identifier of the application, and information about the first area to a control plane network element. In this way, the control plane network element determines that the first application server serving the application is created within the first area.

In a possible implementation, the method provided in this embodiment of this application further includes: After the first application server is successfully created, the application function network element sends a second message to the control plane network element, where the second message is used to notify the control plane network element that the first application server serving the application is successfully created within the first area.

In a possible implementation, the application is an application that is created on a second application server and that is accessed by the terminal within the first area via a second user plane function network element, the second user plane function network element and/or the second application server are/is created within a second area, and the first area and the second area are different areas.

In a possible implementation, the first message further includes first information. Correspondingly, that the application function network element determines, based on the first message, to create, within the first area, a first application server serving the application includes: If determining, based on the first information, that a quantity of access times for the application is greater than or equal to a first threshold and/or service experience is less than or equal to a second threshold, the application function network element determines to create, within the first area, the first application server serving the application.

According to a third aspect, an embodiment of this application provides a communication method, including: An application function network element receives, from a data analytics network element, first information of an application accessed by a terminal within a first area, where the first information includes a quantity of access times and/or service experience for the application; the application function network element determines, based on the first information, to create, within the first area, a first application server serving the application; and the application function network element sends a notification message to a network management network element, where the notification message is used by the network management network element to determine to create, within the first area, a first user plane function network element serving the application.

According to the foregoing communication method, the application function network element can determine, based on the first information of the application accessed by the terminal within the first area, to create, within the first area, the first application server serving the application, and then enable, by using the notification message, the network management network element to determine to create, within the first area, the first user plane function network element serving the application. In this way, the network management network element and the application function network element collaboratively create, within the first area, the first user plane function network element and the first application server serving the application.

In a possible implementation, that the application function network element determines, based on the first information, to create, within the first area, a first application server serving the application includes: The application function network element sends a query message to the network management network element based on the first information, where the query message is used to negotiate whether to deploy, within the first area, the first application server serving the application; then the application function network element receives an answer response from the network management network element; and if the answer response indicates that the first application server serving the application is allowed to be deployed within the first area, the application function network element determines to create, within the first area, the first application server serving the application. It may be understood that, if determining, based on the first information, that the quantity of access times is greater than or equal to a first threshold and/or the service experience is less than or equal to a second threshold, the application function network element sends the query message to the network management network element. Certainly, the query message may further carry the first information, so that the network management network element determines that the first application server serving the application needs to be created within the first area, to meet a requirement of the terminal for accessing the application.

In a possible implementation, before the application function network element sends the notification message to the network management network element, the application function network element triggers an operation of creating, within the first area, the first application server serving the application.

In a possible implementation, after the application function network element sends the notification message to the network management network element, the application function network element triggers an operation of creating, within the first area, the first application server serving the application.

In a possible implementation, the notification message may carry the first information, so that the network management network element determines, based on the first information, to create, within the first area, the first user plane function network element serving the application.

In a possible implementation, that the application function network element determines, based on the first information, to create, within the first area, a first application server serving the application includes: The application function network element determines, based on the first information, that the quantity of access times is greater than or equal to the first threshold and/or the service experience is less than or equal to the second threshold; and the application function network element determines to create the first application server within the first area.

In a possible implementation, before the application function network element receives, from the data analytics network element, the first information of the application accessed by the terminal within the first area, the method provided in this embodiment of this application further includes: The application function network element sends, to the data analytics network element, a first request for requesting the first information of the application accessed by the terminal within the first area.

For content of the first request in the third aspect, refer to the descriptions in the first aspect. Details are not described herein again.

In a possible implementation, the method provided in this embodiment of this application further includes: After the first application server is created within the first area, the application function network element determines a first identifier of the first application server; and the application function network element sends one or more of the first identifier, an application identifier of the application, and information about the first area to a control plane network element.

In a possible implementation, the method provided in this embodiment of this application further includes: After the first application server is created within the first area, the application function network element sends a second message to a control plane network element, where the second message is used to notify the control plane network element that the first application server serving the application is successfully created within the first area.

In a possible implementation, the notification message indicates that the first application server serving the application is successfully created within the first area, or the notification message indicates the application function network element to trigger the operation of creating, within the first area, the first application server serving the application.

In a possible implementation, the notification message carries creation indication information, and the creation indication information indicates the network management network element to create, within the first area, the first user plane function network element serving the application.

In a possible implementation, that an application function network element receives, from a data analytics network element, first information of an application accessed by a terminal within a first area includes: The application function network element receives, from the data analytics network element, the first information that is of the application created on a second application server and that is accessed by the terminal within the first area via a second user plane function network element. The second application server and/or the second user plane function network element are/is created within a second area. The first area and the second area are different areas. In other words, the first information is information about the application that is created on the second application server and that is accessed by the terminal within the first area via the second user plane function network element.

According to a fourth aspect, an embodiment of this application provides a communication method, including: A network management network element receives a notification message from an application function network element, where the notification message is used by the network management network element to determine to create, within a first area, a first user plane function network element serving an application; and the network management network element triggers an operation of creating, within the first area, the first user plane function network element serving the application. The application is an application accessed by a terminal within the first area.

In a possible implementation, the application is an application that is created on a second application server and that is accessed by the terminal within the first area via a second user plane function network element, the second user plane function network element and/or the second application server are/is created within a second area, and the first area and the second area are different areas.

In a possible implementation, the notification message carries creation indication information, and the creation indication information indicates the network management network element to create, within the first area, the first user plane function network element serving the application. The network management network element triggers, based on the creation indication information, the operation of creating, within the first area, the first user plane function network element serving the application.

In a possible implementation, the notification message carries first information, where the first information includes a quantity of access times and/or service experience for the application. Before the network management network element triggers the operation of creating, within the first area, the first user plane function network element serving the application, the method provided in this embodiment of this application further includes: The network management network element determines that the quantity of access times is greater than or equal to a first threshold and/or the service experience is less than or equal to a second threshold; and the network management network element determines to create, within the first area, the first user plane function network element serving the application.

According to a fifth aspect, an embodiment of this application provides a communication method, where the method includes: A data analytics network element obtains first information of an application accessed by a terminal within a first area, where the first information includes a quantity of access times and/or service experience for the application; and the data analytics network element sends the first information of the application accessed by the terminal within the first area to a network management network element or an application function network element.

In a possible implementation, the method provided in this embodiment of this application further includes: The data analytics network element receives a first request from the network management network element or the application function network element, where the first request is for requesting the first information of the application accessed by the terminal within the first area.

In a possible implementation, the first request includes one or more of the following information: an application identifier of the application and information about a third area, where the first area is a sub-area of the third area, or the first area is the third area. In this way, the data analytics network element determines, based on the application identifier, the application accessed by the terminal, and determines, based on the information about the third area, an area in which the terminal is located.

In a possible implementation, the first request further includes information about a first time period. Correspondingly, the first information includes a quantity of access times and/or service experience for the application in a second time period, and the second time period is a sub-time period of the first time period, or the second time period and the first time period are a same time period. In this way, the network management network element determines that the first information reflects the quantity of access times and/or service experience for the application in the second time period.

In a possible implementation, the first request in this embodiment of this application comes from the application function network element. However, the first request may further indicate the data analytics network element to feed back, to the network management network element, the first information of the application accessed by the terminal within the first area. Therefore, after obtaining the first information of the application accessed by the terminal within the first area, the data analytics network element feeds back the first information to the network management network element.

In a possible implementation, the first request in this embodiment of this application comes from the network management network element. However, the first request may further indicate the data analytics network element to feed back, to the application function network element, the first information of the application accessed by the terminal within the first area. Therefore, after obtaining the first information of the application accessed by the terminal within the first area, the data analytics network element feeds back the first information to the application function network element.

According to a sixth aspect, an embodiment of this application provides a communication apparatus. The communication apparatus can implement the communication method according to any one of the first aspect or the possible implementations of the first aspect, and therefore can further achieve beneficial effects according to any one of the first aspect or the possible implementations of the first aspect. The communication apparatus may be a network management network element, or may be an apparatus that can support the network management network element in implementing any one of the first aspect or the possible implementations of the first aspect, for example, a chip used in the network management network element. The communication apparatus may implement the foregoing method by using software or hardware, or by executing corresponding software by hardware.

In an example, the communication apparatus includes: a communication unit, configured to receive, from a data analytics network element, first information of an application accessed by a terminal within a first area, where the first information includes a quantity of access times and/or service experience for the application; and a processing unit, configured to determine, based on the first information, to create, within the first area, a first user plane function network element serving the application. The communication unit is further configured to send a first message to an application function network element, where the first message indicates that the network management network element triggers creation, within the first area, of the first user plane function network element serving the application.

In a possible implementation, before the communication unit is configured to send the first message to the application function network element, the processing unit is further configured to trigger an operation of creating, within the first area, the first user plane function network element serving the application.

In a possible implementation, after the communication unit is configured to send the first message to the application function network element, the communication unit is further configured to receive an acknowledgment message from the application function network element, where the acknowledgment message indicates that the network management network element is allowed to create, within the first area, the first user plane function network element serving the application, the acknowledgment message indicates that the network management network element is allowed to create, within the first area, the first application server serving the application, or the acknowledgment message indicates that the network management network element is allowed to trigger the operation of creating, within the first area, the first user plane function network element serving the application. The processing unit is further configured to trigger the operation of creating the first user plane function network element within the first area.

In a possible implementation, the processing unit is configured to determine, based on the first information, that a quantity of access times is greater than or equal to a first threshold and/or service experience is less than or equal to a second threshold. The processing unit is configured to determine to create, within the first area, the first user plane function network element serving the application.

In a possible implementation, that the processing unit is configured to determine to create, within the first area, the first user plane function network element serving the application includes: If the first user plane function network element serving the application does not exist within the first area, the processing unit is configured to determine to create, within the first area, the first user plane function network element serving the application.

In a possible implementation, the processing unit is further configured to trigger, based on the first information, an operation of creating, within the first area, the first application server serving the application. In this way, the network management network element not only can trigger the operation of creating the first user plane function network element within the first area but also can trigger the operation of creating the first application server within the first area.

In a possible implementation, that the processing unit is configured to trigger, based on the first information, an operation of creating, within the first area, the first application server serving the application includes: The processing unit is configured to create, within the first area based on the first information, the first application server serving the application.

In a possible implementation, that the processing unit is configured to trigger, based on the first information, an operation of creating, within the first area, the first application server serving the application includes: the processing unit is configured to determine, based on the first information, that the quantity of access times is greater than or equal to a third threshold and/or the service experience is less than or equal to a fourth threshold; and the processing unit is configured to trigger the operation of creating, within the first area, the first application server serving the application.

In a possible implementation, before the processing unit is configured to trigger the operation of creating, within the first area, the first application server serving the application, the first application server serving the application does not exist within the first area.

In a possible implementation, that the communication unit is configured to receive, from the data analytics network element, the first information of the application accessed by the terminal within the first area includes: The communication unit is configured to receive, from the data analytics network element, the first information that is of the application created on the second application server and that is accessed by the terminal within the first area via the second user plane function network element. The second user plane function network element and/or the second application server are/is created within a second area, and the first area and the second area are different areas.

In a possible implementation, that the communication unit is configured to send the first message to the application function network element in this embodiment of this application includes: The communication unit is configured to send the first message to the application function network element via the data analytics network element and/or a network exposure network element.

In a possible implementation, before the communication unit is configured to receive, from the data analytics network element, the first information of the application accessed by the terminal within the first area, the communication unit is configured to send, to the data analytics network element, a first request for requesting the first information of the application accessed by the terminal within the first area.

In a possible implementation, the first request includes one or more of the following information: an application identifier of the application and information about a third area, where the first area is a sub-area of the third area, or the first area is the same as the third area.

In a possible implementation, the first request further includes information about a first time period. Correspondingly, the first information includes a quantity of access times and/or service experience for the application in a second time period, and the second time period is a sub-time period of the first time period, or the second time period and the first time period are a same time period.

In a possible implementation, the first message may further carry indication information, and the indication information indicates the application function network element to trigger the operation of creating, within the first area, the first application server serving the application.

In a possible implementation, the first message may further carry the first information, so that the application function network element autonomously determines, based on the first information, to create the first application server within the first area.

In a possible implementation, before the communication unit is configured to send the first message to the application function network element, if the processing unit has triggered the operation of creating the first user plane function network element within the first area, the first message may indicate that the network management network element has triggered the operation of creating the first user plane function network element within the first area. Before the network management network element sends the first message to the application function network element, if the processing unit prepares to trigger the operation of creating the first user plane function network element within the first area, the first message may indicate that the network management network element is to trigger the operation of creating the first user plane function network element within the first area. Before the communication unit is configured to send the first message to the application function network element, although the network management network element determines that the first user plane function network element needs to be created within the first area, if the network management network element does not trigger the operation of creating the first user plane function network element within the first area, the first message may indicate that the network management network element expects to trigger the operation of creating the first user plane function network element within the first area, or the first message may indicate that the network management network element queries whether to create the first user plane function network element within the first area.

In another example, an embodiment of this application provides a communication apparatus. The communication apparatus may be a network management network element, or may be a chip in the network management network element. The communication apparatus may include a processing unit and a communication unit. The communication apparatus may further include a storage unit. The storage unit is configured to store computer program code. The computer program code includes instructions. The processing unit executes the instructions stored in the storage unit, to enable the communication apparatus to implement the method according to any one of the first aspect or the possible implementations of the first aspect. When the communication apparatus is the network management network element, the processing unit may be a processor, the communication unit may be a communication interface, and the storage unit may be a memory. When the communication apparatus is the chip in the network management network element, the processing unit may be a processor, and the communication unit may also be referred to as a communication interface. For example, the communication interface may be an input/output interface, a pin, or a circuit. The processing unit executes the computer program code stored in the storage unit, so that the network management network element implements the method according to any one of the first aspect or the possible implementations of the first aspect. The storage unit may be a storage unit (for example, a register or a cache) in the chip, or may be a storage unit (for example, a read-only memory or a random access memory) that is in the network management network element and that is outside the chip.

In a possible implementation, the processor, the communication interface, and the memory are coupled to each other.

According to a seventh aspect, an embodiment of this application provides a communication apparatus. The communication apparatus can implement the communication method according to any one of the second aspect or the possible implementations of the second aspect, and therefore can further achieve beneficial effects according to any one of the second aspect or the possible implementations of the second aspect. The communication apparatus may be an application function network element, or may be an apparatus that can support the application function network element in implementing any one of the second aspect or the possible implementations of the second aspect, for example, a chip used in the application function network element. The communication apparatus may implement the foregoing method by using software or hardware, or by executing corresponding software by hardware.

In an example, an embodiment of this application provides a communication apparatus, including: a communication unit, configured to receive a first message from a network management network element, where the first message indicates that the network management network element triggers an operation of creating, within a first area, a first user plane function network element serving an application, where the application is an application accessed by a terminal within the first area; and a processing unit, configured to determine, based on the first message, to create, within the first area, a first application server serving the application.

In a possible implementation, the processing unit is further configured to trigger an operation of creating the first application server within the first area.

In a possible implementation, that the processing unit is configured to determine, based on the first message, to create, within the first area, the first application server serving the application includes: If the first application server serving the application does not exist within the first area, the processing unit is configured to determine to create, within the first area, the first application server serving the application.

In a possible implementation, after the processing unit is configured to trigger the operation of creating the first application server within the first area, the communication unit is further configured to send an acknowledgment message to the network management network element, where the acknowledgment message indicates that the network management network element is allowed to create, within the first area, the first user plane function network element serving the application, or the acknowledgment message indicates that the network management network element is allowed to create, within the first area, the first application server serving the application. In this solution, the first message may indicate that the network management network element expects to trigger, within the first area, the operation of creating the first user plane function network element serving the application.

In a possible implementation, after the first application server is successfully created, the processing unit is further configured to determine a first identifier of the first application server. The communication unit is further configured to send one or more of the first identifier, an application identifier of the application, and information about the first area to a control plane network element. In this way, the control plane network element determines that the first application server serving the application is created within the first area.

In a possible implementation, after the first application server is successfully created, the communication unit is further configured to send a second message to the control plane network element, where the second message is used to notify the control plane network element that the first application server serving the application is successfully created within the first area.

In a possible implementation, the application is an application that is created on a second application server and that is accessed by the terminal within the first area via a second user plane function network element, the second user plane function network element and/or the second application server are/is created within a second area, and the first area and the second area are different areas.

In a possible implementation, the first message further includes first information. Correspondingly, the processing unit is configured to: if determining, based on the first information, that a quantity of access times for the application is greater than or equal to a first threshold and/or service experience is less than or equal to a second threshold, determine to create, within the first area, the first application server serving the application.

In another example, an embodiment of this application provides a communication apparatus. The communication apparatus may be an application function network element, or may be a chip in the application function network element. The communication apparatus may include a processing unit and a communication unit. The communication apparatus may further include a storage unit. The storage unit is configured to store computer program code. The computer program code includes instructions. The processing unit executes the instructions stored in the storage unit, to enable the communication apparatus to implement the method according to any one of the second aspect or the possible implementations of the second aspect. When the communication apparatus is the application function network element, the processing unit may be a processor, the communication unit may be a communication interface, and the storage unit may be a memory. When the communication apparatus is the chip in the application function network element, the processing unit may be a processor, and the communication unit may also be referred to as a communication interface. For example, the communication interface may be an input/output interface, a pin, or a circuit. The processing unit executes the computer program code stored in the storage unit, so that the application function network element implements the method according to any one of the second aspect or the possible implementations of the second aspect. The storage unit may be a storage unit (for example, a register or a cache) in the chip, or may be a storage unit (for example, a read-only memory or a random access memory) that is in the application function network element and that is outside the chip.

In a possible implementation, the processor, the communication interface, and the memory are coupled to each other.

According to an eighth aspect, an embodiment of this application provides a communication apparatus. The communication apparatus can implement the communication method according to any one of the third aspect or the possible implementations of the third aspect, and therefore can further achieve beneficial effects according to any one of the third aspect or the possible implementations of the third aspect. The communication apparatus may be an application function network element, or may be an apparatus that can support the application function network element in implementing any one of the third aspect or the possible implementations of the third aspect, for example, a chip used in the application function network element. The communication apparatus may implement the foregoing method by using software or hardware, or by executing corresponding software by hardware.

In an example, an embodiment of this application provides a communication apparatus, including: a communication unit, configured to receive, from a data analytics network element, first information of an application accessed by a terminal within a first area, where the first information includes a quantity of access times and/or service experience for the application; and a processing unit, configured to determine, based on the first information, to create, within the first area, a first application server serving the application. The communication unit is configured to send a notification message to a network management network element, where the notification message is used by the network management network element to determine to create, within the first area, a first user plane function network element serving the application.

In a possible implementation, the processing unit is configured to send a query message to the network management network element based on the first information, where the query message is used to negotiate whether to deploy, within the first area, the first application server serving the application. Then, the communication unit is configured to receive an answer response from the network management network element. If the answer response indicates that the first application server serving the application is allowed to be deployed within the first area, the processing unit is configured to determine to create, within the first area, the first application server serving the application. It may be understood that, if determining, based on the first information, that the quantity of access times is greater than or equal to a first threshold and/or the service experience is less than or equal to a second threshold, the processing unit is configured to send the query message to the network management network element via the communication unit. Certainly, the query message may further carry the first information, so that the network management network element determines that the first application server serving the application needs to be created within the first area, to meet a requirement of the terminal for accessing the application.

In a possible implementation, before the communication unit is configured to send the notification message to the network management network element, the processing unit is further configured to trigger an operation of creating, within the first area, the first application server serving the application.

In a possible implementation, after the communication unit is configured to send the notification message to the network management network element, the processing unit is further configured to trigger an operation of creating, within the first area, the first application server serving the application.

In a possible implementation, the notification message may carry the first information, so that the network management network element determines, based on the first information, to create, within the first area, the first user plane function network element serving the application.

In a possible implementation, that the processing unit is configured to determine, based on the first information, to create, within the first area, the first application server serving the application includes: The processing unit is configured to determine, based on the first information, that a quantity of access times is greater than or equal to a first threshold and/or service experience is less than or equal to a second threshold; and the processing unit is configured to determine to create the first application server within the first area.

In a possible implementation, before the communication unit is configured to receive, from the data analytics network element, the first information of the application accessed by the terminal within the first area, the communication unit is further configured to send, to the data analytics network element, a first request for requesting the first information of the application accessed by the terminal within the first area.

For content of the first request in the eighth aspect, refer to the descriptions in the first aspect. Details are not described herein again.

In a possible implementation, after the first application server is created within the first area, the processing unit is further configured to determine a first identifier of the first application server. The communication unit is further configured to send one or more of the first identifier, an application identifier of the application, and information about the first area to a control plane network element.

In a possible implementation, after the first application server is created within the first area, the communication unit is further configured to send a second message to a control plane network element, where the second message is used to notify the control plane network element that the first application server serving the application is successfully created within the first area.

In a possible implementation, the notification message indicates that the first application server serving the application is successfully created within the first area, or the notification message indicates the application function network element to trigger the operation of creating, within the first area, the first application server serving the application.

In a possible implementation, that the communication unit is configured to receive, from the data analytics network element, the first information of the application accessed by the terminal within the first area includes: The communication unit is configured to receive, from the data analytics network element, the first information that is of the application created on the second application server and that is accessed by the terminal within the first area via the second user plane function network element. The second application server and/or the second user plane function network element are/is created within a second area. The first area and the second area are different areas.

In a possible implementation, the notification message carries creation indication information, and the creation indication information indicates the network management network element to create, within the first area, the first user plane function network element serving the In another example, an embodiment of this application provides a communication apparatus. The communication apparatus may be an application function network element, or may be a chip in the application function network element. The communication apparatus may include a processing unit and a communication unit. The communication apparatus may further include a storage unit. The processing unit executes the instructions stored in the storage unit, to enable the communication apparatus to implement the method according to any one of the third aspect or the possible implementations of the third aspect. When the communication apparatus is the application function network element, the processing unit may be a processor, the communication unit may be a communication interface, and the storage unit may be a memory. The storage unit is configured to store computer program code. The computer program code includes instructions. When the communication apparatus is the chip in the application function network element, the processing unit may be a processor, and the communication unit may also be referred to as a communication interface. For example, the communication interface may be an input/output interface, a pin, or a circuit. The processing unit executes the computer program code stored in the storage unit, so that the application function network element implements the method according to any one of the third aspect or the possible implementations of the third aspect. The storage unit may be a storage unit (for example, a register or a cache) in the chip, or may be a storage unit (for example, a read-only memory or a random access memory) that is in the application function network element and that is outside the chip.

In a possible implementation, the processor, the communication interface, and the memory are coupled to each other.

According to a ninth aspect, an embodiment of this application provides a communication apparatus. The communication apparatus can implement the communication method according to any one of the fourth aspect or the possible implementations of the fourth aspect, and therefore can further achieve beneficial effects according to any one of the fourth aspect or the possible implementations of the fourth aspect. The communication apparatus may be a network management network element, or may be an apparatus that can support the network management network element in implementing any one of the fourth aspect or the possible implementations of the fourth aspect, for example, a chip used in the network management network element. The communication apparatus may implement the foregoing method by using software or hardware, or by executing corresponding software by hardware.

In an example, an embodiment of this application provides a communication apparatus, including: a communication unit, configured to receive a notification message from an application function network element, where the notification message is used by the network management network element to determine to create, within a first area, a first user plane function network element serving an application; and a processing unit, configured to trigger an operation of creating, within the first area, the first user plane function network element serving the application. The application is an application accessed by a terminal within the first area.

In a possible implementation, the application is an application that is created on a second application server and that is accessed by the terminal within the first area via a second user plane function network element, the second user plane function network element and/or the second application server are/is created within a second area, and the first area and the second area are different areas.

In another example, an embodiment of this application provides a communication apparatus. The communication apparatus may be a network management network element, or may be a chip in the network management network element. The communication apparatus may include a processing unit and a communication unit. The communication apparatus may further include a storage unit. The storage unit is configured to store computer program code. The computer program code includes instructions. The processing unit executes the instructions stored in the storage unit, to enable the communication apparatus to implement the method according to any one of the fourth aspect or the possible implementations of the fourth aspect. When the communication apparatus is the network management network element, the processing unit may be a processor, the communication unit may be a communication interface, and the storage unit may be a memory. When the communication apparatus is the chip in the network management network element, the processing unit may be a processor, and the communication unit may also be referred to as a communication interface. For example, the communication interface may be an input/output interface, a pin, or a circuit. The processing unit executes the computer program code stored in the storage unit, so that the network management network element implements the method according to any one of the fourth aspect or the possible implementations of the fourth aspect. The storage unit may be a storage unit (for example, a register or a cache) in the chip, or may be a storage unit (for example, a read-only memory or a random access memory) that is in the network management network element and that is outside the chip.

According to a tenth aspect, an embodiment of this application provides a communication apparatus. The communication apparatus can implement the communication method according to any one of the fifth aspect or the possible implementations of the fifth aspect, and therefore can further achieve beneficial effects according to any one of the fifth aspect or the possible implementations of the fifth aspect. The communication apparatus may be a data analytics network element, or may be an apparatus that can support the data analytics network element in implementing any one of the fifth aspect or the possible implementations of the fifth aspect, for example, a chip used in the data analytics network element. The communication apparatus may implement the foregoing method by using software or hardware, or by executing corresponding software by hardware.

In an example, an embodiment of this application provides a communication apparatus, including: a processing unit, configured to obtain first information of an application accessed by a terminal within a first area, where the first information includes a quantity of access times and/or service experience for the application; and a communication unit, configured to send the first information of the application accessed by the terminal within the first area to a network management network element or an application function network element.

In a possible implementation, the communication unit is configured to receive a first request from the network management network element or the application function network element, where the first request is for requesting the first information of the application accessed by the terminal within the first area.

In a possible implementation, the first request includes one or more of the following information: an application identifier of the application and information about a third area, where the first area is a sub-area of the third area, or the first area is the same as the third area. In this way, the data analytics network element determines, based on the application identifier, the application accessed by the terminal, and determines, based on the information about the third area, an area in which the terminal is located.

In a possible implementation, the first request further includes information about a first time period. Correspondingly, the first information includes a quantity of access times and/or service experience for the application in a second time period, and the second time period is a sub-time period of the first time period, or the second time period and the first time period are a same time period. In this way, the network management network element determines that the first information reflects the quantity of access times and/or service experience for the application in the second time period.

In a possible implementation, the first request in this embodiment of this application comes from the application function network element. However, the first request may further indicate the data analytics network element to feed back, to the network management network element, the first information of the application accessed by the terminal within the first area. Therefore, after obtaining the first information of the application accessed by the terminal within the first area, the data analytics network element feeds back the first information to the network management network element.

In a possible implementation, the first request in this embodiment of this application comes from the network management network element. However, the first request may further indicate the data analytics network element to feed back, to the application function network element, the first information of the application accessed by the terminal within the first area. Therefore, after obtaining the first information of the application accessed by the terminal within the first area, the data analytics network element feeds back the first information to the application function network element.

In another example, an embodiment of this application provides a communication apparatus. The communication apparatus may be a data analytics network element, or may be a chip in the data analytics network element. The communication apparatus may include a processing unit and a communication unit. The communication apparatus may further include a storage unit. The storage unit is configured to store computer program code. The computer program code includes instructions. The processing unit executes the instructions stored in the storage unit, to enable the communication apparatus to implement the method according to any one of the fifth aspect or the possible implementations of the fifth aspect. When the communication apparatus is the data analytics network element, the processing unit may be a processor, the communication unit may be a communication interface, and the storage unit may be a memory. When the communication apparatus is the chip in the data analytics network element, the processing unit may be a processor, and the communication unit may also be referred to as a communication interface. For example, the communication interface may be an input/output interface, a pin, or a circuit. The processing unit executes the computer program code stored in the storage unit, so that the data analytics network element implements the method according to any one of the fifth aspect or the possible implementations of the fifth aspect. The storage unit may be a storage unit (for example, a register or a cache) in the chip, or may be a storage unit (for example, a read-only memory or a random access memory) that is in the data analytics network element and that is outside the chip.

According to an eleventh aspect, an embodiment of this application provides a computer-readable storage medium. The computer-readable storage medium stores a computer program or instructions. When the computer program or the instructions are run on a computer, the computer is enabled to perform the communication method according to any one of the first aspect or the possible implementations of the first aspect.

According to a twelfth aspect, an embodiment of this application provides a computer-readable storage medium. The computer-readable storage medium stores a computer program or instructions. When the computer program or the instructions are run on a computer, the computer is enabled to perform the communication method according to any one of the second aspect or the possible implementations of the second aspect.

According to a thirteenth aspect, an embodiment of this application provides a computer-readable storage medium. The computer-readable storage medium stores a computer program or instructions. When the computer program or the instructions are run on a computer, the computer is enabled to perform the communication method according to any one of the third aspect or the possible implementations of the third aspect.

According to a fourteenth aspect, an embodiment of this application provides a computer-readable storage medium. The computer-readable storage medium stores a computer program or instructions. When the computer program or the instructions are run on a computer, the computer is enabled to perform the communication method according to any one of the fourth aspect or the possible implementations of the fourth aspect.

According to a fifteenth aspect, an embodiment of this application provides a computer-readable storage medium. The computer-readable storage medium stores a computer program or instructions. When the computer program or the instructions are run on a computer, the computer is enabled to perform the communication method described in any one of the fifth aspect or the possible implementations of the fifth aspect.

According to a sixteenth aspect, an embodiment of this application provides a computer program product including instructions. When the instructions are run on a computer, the computer is enabled to perform the communication method according to any one of the first aspect or the possible implementations of the first aspect.

According to a seventeenth aspect, this application provides a computer program product including instructions. When the instructions are run on a computer, the computer is enabled to perform the communication method according to any one of the second aspect or the possible implementations of the second aspect.

According to an eighteenth aspect, this application provides a computer program product including instructions. When the instructions are run on a computer, the computer is enabled to perform the communication method according to any one of the third aspect or the possible implementations of the third aspect.

According to a nineteenth aspect, this application provides a computer program product including instructions. When the instructions are run on a computer, the computer is enabled to perform the communication method according to any one of the fourth aspect or the possible implementations of the fourth aspect.

According to a twentieth aspect, this application provides a computer program product including instructions. When the instructions are run on a computer, the computer is enabled to perform the communication method according to the fifth aspect or the possible implementations of the fifth aspect.

According to a twenty-first aspect, an embodiment of this application provides a communication system. The communication system includes any one or more of the following:

the communication apparatus according to the sixth aspect and the possible implementations of the sixth aspect and the communication apparatus according to the seventh aspect and the possible implementations of the seventh aspect.

In a possible implementation, the system may further include the communication apparatus according to the tenth aspect and the possible implementations of the tenth aspect.

According to a twenty-second aspect, an embodiment of this application provides a communication system. The communication system includes any one or more of the following: the communication apparatus according to the eighth aspect and the possible implementations of the eighth aspect and the communication apparatus according to the ninth aspect and the possible implementations of the ninth aspect.

In a possible implementation, the system may further include the communication apparatus according to the tenth aspect and the possible implementations of the tenth aspect.

According to a twenty-third aspect, an embodiment of this application provides a communication apparatus. The communication apparatus includes at least one processor, the at least one processor is coupled to a storage medium, and the storage medium stores a computer program or instructions. When the computer program or the instructions are run by the processor, the communication method according to the first aspect or the possible implementations of the first aspect is implemented.

According to a twenty-fourth aspect, an embodiment of this application provides a communication apparatus. The communication apparatus includes at least one processor, the at least one processor is coupled to a storage medium, and the storage medium stores a computer program or instructions. When the computer program or the instructions are run by the processor, the communication method according to the second aspect or the possible implementations of the second aspect is implemented.

According to a twenty-fifth aspect, an embodiment of this application provides a communication apparatus. The communication apparatus includes at least one processor, the at least one processor is coupled to a storage medium, and the storage medium stores a computer program or instructions. When the computer program or the instructions are run by the processor, the communication method according to the third aspect or the possible implementations of the third aspect is implemented.

According to a twenty-sixth aspect, an embodiment of this application provides a communication apparatus. The communication apparatus includes at least one processor, the at least one processor is coupled to a storage medium, and the storage medium stores a computer program or instructions. When the computer program or the instructions are run by the processor, the communication method according to the fourth aspect or the possible implementations of the fourth aspect is implemented.

According to a twenty-seventh aspect, an embodiment of this application provides a communication apparatus. The communication apparatus includes at least one processor, the at least one processor is coupled to a storage medium, and the storage medium stores a computer program or instructions. When the computer program or the instructions are run by the processor, the communication method according to the fifth aspect or the possible implementations of the fifth aspect is implemented.

According to a twenty-eighth aspect, an embodiment of this application provides a communication apparatus. The communication apparatus includes one or more modules, configured to implement the methods according to the first aspect, the second aspect, the third aspect, the fourth aspect, and the fifth aspect, and the one or more modules may correspond to the steps in the methods according to the first aspect, the second aspect, the third aspect, the fourth aspect, and the fifth aspect.

According to a twenty-ninth aspect, an embodiment of this application provides a chip. The chip includes a processor and a communication interface. The communication interface is coupled to the processor, and the processor is configured to run a computer program or instructions, to implement the communication method according to any one of the first aspect or the possible implementations of the first aspect. The communication interface is configured to communicate with a module outside the chip.

According to a thirtieth aspect, an embodiment of this application provides a chip. The chip includes a processor and a communication interface. The communication interface is coupled to the processor, and the processor is configured to run a computer program or instructions, to implement the communication method according to any one of the second aspect or the possible implementations of the second aspect. The communication interface is configured to communicate with a module outside the chip.

According to a thirty-first aspect, an embodiment of this application provides a chip. The chip includes a processor and a communication interface. The communication interface is coupled to the processor, and the processor is configured to run a computer program or instructions, to implement the communication method according to any one of the third aspect or the possible implementations of the third aspect. The communication interface is configured to communicate with a module outside the chip.

According to a thirty-second aspect, an embodiment of this application provides a chip. The chip includes a processor and a communication interface. The communication interface is coupled to the processor, and the processor is configured to run a computer program or instructions, to implement the communication method according to any one of the fourth aspect or the possible implementations of the fourth aspect. The communication interface is configured to communicate with a module outside the chip.

According to a thirty-third aspect, an embodiment of this application provides a chip. The chip includes a processor and a communication interface. The communication interface is coupled to the processor, and the processor is configured to run a computer program or instructions, to implement the communication method according to any one of the fifth aspect or the possible implementations of the fifth aspect. The communication interface is configured to communicate with a module outside the chip.

Specifically, the chip provided in this embodiment of this application further includes a memory, configured to store the computer program or the instructions.

The chip in embodiments of this application may also be referred to as a chip system. This is uniformly described herein, and details are not described subsequently.

According to a thirty-fourth aspect, an embodiment of this application provides a communication apparatus. The communication apparatus includes at least one processor, the at least one processor is configured to run a computer program or instructions stored in a memory, to implement the communication method according to the first aspect or the possible implementations of the first aspect.

According to a thirty-fifth aspect, an embodiment of this application provides a communication apparatus. The communication apparatus includes at least one processor, the at least one processor is configured to run a computer program or instructions stored in a memory, to implement the communication method according to the second aspect or the possible implementations of the second aspect.

According to a thirty-sixth aspect, an embodiment of this application provides a communication apparatus. The communication apparatus includes at least one processor, the at least one processor is configured to run a computer program or instructions stored in a memory, to implement the communication method according to the third aspect or the possible implementations of the third aspect.

According to a thirty-seventh aspect, an embodiment of this application provides a communication apparatus. The communication apparatus includes at least one processor, the at least one processor is configured to run a computer program or instructions stored in a memory, to implement the communication method according to the fourth aspect or the possible implementations of the fourth aspect.

According to a thirty-eighth aspect, an embodiment of this application provides a communication apparatus. The communication apparatus includes at least one processor, the at least one processor is configured to run a computer program or instructions stored in a memory, to implement the communication method according to the fifth aspect or the possible implementations of the fifth aspect.

The communication apparatuses described in the thirty-fourth aspect to the thirty-eighth aspect each may further include the memory, and the memory is coupled to the at least one processor.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system provided above, refer to the beneficial effects of the corresponding solution in the corresponding method provided above. Details are not described herein again.

BRIEF DESCRIPTION OF DRAWINGS

FIG. 5A and FIG. 5B are a schematic flowchart of another communication method according to an embodiment of this application;

FIG. 6A and FIG. 6B are a schematic flowchart of still another communication method according to an embodiment of this application;

FIG. 7A and FIG. 7B are a schematic flowchart of yet another communication method according to an embodiment of this application;

DESCRIPTION OF EMBODIMENTS

Figure 1:
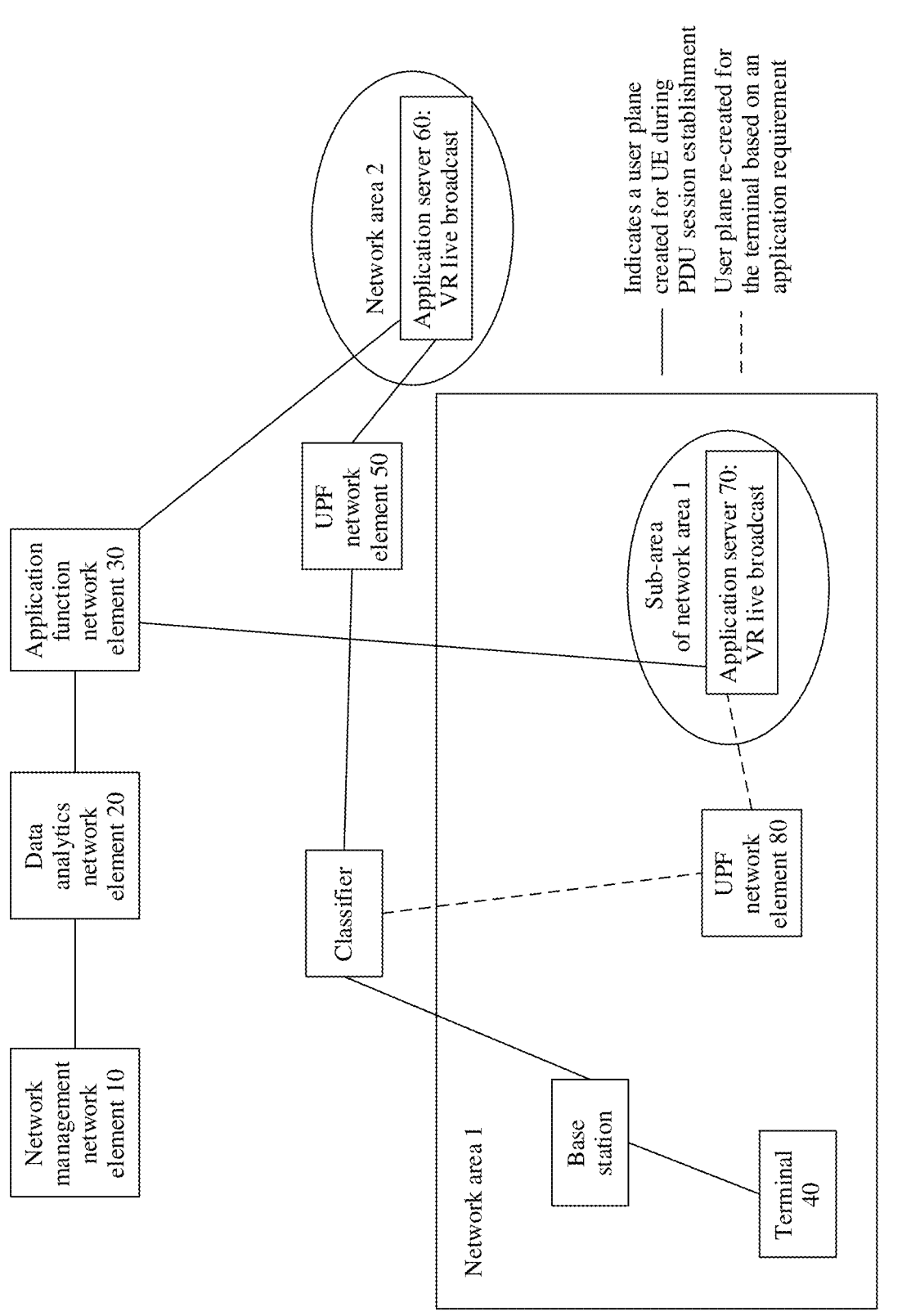
FIG. 1 is a schematic diagram of an architecture of a communication system according to an embodiment of this application.

To clearly describe the technical solutions in embodiments of this application, words such as "first" and "second" are used in embodiments of this application to distinguish between same items or similar items that provide basically same functions or purposes. For example, a first application server and a second application server are merely intended to distinguish between different application servers, and do not limit a sequence thereof. A person skilled in the art may understand that the terms such as "first" and "second" do not limit a quantity or an execution sequence, and that the terms such as "first" and "second" do not indicate a definite difference.

It should be noted that, in this application, words such as "example" or "for example" are used to represent giving an example, an illustration, or a description. Any embodiment or design scheme described as "example" or "for example" in this application should not be explained as being more preferred or having more advantages than another embodiment or design scheme. Exactly, use of the word "example" or "for example" or the like is intended to present a relative concept in a specific manner.

In this application, at least one means one or more, and a plurality of means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

The technical solutions in embodiments of this application may be applied to various communication systems, for example, code division multiple access (CDMA), time division multiple access (TDMA), frequency division multiple access (FDMA), orthogonal frequency division multiple access (OFDMA), single carrier frequency division multiple access (s SC-PUMA), and another system. Terms "system" and "network" can be interchanged with each other. Long term evolution (LTE) and various versions evolved based on LTE in 3GPP are a new version of the UMTS that uses the E-UTRA. A 5G communication system and a new radio (NR) communication system are next-generation communication systems under research. In addition, the communication systems may be further used in future-oriented communication technologies, and are all used in the technical solutions provided in embodiments of this application.

The system architecture and the application scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new application scenarios, the technical solutions provided in embodiments of this application are also applicable to similar technical problems.

FIG. 1 is an architectural diagram of a communication system according to an embodiment of this application. The system includes a network management network element 10, a data analytics network element 20 communicating with the network management network element 10, and an application function network element 30.

The data analytics network element 20 is configured to provide, to the network management network element 10, an application access volume and/or service experience information for an application that is created on an application server (AS) 60 and that is accessed by a terminal 40 within a network area 1 via a user plane function (UPF) network element 50, to assist the network management network element 10 in determining whether to trigger an operation of creating an application server 70 and a UPF network element 80 within the network area 1 or a sub-area of the network area 1, or assist the network management network element 10 in determining whether to create the UPF network element 80 within the network area 1 or the sub-area of the network area 1. The application function network element 30 is configured to trigger, based on triggering of the network management network element 10, an operation of creating the application server 70 within the network area 1 or the sub-area of the network area 1.

It may be understood that the application accessed by the terminal on the application server 60 may also be created on the application server 70. In FIG. 1, that the application is VR live broadcast is used as an example. The application may alternatively be an application other than the VR live broadcast.

In addition, the data analytics network element 20 is configured to provide, to the application function network element 30, the application access volume and/or the service experience information for the application that is created on the application server (AS) 60 and that is accessed by the terminal 40 within the network area 1 via the user plane function (UPF) network element 50, to assist the application function network element 30 in determining whether to trigger an operation of creating the application server 70 and the UPF network element 80 within the network area 1 or the sub-area of the network area 1, or assist the application function network element 30 in determining whether to create the application server 70 within the network area 1 or the sub-area of the network area 1. The network management network element 10 is configured to trigger, based on triggering of the application function network element 30, an operation of creating the UPF network element 80 within the network area 1 or the sub-area of the network area 1.

The AS 60 and the UPF network element 50 are created within a network area 2. In other words, the AS 60 and the UPF network element 50 are configured to serve, within the network area 2, a terminal located within the network area 1. The application server 70 and the UPF network element 80 are configured to serve the terminal within the network area 1. In other words, after the application server 70 and the UPF network element 80 are created, if the application is also created on the application server 70, the terminal may access, within the network area 1 via the UPF network element 80, the application created on the application server 70.

Specifically, after an application of the terminal is off-loaded to the application server 70, the terminal may access, based on a session (for example, a PDU session) between the terminal and the UPF network element 80, the application created on the application server 70. Before the application of the terminal is offloaded to the application server 70, the terminal may access, based on a session (for example, a PDU session) between the terminal and the UPF network element 50, the application created on the application server 60.

In this embodiment of this application, the network area 1 may be an area in which the terminal is located, and the network area 2 may not be the area in which the terminal is located, or the network area 2 may be a sub-area in the area in which the terminal is located. However, although the network area 2 is a sub-area in the area in which the terminal is located, when the terminal accesses, within the network area 1 based on the session between the terminal and the UPF network element 50, the application created on the application server 60 within the network area 2, service experience is lower than a service experience threshold, or a quantity of access times for the application is greater than an access quantity threshold. In this embodiment of this application, the network area 1 may be referred to as a local area, and the network area 2 may be referred to as a remote area.

It may be understood that the application function network element 30 may perform actions of creating the application server 70 and the UPF network element 80, or the application function network element 30 may trigger another network element (for example, the network management network element 10) to perform the actions of creating the application server 70 and the UPF network element 80. The network management network element 10 may perform actions of creating the application server 70 and the UPF network element 80, or the network management network element 10 may trigger another network element (for example, the application function network element 30) to perform the actions of creating the application server 70 and the UPF network element 80.

In a possible implementation, the data analytics network element 20 may independently determine, based on the application access volume and/or the service experience information for the application that is created on the AS 60 and that is accessed by the terminal 40 within the network area 1 via the UPF network element 50, that the application server 70 and the UPF network element 80 need to be created within the network area 1 or the sub-area of the network area 1. Then, the data analytics network element 20 may trigger a network element (for example, the application function network element 30 or the network management network element 10) configured to perform network function creation to perform the actions of creating the application server 70 and the UPF network element 80 within the network area 1 or the sub-area of the network area 1.

In a possible implementation, when both the application server 70 serving the application and the UPF network element 80 serving the application are created within the network area 1, to reduce a delay generated when the terminal accesses, via the UPF network element 50, the application created on the application server 60, the application may be further created on the application server 70. In this way, subsequently, a session management network element may offload a service flow of the terminal from the UPF network element 50 to the UPF network element 80 via a network element that supports offloading, so that the terminal accesses, via the UPF network element 80, the application created on the AS 70. For example, the network element that supports offloading may be an uplink classifier (ULCL) or a branching point (BP) network element.

In this embodiment of this application, the UPF network element 80 created in the area in which the terminal is located may be referred to as a local UPF network element (where a first user plane function network element is used as an example below), and the application server 70 created in the area in which the terminal is located may be referred to as a local application server (where a first application server is used as an example below). In this embodiment of this application, an example in which the area in which the terminal is located is the network area 1 (corresponding to the following first area) is used.

In this embodiment of this application, the UPF network element 50 created not in the area in which the terminal is located may be referred to as a remote UPF network element (where a second user plane function network element is used as an example below), and the application server 60 created not in the area in which the terminal is located may be referred to as a remote application server (where a second application server is used as an example below). In this embodiment of this application, the network area 2 is used as the remote area, that is, the terminal is not in the area.

Figures 2, 3:
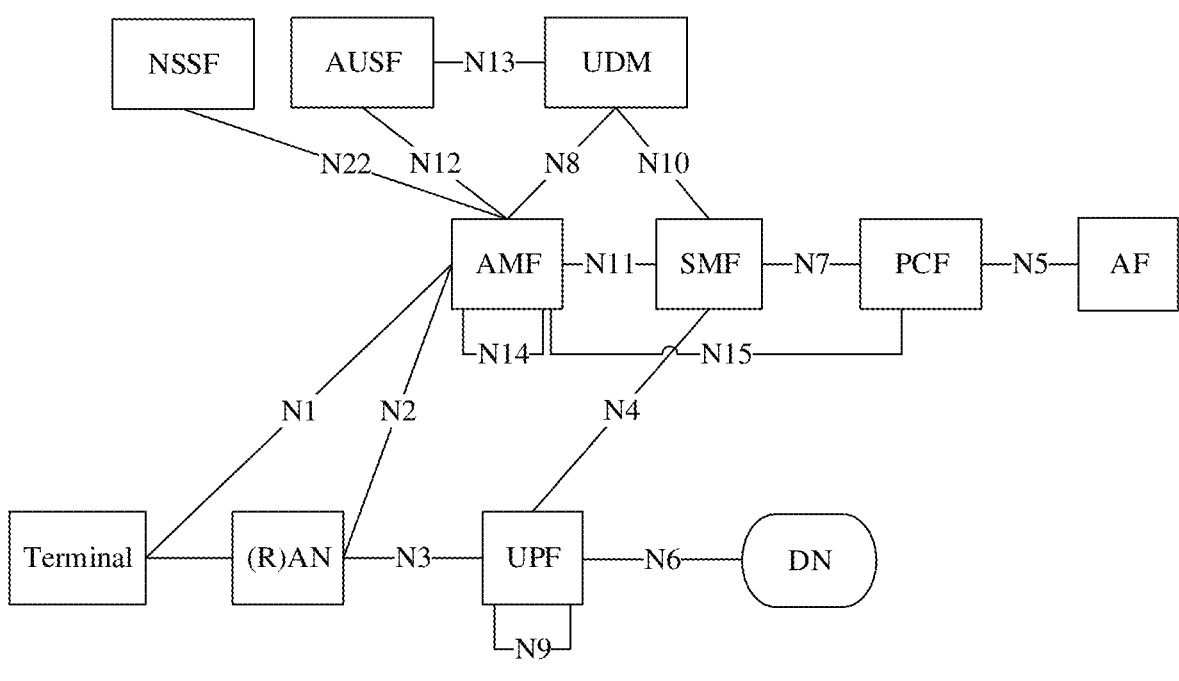
FIG. 2 is a schematic diagram of a 5G network architecture according to an embodiment of this application.
FIG. 3 is a schematic diagram of another 5G network architecture according to an embodiment of this application.

The following uses an example in which the communication system shown in FIG. 1 is applicable to a 5G network architecture, for example, uses an example in which the communication system shown in FIG. 1 is applicable to a 5G network architecture shown in FIG. 2. For example, the network management network element 10 may be an operation, administration, and maintenance (operation and maintenance) (OAM) network element (which may also be referred to as an operation, administration, and maintenance network element). A network element or an entity corresponding to the application function network element 30 may be an application function (AF) network element in the 5G network architecture shown in FIG. 2. The AF network element may be an operator AF network element, for example, a proxy-call session control function (P-CSCF), or may be a third-party AF network element. This is not limited in embodiments of this application.

If the AF network element is a third-party AF network element, information exchanged between the third-party AF network element and a network device or a network function (such as an OAM network element, an NWDAF network element, or an NEF network element) includes area information. The NWDAF network element or the NEF network element needs to be responsible for conversion between a network area (for example, a tracking area or a cell) type and a geographical area (for example, a global positioning system (GPS) location) type of an area. For example, the OAM network element sends information corresponding to a first area of the network area type to the third-party AF network element via the NWDAF network element or the NEF network element. In this case, the NWDAF network element or the NEF network element needs to convert the first area of the network area type into a first area of the geographical area type, and then send the first area of the geographical area type to the third-party AF network element, so that the third-party AF network element can identify information corresponding to the first area of the geographical area type. Conversely, for example, if the third-party AF network element sends information corresponding to a first area of the geographical area type to the OAM network element via the NWDAF network element or the NEF network element, the NWDAF network element or the NEF network element needs to convert the first area of the geographical area type into a first area of the network area type, and then send the information to the OAM network element, so that the OAM network element can identify the information corresponding to the first area of the network area type. Other conversion between area types related to a case in which the OAM network element interacts with the third-party AF network element via the NWDAF network element or the NEF network element may be defined according to the description herein. Details are not described again.

In the 5G network, as shown in FIG. 2, the data analytics network element 20 may be a network data analytics function (NWDAF) network element in the 5G network architecture, a management data analytics function (MDAF) network element in a network management system, or even a data analytics network element on a RAN side. The session management network element may be a session management function (SMF) network element in a 5GC.

In addition, as shown in FIG. 2, the 5G network architecture may further include a terminal, an access device (for example, an access network (AN) device or a radio access network (RAN) device), a policy control function (PCF) network element, a data network (DN), an access and mobility management function (AMF) network element, an authentication server function (auAUSF) network element, a network exposure function (NEF) network element, a unified data repository (UDR), a unified data management (UDM), or the like. This is not specifically limited in embodiments of this application.

The terminal communicates with the AMF network element through a next generation (Next generation, N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). The UPF network element communicates with an SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The UDM network element communicates with the UDR network element. The PCF network element communicates with the UDR network element.

FIG. 3 shows a service-based architecture of a 5G network architecture. A difference between the architecture and that in FIG. 2 lies in that control plane network elements in the 5GC in FIG. 3 may interact with each other through service-based interfaces. For example, an AMF network element, an AUSF network element, an SMF network element, a UDM network element, a UDR network element, an NEF network element, and a PCF network element interact with each other through service-based interfaces. For example, an external service-based interface provided by the AMF network element may be Namf. An external service-based interface provided by the SMF network element may be Nsmf. An external service-based interface provided by the UDM network element may be Nudm. An external service-based interface provided by the UDR network element may be Nudr. An external service-based interface provided by the PCF network element may be Npcf. An external service-based interface provided by the NEF network element may be Nnef. An external service-based interface provided by the NRF network element may be Nnrf. An external service-based interface provided by an NWDAF network element may be Nnwdaf. It should be understood that for related descriptions of names of various service-based interfaces in FIG. 3, refer to a diagram of a 5G system architecture in a conventional technology. Details are not described herein.

It should be noted that FIG. 2 and FIG. 3 merely provide examples of one PCF network element. Certainly, the 5G network architecture may include a plurality of PCF network elements, for example, include a PCF network element 1 and a PCF network element 2. This is not specifically limited in embodiments of this application. For a manner of connection between the network elements, refer to the 5G network architecture shown in FIG. 2 or FIG. 3. Details are not described herein again.

The AMF network element is mainly responsible for mobility management in a mobile network, such as user location update, registration of a user with a network, and user switching.

The SMF network element is mainly responsible for session management in the mobile network, such as session establishment, modification, and release. For example, specific functions are assignment of an IP address to a user and selection of a UPF network element that provides a packet forwarding function.

The PCF network element is configured to formulate a background data transfer policy.

The UDM network element or the UDR network element is configured to store user data, for example, a background data transfer policy.

The UPF network element is mainly responsible for processing a user packet, such as forwarding and charging for the user packet.

The DN refers to an operator network that provides a data transmission service for a terminal, for example, an IP multimedia service (IMS) or the Internet.

The data analytics network element is a network element device that can perform big data analytics, and may be but is not limited to a network data analytics function network element. For example, the network data analytics function network element may be an NWDAF. In this embodiment of this application, the data analytics network element can provide, for the network management network element or the application function network element, service experience/a quantity of application access times for the application that is created on the AS 60 and that is accessed by the terminal within the network area 1, to assist the network management network element or the application function network element in determining, based on the service experience/the quantity of application access times for the application accessed by the terminal within the network area 1, whether to create the UPF network element 80 and the AS 70 within the network area 1.

It may be understood that the UPF network element 50 in this embodiment of this application is a UPF network element selected by the session management network element for the terminal within the network area 1 to access the application created in the AS 60 within the network area 2. Although the terminal may access, within the network area 1 via the UPF network element 50, the application created on the AS 60, a large delay may be generated when the terminal accesses, within the network area 1 via the UPF network element 50, the application created on the AS 60, or service experience cannot be ensured. The UPF network element 80 and the AS 70 are re-created for the terminal within the network area 1 to reduce an access delay of the terminal or to ensure reliability of accessing the application by the terminal. In this way, the terminal can subsequently access, within the network area 1 via the UPF network element 80, the application created on the AS 70.

It should be noted that all network elements in embodiments of this application may be logical network elements or physical network element instances. For example, the UPF network element may be a UPF network element instance (UPF Instance). For descriptions of other network elements, refer to the descriptions herein. Details are not described again.

It should be noted that names of messages between network elements, names of parameters in the messages, or the like in the following embodiments of this application are merely examples, and there may be other names in a specific implementation. This is not specifically limited in embodiments of this application.

It should be noted that mutual reference may be made between embodiments of this application. For example, for same or similar steps, mutual reference may be made between a method embodiment, a communication system embodiment, and an apparatus embodiment. This is not limited.

In embodiments of this application, a communication method may be performed by a data analytics network element, or may be performed by a chip used in the data analytics network element. A communication method may be performed by a network management network element, or may be performed by a chip used in the network management network element. A communication method may be performed by an application function network element, or may be performed by a chip used in the application function network element. In the following embodiments, interaction between a data analytics network element, a network management network element, and an application function network element is used as an example to describe a communication method provided in an embodiment of this application.

Figure 4:
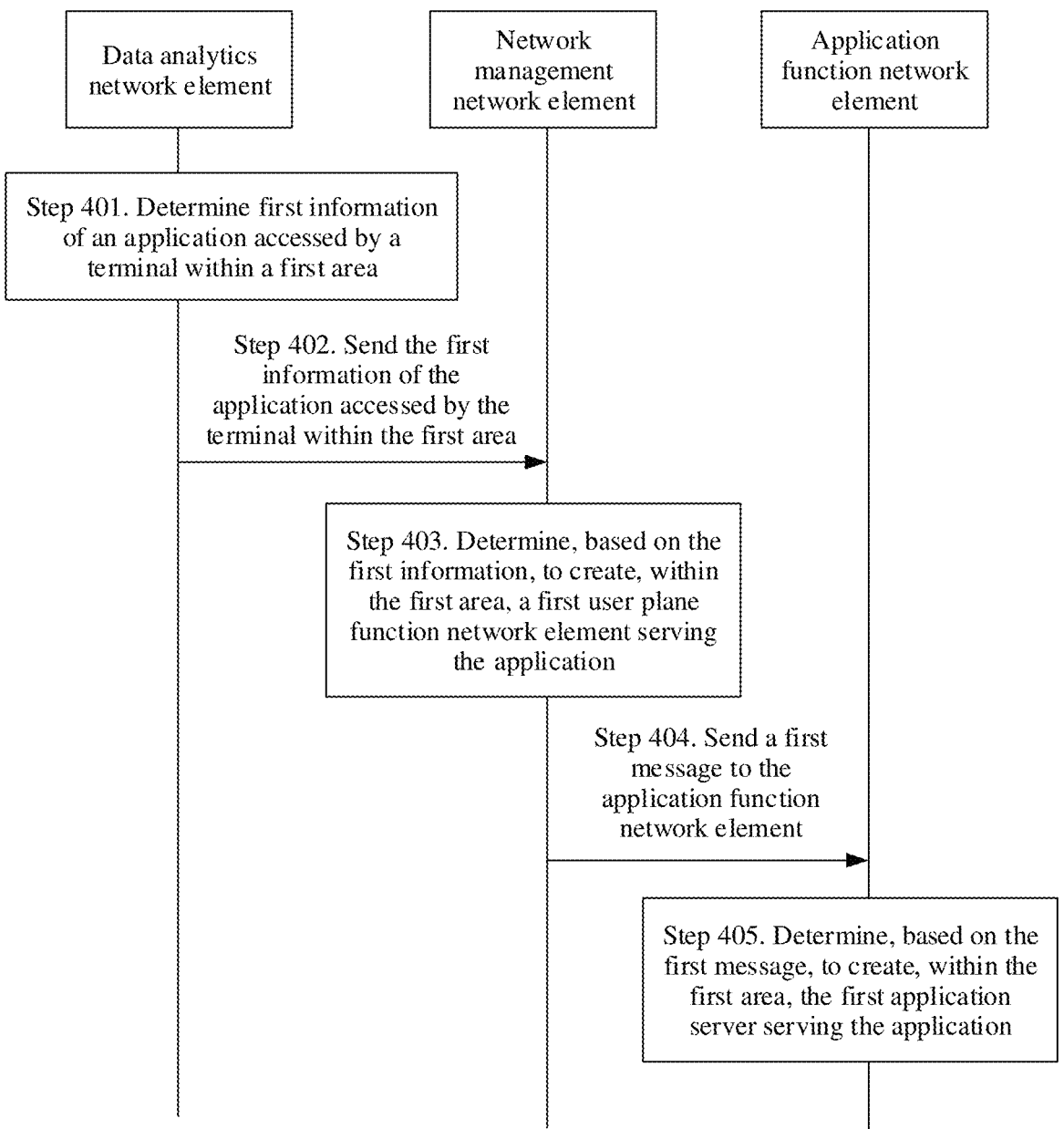
FIG. 4 is a schematic flowchart of a communication method according to an embodiment of this application.

An example in which the communication method provided in embodiments of this application is applied to the communication systems shown in FIG. 1 to FIG. 3 is used. FIG. 4 is a schematic interaction diagram of a communication method according to an embodiment of this application. The method includes the following steps.

Step 401. A data analytics network element determines first information of an application accessed by a terminal within a first area, where the first information includes a quantity of access times and/or service experience for the application.

For example, the first area may be the network area 1 described above. The data analytics network element may be the data analytics network element 10 shown in FIG. 1. The application is an application created on a second application server (for example, the AS 60), and the terminal may use a second user plane function network element (for example, the UPF network element 50 shown in FIG. 1) created within a second area (for example, the network area 2) to access the application created on the second application server.

In this embodiment of this application, the data analytics network element may actively determine the first information of the application accessed by the terminal within the first area, or the data analytics network element may be triggered (for example, step 501 to step 503) by another network element (for example, a network management network element or an application function network element) to determine the first information of the application accessed by the terminal within the first area. This is not limited in this embodiment of this application.

The quantity of access times for the application in this embodiment of this application may be replaced with an application access volume of the application or service dispersion for the application, that is, indicates a quantity of times that the application is accessed.

In this embodiment of this application, the quantity of access times for the application may be an average quantity of access times for the application, and the service experience for the application may be average service experience for the application. The service experience for the application may be represented by a level or a value. For example, the service experience for the application may be 3 points, or the service experience for the application is at a medium level.

In a possible implementation, the application is an application that is created on a second application server and that is accessed by the terminal within the first area via a second user plane function network element. One or more of the second user plane function network element and the second application server are created within a second area, and the first area and the second area are different areas.

If the second user plane function network element is created in TA1, and the second application server is created in TA2, the second area includes TA1 and TA2. Alternatively, if the second user plane function network element is created in TA1, and the second application server is also created in TA1, the second area includes TA1. In both cases, it may be considered that the second user plane function network element and the second application server are created in a same area.

In a possible implementation, there may be one or more terminals.

Step 402. The data analytics network element sends, to the network management network element, the first information of the application accessed by the terminal within the first area. Correspondingly, the network management network element receives, from the data analytics network element, the first information of the application accessed by the terminal within the first area.

For example, step 402 may be implemented in the following manner The data analytics network element sends a message X to the network management network element. Correspondingly, the network management network element receives the message X from the data analytics network element. The message X includes the first information of the application accessed by the terminal within the first area. For example, the message X includes an identifier of the terminal, an application identifier of the application, information about the first area, and the quantity of access times and/or the service experience for the application.

Step 403. The network management network element determines, based on the first information, to create, within the first area, a first user plane function network element serving the application.

In an example, the network management network element may determine to create, within a sub-area (for example, an area 1) of the first area, the first user plane function network In a possible implementation, step 403 in this embodiment of this application may be implemented by using step 504 and step 505 in the following embodiment. Details are not described herein.

It may be understood that the first user plane function network element serving the application means that all terminals that need to access the application may establish a session with the first user plane function network element to access the application.

In a possible implementation, that the network management network element determines to create, within the first area, the first user plane function network element serving the application includes: The network management network element determines that creation of the first user plane function network element serving the application has been triggered within the first area, or the network management network element determines that creation of the first user plane function network element serving the application is to be triggered within the first area.

Step 404. The network management network element sends a first message to the application function network element. Correspondingly, the application function network element receives the first message from the network management network element.

The first message indicates that the network management network element triggers creation, within the first area, of the first user plane function network element serving the application. Alternatively, the first message is used by the application function network element to determine to create, within the first area, a first application server serving the application.

For example, the first message may carry a first indication, and the first indication indicates that the network management network element triggers creation, within the first area, of the first user plane function network element serving the application. Alternatively, the first indication is used by the application function network element to determine to create, within the first area, the first application server serving the application.

In a possible implementation, that the first message indicates that the network management network element triggers creation, within the first area, of the first user plane function network element serving the application includes: The first message indicates that the network management network element has triggered, within the first area, creation of the first user plane function network element serving the application, or the first message indicates that the network management network element is to trigger, within the first area, creation of the first user plane function network element serving the application.

In a possible implementation, step 404 provided in this embodiment of this application may be implemented in the following manner The network management network element sends the first message to the application function network element via the data analytics network element and/or a network exposure network element.

Specifically, the network management network element sends the first message to the data analytics network element, so that the data analytics network element and/or the network exposure network element send/sends the first message to the application function network element.

Step 405. The application function network element determines, based on the first message, to create, within the first area, the first application server serving the application. The application is an application that is created on the second application server and that is accessed by the terminal within the first area.

In a possible example, the application is an application that is created on the second application server and that is accessed by the terminal within the first area via the second user plane function network element created within the second area.

In this embodiment of this application, the first application server serving the application may mean that the application may be created on the first application server, so that the terminal accesses, within the first area via the first user plane function network element created within the first area, the application created on the first application server.

In one case, if the network management network element has triggered, before sending the first message, an operation of creating the first user plane function network element within the first area, the first message indicates that the network management network element has triggered the operation of creating the first user plane function network element within the first area. Correspondingly, after receiving the first message, the application function network element may determine that the first user plane function network element serving the application is prepared to be created or has been created within the first area. In another case, if the network management network element prepares to create the first user plane function network element within the first area before sending the first message, the first message indicates that the network management network element is to trigger an operation of creating the first user plane function network element within the first area. Correspondingly, after receiving the first message, the application function network element may determine that the network management network element is to trigger the operation of creating, within the first area, the first user plane function network element serving the application. Alternatively, in still another case, if the network management network element does not trigger, before sending the first message, an operation of creating the first user plane function network element within the first area, the first message may indicate, to the application function network element, that the network management network element is to trigger or expects to trigger the operation of creating, within the first area, the first user plane function network element serving the application. If the first user plane function network element has been successfully created within the first area before the network management network element sends the first message to the application function network element, the first message may indicate that the first user plane function network element has been successfully created within the first area.

In an example, the application function network element may determine to create, within a sub-area (for example, an area 2) of the first area, the first application server serving the application. The area 2 and the area 1 may be a same area, or may be different areas. This is not limited in this embodiment of this application. Both the area 1 and the area 2 are located within the first area.

For example, the first area is an area A, the second area is an area B, the second user plane function network element is a UPF network element 1, and the second application server is an application server 70. The data analytics network element sends, to the network management network element, a quantity of access times/service experience for an application that is created on the application server 70 in the area B and that is accessed by the terminal in the area A via the UPF network element 1. The network management network element determines, based on the quantity of access times/the service experience for the application that is created on the application server 70 in the area B and that is accessed by the terminal in the area A, to create a UPF network element 80 (corresponding to the foregoing first user plane function network element) for the terminal in the area A. Then, the network management network element triggers the application function network element to create an application server 2 (corresponding to the foregoing first application server) for the terminal in the area A, to collaboratively create, in the area A in which the terminal is located, the application server 2 and the UPF network element 80 serving the application, so that the terminal can subsequently access, via the UPF network element 80, the application created on the application server 2.

It may be understood that after the first user plane function network element is created within the first area, not only the terminal but also another terminal that needs to access the service can access, via the first user plane function network element, the application created on the first application server within the first area.

In a possible implementation, the first message may further include the first information, so that the application function network element determines, based on the first information, to create, within the first area, the first application server serving the application. Correspondingly, if the first message carries the first information, step 404 may be implemented in the following manner If determining, based on the first information, that the quantity of access times for the application is greater than or equal to a first threshold and/or the service experience for the application is less than or equal to a second threshold, the application function network element determines to create, within the first area, the first application server serving the application.

According to the communication method provided in this embodiment of this application, the network management network element determines, based on the first information that is from the data analytics network element and that is of the application accessed by the terminal within the first area, that the first user plane function network element serving the application needs to be created within the first area. Then, the network management network element sends the first message to the application function network element, where the first message indicates that the network management network element triggers creation, within the first area, of the first user plane function network element serving the application, so that the application function network element determines, based on the first message, to create, within the first area, a first application server serving the application. In this solution, the network management network element determines, based on the quantity of access times and/or the service experience for the application accessed by the terminal within the first area, to create, within the first area, the first user plane function network element serving the application. In this way, the first user plane function network element created within the first area can meet an application access requirement. In addition, based on triggering by the first message, the application function network element and the network management network element may collaboratively create the first user plane function network element and the first application server within the first area, so that a control plane network element subsequently offloads a service flow of the terminal to the first user plane function network element within the first area. In this way, the terminal accesses, within the first area via the first user plane function network element, the application created on the first application server, thereby laying a basis for service offloading, and improving service experience for accessing the application by the terminal.

In this embodiment of this application, the network management network element may perform step 404 in a process of triggering the operation of creating the first user plane function network element within the first area, or the network management network element may perform step 404 before triggering the operation of creating the first user plane function network element within the first area. This is not limited in this embodiment of this application.

In the embodiment shown in FIG. 4, step 404 of the method provided in this embodiment of this application may be replaced in the following manner The network management network element sends a message y to the application function network element, where the message y is used by the application function network element to determine to create the first user plane function network element and the first application server within the first area. Step 405 may be replaced in the following manner The application function network element determines, based on the message y, to create the first user plane function network element and the first application server within the first area. Then, the application function network element triggers an operation of creating the first user plane function network element within the first area and an operation of creating the first application server within the first area. In other words, the network management network element determines, based on the first information, that the first user plane function network element needs to be created within the first area, but the operation of triggering creation of the first user plane function network element and the first application server within the first area is performed by the application function network element.

It should be noted that, in this embodiment, an example in which the network management network element is an execution entity that creates or triggers creation of the first user plane function network element is used, but the execution entity is not limited to the network management network element. The execution entity may also be another network element or device responsible for network element creation or triggering network element creation. This is not limited in this embodiment of this application.

As described above, the data analytics network element may actively provide the network management network element with the first information of the application accessed by the terminal within the first area. The following mainly describes, by using step 501 to step 503, a process in which the data analytics network element provides, based on triggering by the network management network element, the network management network element with the first information of the application accessed by the terminal within the first area. For a specific process, refer to the embodiment shown in FIG. 5A and FIG. 5B.

FIG. 5A and FIG. 5B show another communication method according to an embodiment of this application. The communication method includes step 501 to step 512. In the embodiment shown in FIG. 5A and FIG. 5B, an example is used in which a network management network element triggers an operation of creating a first user plane function network element within a first area and then notifies an application function network element to trigger an operation of creating the first user plane function network element within the first area.

Step 501. The network management network element sends a first request to a data analytics network element. Correspondingly, the data analytics network element receives the first request from the network management network element. The first request is for requesting first information of an application accessed by a terminal within the first area.

In a possible implementation, at an initial stage of network creation or an initial stage of application creation, the network management network element sends the first request to the data analytics network element. In this way, the network management network element can be assisted in gaining insight into whether a quantity of access times or service experience for the application accessed by the terminal matches network creation and/or application creation.

In an example, the first request carries indication information x, and the indication information x is for requesting the first information of the application accessed by the terminal within the first area.

In another example, the first request includes one or more of the following information: an application identifier of the application and information about a third area, where the first area is a sub-area of the third area, or the first area is the third area. The first request carries one or more of the application identifier of the application and the information about the third area, so that the data analytics network element determines the application identifier of the application requested by the network management network element and the information about the third area in which the terminal is located. For example, the first request may further carry an identifier of the terminal, so that the data analytics network element determines, based on the identifier of the terminal, the terminal that accesses the application.

For example, the information about the third area is used to determine the third area. For example, the third area may be at least one of a tracking area (TA) a tracking area list (TA list), a routing area (RA), an RA list, a cell, a cell list, a global positioning system (GPS (global position system, physical area)), or a GPS list. Descriptions are uniformly provided herein, and details are not described subsequently. The GPS list includes one or more physical areas. The TA list includes one or more TAs. The cell list includes one or more cells. The TA, the RA, and the cell are areas of a network area type, and the GPS is an area of a geographical or physical area type.

In a possible implementation, the first request further includes information about a first time period. Correspondingly, in this embodiment of this application, the first information includes a quantity of access times and/or service experience for the application in a second time period, or the first information includes a quantity of access times and/or service experience corresponding to the application in a second time period, where the second time period is a sub-time period of the first time period, or the second time period and the first time period are a same time period. The information about the first time period is used to determine the first time period (for example, 00:00 to 05:00). For example, a type of the first time period or the second time period may be at least one of a time window, a timestamp, and a time interval. The information about the first time period is carried in the first request, so that the data analytics network element determines the first information of the application that the network management network element requests the terminal to access within the first area in the first time period. In addition, a range the first information, determined by the data analytics network element, of the application can be narrowed down.

Step 502 is the same as step 401. Details are not described herein again.

Step 503. The data analytics network element sends, to the network management network element, the first information of the application that is accessed by the terminal within the first area via a second user plane function network element. Correspondingly, the network management network element receives, from the data analytics network element, the first information of the application accessed by the terminal within the first area via the second user plane function network element. In other words, the first information is information about the application accessed by the terminal within the first area via the second user plane function network element.

The second user plane function network element is created within a second area (for example, the network area 2 described in FIG. 1), the application is created on a second application server located within the second area, and the first area and the second area are different areas. Alternatively, the second application server is created in a fourth area (for example, the network area 2 described in FIG. 1). The first area and the second area are different areas, and the first area and the fourth area are different areas. If the second area and the fourth area are different, the second area and the fourth area are different sub-areas of the network area 2. If the second area and the fourth area are the same, both the second area and the fourth area are the network area 2, or the second area and the fourth area are a same sub-area of the network area 2.

Although the second application server is created in the fourth area, and the second user plane function network element is created within the second area, the terminal may access, within the first area via the second user plane function network element, the application created on the second application server.

It should be noted that if the data analytics network element actively determines to send, to the network management network element, the first information of the application that is accessed by the terminal within the first area via the second user plane function network element, step 501 may be omitted. In other words, step 501 is an optional step.

In a possible implementation, after receiving, from the data analytics network element, the first information of the application that is accessed by the terminal within the first area via the second user plane function network element, the network management network element may send feedback information to the data analytics network element, where the feedback information indicates that the first information of the application that is accessed by the terminal within the first area via the second user plane function network element is successfully received.

Step 504. The network management network element determines, based on the first information, that the quantity of access times is greater than or equal to a first threshold and/or the service experience is less than or equal to a second threshold.

Step 505. The network management network element determines to create, within the first area, the first user plane function network element serving the application.

In a possible embodiment, as shown in FIG. 5A and FIG. 5B, after step 505, the method provided in this embodiment of this application may further include the following step.

Step 506. The network management network element triggers an operation of creating, within the first area, the first user plane function network element serving the application.

For example, the network management network element creates the first user plane function network element. In a possible implementation, step 506 in this embodiment of this application may be implemented in the following manner The network management network element creates, within the first area, the first user plane function network element serving the application.

For example, another network element creates the first user plane function network element. In another possible implementation, step 506 in this embodiment of this application may be implemented in the following manner The network management network element sends a first prompt message, where the first prompt message is used to prompt to create, within the first area, the first user plane function network element serving the application.

Based on the first prompt message, a process of creating, within the first area, the first user plane function network element serving the application may be implemented by another network element or manually.

In a possible implementation, step 506 provided in this embodiment of this application may be implemented in the following manner The network management network element generates, based on the first information, requirement information for creating the first user plane function network element, where the requirement information includes one or more of the following information: information about the first area, an identifier of the application, and a configuration parameter of the first user plane function network element; and the network management network element sends, to a network functions virtualization (NFV) device, the requirement information for creating the first user plane function network element.

In a possible implementation, the configuration parameter of the first user plane function network element includes one or more of the following information corresponding to the first user plane function network element: an identifier, a type, a host address, a location, and a capacity of an instance.

In a possible implementation, the NFV device creates or generates the first user plane function network element based on the requirement information for creating the first user plane function network element. For example, the NFV device creates or generates, within the first area based on the configuration parameter of the first user plane function network element, the first user plane function network element that can serve the application.

In a possible implementation, the NFV device may be a network functions virtualization orchestrator (NFVO).

Further, before step 506, the method provided in this embodiment of this application may further include: The network management network element determines that no user plane function network element serving the application has been created within the first area.

If the network management network element determines that a user plane function network element serving the application has been created within the first area, but load of the user plane function network element is higher than a preset load threshold, or the user plane function network element temporarily cannot serve the application due to a factor such as a fault, the network management network element can still trigger the operation of creating, within the first area, the first user plane function network element serving the application.

It should be noted that, for example, the first area has one or more user plane function network element, but the one or more user plane function network elements are not previously configured to serve the application. For example, the network management network element creates the first user plane function network element. In this case, the network management network element may select one user plane function network element from the one or more user plane function network elements as the first user plane function network element. In other words, the network management network element may configure the selected user plane function network element to serve the application. Alternatively, the network management network element creates a user plane function network element within the first area as the first user plane function network element, to serve the application.

Step 507 and step 508 are the same as step 404 and step 405. Details are not described herein again.

In a possible implementation, step 508 or step 405 in this embodiment of this application may be implemented in the following manner When the first area does not have a first application server serving the application, the application function network element determines to create, within the first area, the first application server serving the application. Alternatively, in a possible implementation, step 508 or step 405 in this embodiment of this application may be implemented in the following manner Although there is an application server serving the application within the first area, load of the application server is higher than a preset server load threshold, or the application server temporarily cannot serve the application due to a factor such as a fault, the application function network element still determines to create, within the first area, the first application server serving the application.

Step 509. The application function network element triggers an operation of creating the first application server within the first area.

In an example, step 509 may be implemented in the following manner The application function network element creates the first application server within the first area.

In another example, step 509 may be implemented in the following manner The application function network element sends second prompt information, where the second prompt information is used to prompt to create the first application server within the first area. In this way, a device that subsequently receives the second prompt information may create the first application server within the first area, or the first application server is manually created within the first area. This is not limited in this embodiment of this application.

In a possible embodiment, after step 509, the method provided in this embodiment of this application may further include: After the first application server is successfully created, the application function network element sends a third response message to the network management network element. Correspondingly, the network management network element receives the third response message from the application function network element. The third response message indicates that the first application server serving the application has been successfully created within the first area. For example, the third response message carries a creation success indication, and the creation success indication indicates that the first application server serving the application has been successfully created within the first area.

In a possible embodiment, as shown in FIG. 5A and FIG. 5B, after step 509, the method provided in this embodiment of this application may further include the following step.

Step 510. After the first application server is successfully created, the application function network element determines a first identifier of the first application server.

For example, the first identifier is used to identify the first application server. For example, the first identifier may be a data network access identifier (DNAI). If the first application server is a newly created application server within the first area, the first identifier may be allocated by the application function network element to the first application server.

Step 511. The application function network element sends a correspondence among the first identifier, the application identifier of the application, and the information about the first area to a control plane network element. Correspondingly, the control plane network element receives, from the application function network element, the correspondence among the first identifier, the application identifier of the application, and the information about the first area. The correspondence is used to determine that the first application server serving the application determined by the application identifier is created within the first area. Alternatively, the application function network element sends one or more of the first identifier, the application identifier of the application, and the information about the first area to the control plane network element.

In a possible implementation, step 511 in this embodiment of this application may be implemented in the following manner The application function network element sends the correspondence among the first identifier, the application identifier of the application, and the information about the first area to a network storage network element, so that the network storage network element sends the correspondence among the first identifier, the application identifier of the application, and the information about the first area to the control plane network element. For example, the control plane network element may be the SMF network element or the PCF network element described above. It should be understood that, after receiving the correspondence among the first identifier, the application identifier of the application, and the information about the first area, the network storage network element may store the correspondence. When the control plane network element subsequently subscribes to the correspondence among the first identifier, the application identifier of the application, and the information about the first area from the network storage network element, the network storage network element sends the correspondence among the first identifier, the application identifier of the application, and the information about the first area to the control plane network element.

It may be understood that after obtaining the correspondence among the first identifier, the application identifier of the application, and the information about the first area, the control plane network element may determine that the first application server serving the application has been created within the first area, and therefore, inserting a network element (for example, a UL CL or a BP) supporting service offloading for one or more terminals that access the application within the first area. These terminals access the application created on the first application server within the first area. In this way, service experience is guaranteed.

It may be understood that, after the first application server is successfully created, the network management network element or the application function network element may further trigger a network element having a function of creating the application to create the application on the first application server.

In a possible embodiment, as shown in FIG. 5A and FIG. 5B, after step 509, the method provided in this embodiment of this application may further include the following step.

Step 512. After the first application server is successfully created, the application function network element sends a second message to a control plane network element. Correspondingly, the control plane network element receives the second message from the application function network element. The second message is used to notify the control plane network element that the first application server serving the application is successfully created within the first area.

Correspondingly, the second message may carry a success indication, and the success indication is used to notify the control plane network element that the first application server serving the application is successfully created within the first area.

It should be noted that, after the first application server is successfully created, the application function network element may choose to perform either of step 512 and step 511 in this embodiment of this application.

In a possible implementation, the application function network element in this embodiment of this application may further send the correspondence among the first identifier, the application identifier of the application, and the information about the first area to the network storage network element. In this way, the network storage network element may send the correspondence among the first identifier, the application identifier of the application, and the information about the first area to the control plane network element based on a request of the control plane network element. Alternatively, the network storage network element may send the second message to the control plane network element based on a request of the control plane network element. This is not limited in this embodiment of this application.

In a possible implementation, after the first application server is successfully created in this embodiment of this application, the method provided in this embodiment of this application may further include: The application function network element sends a first response message to the network management network element, where the first response message indicates that the first application server has been successfully created within the first area.

In a possible implementation, the first response message may further carry information about a specific area created by the first application server within the first area and the first identifier.

It may be understood that, in the embodiment shown in FIG. 5A and FIG. 5B, if the network management network element determines that the first user plane function network element serving the terminal exists within the first area, but the first application server serving the application does not exist within the first area, the network management network element can still send the first message to the application function network element, so that the application function network element triggers, in a timely manner, the operation of creating the first application server within the first area. In this way, the first area has both the first user plane function network element serving the terminal and the first application server serving the application.

It may be understood that, in this embodiment of this application, creating the first application server further includes creating, on the first application server, the application accessed by the terminal.

Figure 6A:
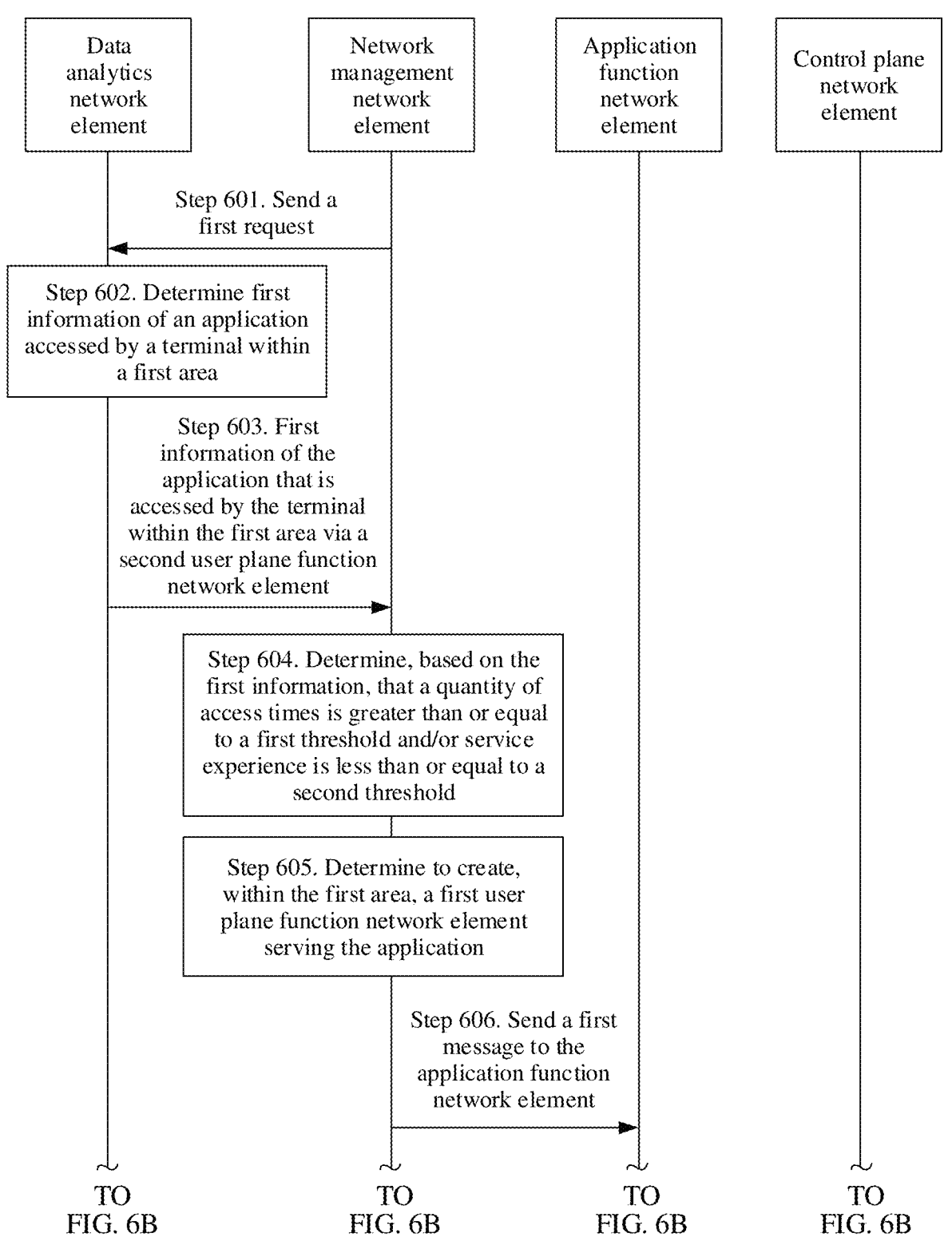

FIG. 6A and FIG. 6B show another communication method according to an embodiment of this application. The communication method includes step 601 to step 613.

Step 601 to step 605 are the same as step 501 to step 505, step 606 is the same as step 507, and step 607 and step 608 are the same as step 508 and step 509.

In a possible implementation, after step 608, the method provided in this embodiment of this application may further include the following steps.

Step 609. The application function network element sends an acknowledgment message to the network management network element. Correspondingly, the network management network element receives the acknowledgment message from the application function network element. The acknowledgment message indicates that the network management network element is allowed to create, within the first area, the first user plane function network element serving the application, and/or the acknowledgment message indicates that the network management network element is allowed to create, within the first area, the first application server serving the application.

It should be noted that, if the acknowledgment message indicates that the network management network element is allowed to create, within the first area, the first application server serving the application, the operation of creating the first application server within the first area is triggered by the network management network element. In this case, the application function network element may skip the operation of triggering the creation of the first application server in the first are. In other words, subsequent step 608 may be omitted. After obtaining the acknowledgment message of the application function network element, the network management network element not only triggers the operation of creating, within the first area, the first user plane function network element serving the application, but also may trigger the operation of creating, within the first area, the first application server serving the application.

It may be understood that, in the embodiment shown in FIG. 6A and FIG. 6B, the first message is used by the network management network element and the application function network element to negotiate to determine whether the first user plane function network element and the first application server serving the application can be created within the first area. Alternatively, the network management network element queries, based on the first message, whether the first user plane function network element and the first application server serving the application can be created within the first area.

Step 610 is the same as step 506. Details are not described herein again.

Step 611 to step 613 are the same as step 510 to step 512. Details are not described herein again.

It may be understood that a difference between the embodiment described in FIG. 5A and FIG. 5B and the embodiment described in FIG. 6A and FIG. 6B lies in that: In FIG. 5A and FIG. 5B, if determining, based on the first information, that the quantity of access times is greater than or equal to the first threshold and/or the service experience is less than or equal to the second threshold, the network management network element determines to create the first user plane function network element within the first area, and then the network management network element triggers the operation of creating the first user plane function network element. In the embodiment described in FIG. 6A and FIG. 6B, if determining, based on the first information, that the quantity of access times is greater than or equal to the first threshold and/or the service experience is less than or equal to the second threshold, the network management network element determines to create the first user plane function network element within the first area, then the network management network element negotiates with the application function network element based on the first message, and the network management network element triggers, after obtaining permission of the application function network element, the operation of creating, within the first area, the first user plane function network element serving the application, or the operation of creating, within the first area, the first application server serving the application.

Figure 7A:
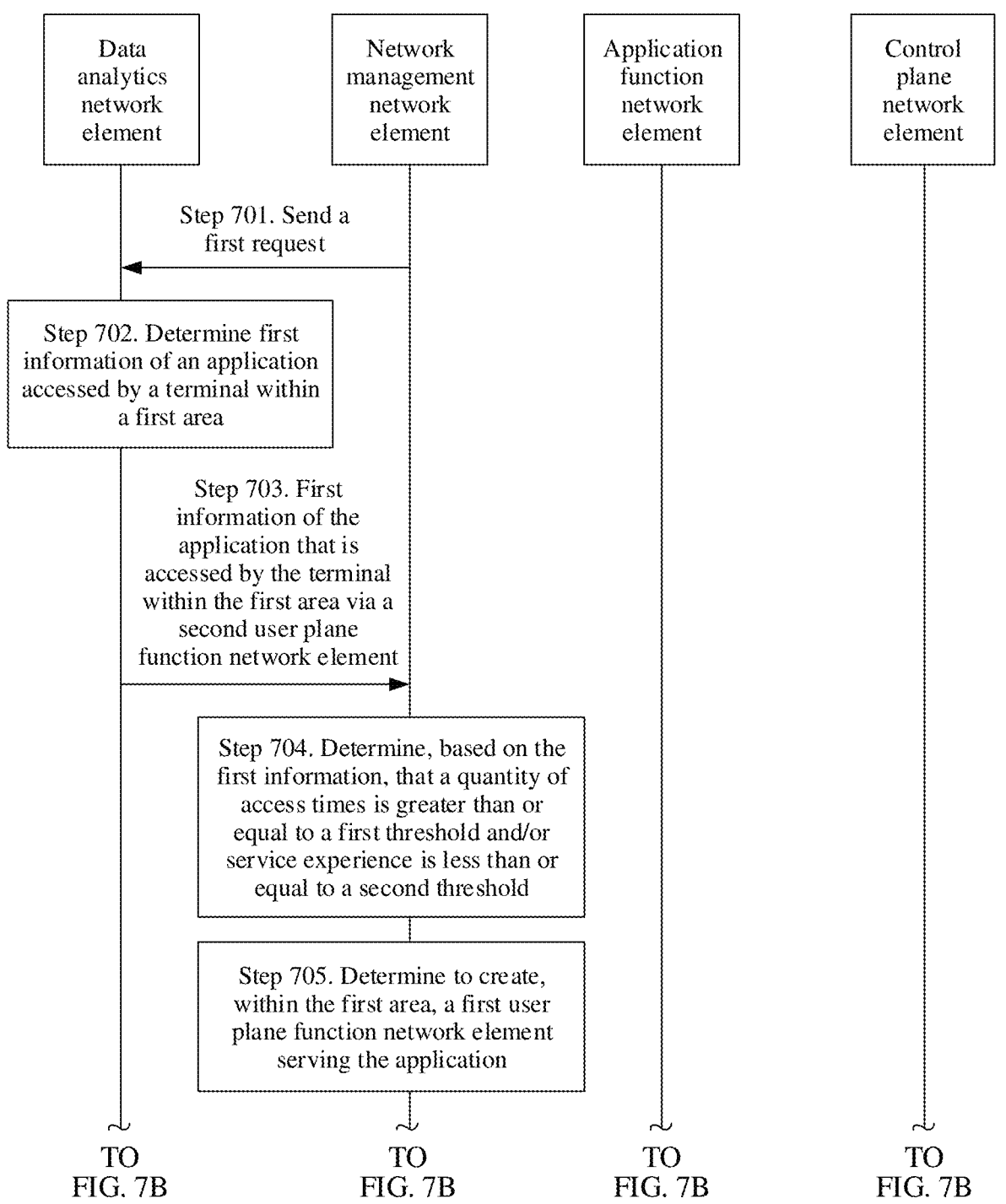

FIG. 7A and FIG. 7B show another communication method according to an embodiment of this application. The communication method includes step 701 to step 710.

Step 701 to step 706 are the same as step 501 to step 506. Details are not described herein again.

As shown in FIG. 7A and FIG. 7B, after the network management network element obtains the first information, the method provided in this embodiment of this application may further include the following steps.

Step 707. The network management network element triggers, based on the first information, an operation of creating, within the first area, a first application server serving the application.

It may be understood that the first application server may be created by the network management network element, or the first application server may be created within the first area by another network element (for example, an application function network element) through notification by the network management network element. Alternatively, based on triggering of the network management network element, the first application server is manually created.

In a possible implementation, step 707 in this embodiment of this application may be implemented in the following manner The network management network element determines, based on the first information, that the quantity of access times is greater than or equal to the first threshold and/or the service experience is less than or equal to the second threshold; and the network management network element triggers the operation of creating, within the first area, the first application server serving the application.

In a possible implementation, a prerequisite for triggering, by the network management network element, the operation of creating, within the first area, the first application server serving the application is that no application server serving the application exists within the first area.

Step 708. The network management network element sends, to the application function network element, the information about the first area, the identifier of the application, an indication indicating that the first user plane function network element has been created, and a first identifier. Correspondingly, the application function network element receives, from the network management network element, the information about the first area, the identifier of the application, the indication indicating that the first user plane function network element has been created, and the first identifier.

Step 708 may be implemented in the following manner The network management network element sends the information about the first area, the identifier of the application, the indication indicating that the first user plane function network element has been created, and the first identifier to the application function network element via the data analytics network element.

Step 709 and step 710 are the same as step 511 and step 512. Details are not described herein again.

In the embodiment shown in FIG. 7A and FIG. 7B, both the action of determining to create the first user plane function network element and the action of creating the first application server are performed by the network management network element.

It may be understood that, in the embodiment shown in FIG. 7A and FIG. 7B, if the network management network element determines that the first user plane function network element serving the terminal exists within the first area, but the first application server serving the application does not exist within the first area, the network management network element can still trigger, based on the first information, the operation of creating, within the first area, the first application server serving the application. In this way, the first area has both the first user plane function network element serving the terminal and the first application server serving the application. Alternatively, in the embodiment shown in FIG. 7A and FIG. 7B, if the network management network element determines that the first user plane function network element serving the terminal does not exist within the first area, but the first application server serving the application exists within the first area, the network management network element can still trigger, based on the first information, the operation of creating, within the first area, the first user plane function network element serving the application. In this way, the first area has both the first user plane function network element serving the terminal and the first application server serving the application.

Figure 8:
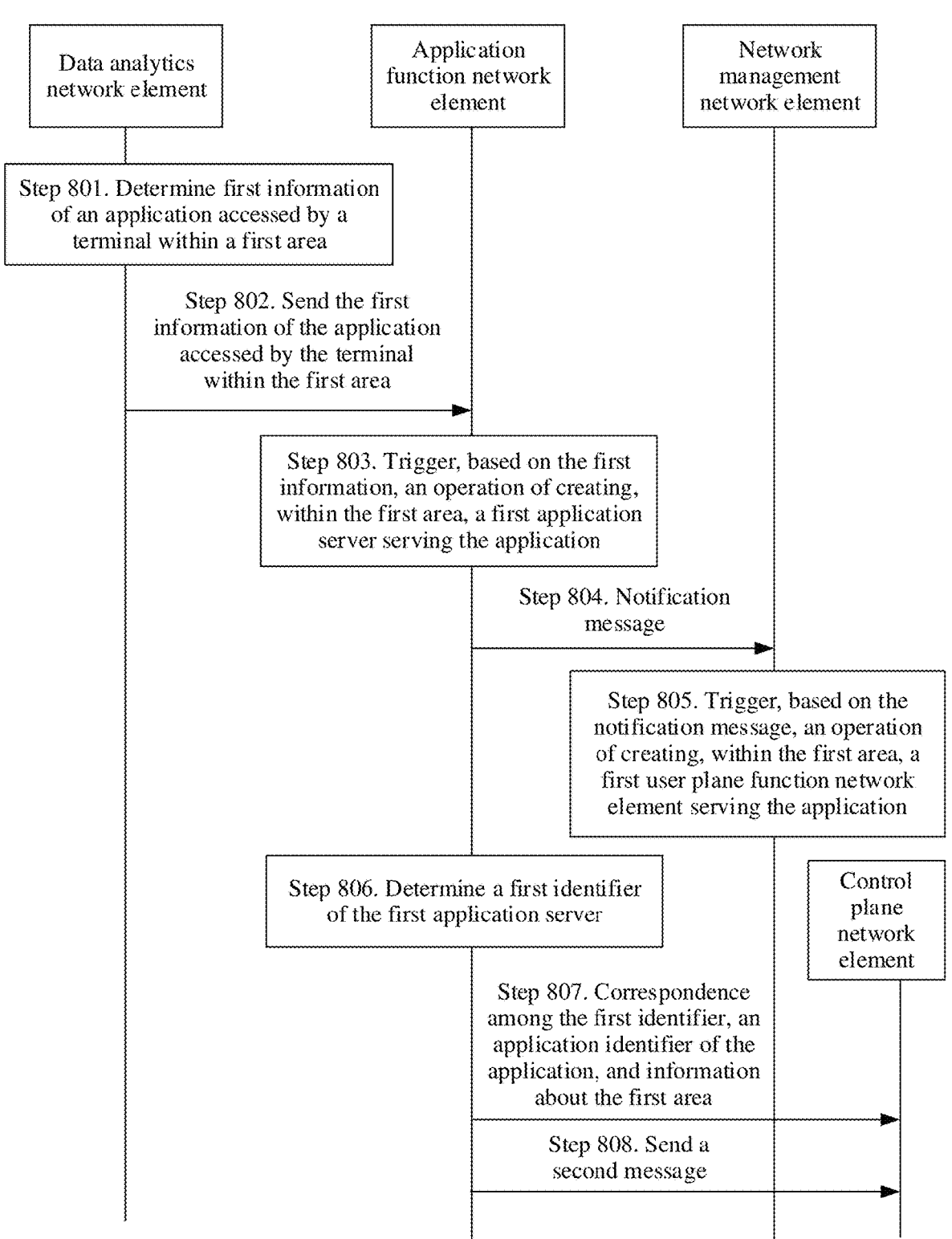
FIG. 8 is a schematic flowchart of a communication method of another embodiment according to embodiments of this application.

FIG. 8 shows another communication method according to an embodiment of this application. The method includes the following steps.

Step 801 is the same as step 401. Details are not described herein again.

In an example, the application is an application that is created on a second application server and that is accessed by the terminal within the first area via a second user plane function network element, the second user plane function network element and the second application server are created within a second area, and the first area and the second area are different areas.

Step 802. The data analytics network element sends, to an application function network element, the first information of the application accessed by the terminal within the first area. Correspondingly, the application function network element receives, from the data analytics network element, the first information of the application accessed by the terminal within the first area, where the first information includes a quantity of access times and/or service experience for the application in a second time period.

Step 803. The application function network element triggers, based on the first information, an operation of creating, within the first area, a first application server serving the application.

In an example, step 803 in this embodiment of this application may be implemented in the following manner If the application function network element determines, based on the first information, that the quantity of access times is greater than or equal to a first threshold and/or the service experience is less than or equal to a second threshold, the application function network element determines that the first application server serving the application needs to be created within the first area.

It may be understood that, before the application function network element triggers the operation of creating, within the first area, the first application server serving the application, although a plurality of application servers may exist within the first area, the first application server serving the application accessed by the terminal does not exist within the first area.

Step 804. The application function network element sends a notification message to a network management network element. Correspondingly, the network management network element receives the notification message from the application function network element. The notification message is used by the network management network element to determine to create, within the first area, a first user plane function network element serving the application.

In an example, the notification message indicates that the first application server serving the application has been created within the first area, or the notification message indicates that the first application server serving the application is to be created within the first area.

Step 805. The network management network element triggers, based on the notification message, an operation of creating, within the first area, the first user plane function network element serving the application.

In an example, step 805 may be implemented in the following manner The network management network element determines, based on the notification message, that the first user plane function network element serving the application needs to be created within the first area, and currently, there is no first user plane function network element serving the application within the first area. The network management network element triggers an operation of creating, within the first area, the first user plane function network element serving the application.

It may be understood that, if the network management network element determines, after receiving the notification message, that the first user plane function network element serving the application currently exists within the first area, the operation of triggering, by the network management network element, creation of the first user plane function network element serving the application within the first area may be omitted.

In a possible embodiment, step 803 may be implemented in the following manner The application function network element sends a negotiation message to the network management network element based on the first information, where the negotiation message is used to negotiate whether to create, within the first area, the first application server serving the application. The application function network element receives an answer response from the network management network element, where the answer response indicates that the application function network element is allowed to create, within the first area, the first application server serving the application. Then the application function network element determines, based on the answer response, to create, within the first area, the first application server serving the application. In this solution, the application function network element can negotiate with the network management network element to deploy the first application server serving the application.

In a possible implementation, the negotiation message carries the first information, so that the network management network element determines, based on the first information, that the quantity of access times for the application is greater than or equal to the first threshold and/or the service experience is less than or equal to the second threshold, and then allows the application function network element to create, within the first area, the first application server serving the application.

In a possible implementation, that the application function network element sends the negotiation message to the network management network element based on the first information may be implemented in the following manner If determining that the quantity of access times is greater than or equal to the first threshold and/or the service experience is less than or equal to the second threshold, the application function network element sends the negotiation message to the network management network element. In an alternative implementation, the negotiation message may not carry the first information, but carry indication information indicating that the quantity of access times is greater than or equal to the first threshold and/or the service experience is less than or equal to the second threshold.

In a possible embodiment, the method provided in this embodiment of this application may further include: The application function network element triggers the operation of creating, within the first area, the first application server serving the application. The operation of triggering, by the application function network element, creation of the first application server serving the application within the first area may be performed before the application function network element sends the notification message, or the operation of triggering, by the application function network element, creation of the first application server serving the application within the first area may be performed after the application function network element sends the notification message.

In a possible embodiment, after the first user plane function network element serving the application is created within the first area, the network management network element may send a second response message to the application function network element. Correspondingly, the application function network element receives the second response message from the network management network element. The second response message indicates that the first user plane function network element serving the application has been created within the first area. The second response message is used by the application function network element to determine that the first user plane function network element has been successfully created.

In a possible embodiment, before step 801, the method provided in this embodiment of this application may further include: The application function network element sends a first request to the data analytics network element. Correspondingly, the data analytics network element receives the first request from the application function network element.

Specifically, for content of the first request in the embodiment shown in FIG. 8, refer to the description in the embodiment shown in FIG. 5A and FIG. 5B. Details are not described herein again.

In a possible embodiment, after the first application server is successfully created in the method provided in this embodiment of this application, the method provided in this embodiment of this application may further include step 806 and step 807. Step 806 and step 807 are the same as step 510 and step 511. Details are not described herein again.

In a possible embodiment, after the first application server is successfully created in the method provided in this embodiment of this application, the method provided in this embodiment of this application may further include step 808. Step 808 is the same as step 512. Details are not described herein again.

In a possible embodiment, that the application function network element receives, from the data analytics network element, the first information of the application accessed by the terminal within the first area includes: The application function network element receives, from the data analytics network element, first information of an application that is created on a second application server and that is accessed by the terminal within the first area via a second user plane function network element, where the second user plane function network element and/or the second application server are/is created within a second area, and the first area and the second area are different areas.

It should be understood that, after the network management network element determines that the first user plane function network element is successfully created within the first area, the network management network element may further send a notification response to the application function network element, where the notification response indicates that the first user plane function network element is successfully created within the first area.

The foregoing embodiment describes a process in which the data analytics network element sends the first information to the application function network element or the network management network element after obtaining the first information, so that the application function network element or the network management network element determines, based on the first information, whether to create the first application server or the first user plane function network element within the first area. Certainly, in this embodiment of this application, if the data analytics network element determines, based on the first information after obtaining the first information, that the quantity of access times is greater than or equal to the first threshold and/or the service experience is less than or equal to the second threshold, the data analytics network element may send a message z to the network management network element, where the message z is used by the network management network element to determine that the first user plane function network element needs to be created within the first area, or the message z is used by the network management network element to determine that the first user plane function network element and the first application server need to be created within the first area. Alternatively, if the data analytics network element determines that the quantity of access times is greater than or equal to the first threshold and/or the service experience is less than or equal to the second threshold, the data analytics network element may send a message m to the application function network element, where the message m is used by the application function network element to determine that the first application server needs to be created within the first area. Alternatively, the message m is used by the application function network element to determine that the first application server and the first user plane function network element need to be created within the first area. This is not limited in this embodiment of this application. In other words, in this case, the data analytics network element determines, based on the first information, that the first user plane function network element and the first application server need to be created within the first area, but an action of creating the first user plane function network element and the first application server is still performed by the network management network element or the application function network element.

In a possible implementation, the network management network element may determine, based on the first information, that the first application server or the first user plane function network element needs to be created within the first area, but the network management network element notifies the application function network element to create the first application server or the first user plane function network element within the first area. In other words, the network management network element determines that the first application server or the first user plane function network element needs to be created within the first area, but a creation action is performed by the application function network element.

In a possible implementation, the application function network element may determine, based on the first information, that the first application server or the first user plane function network element needs to be created within the first area, but the application function network element notifies the network management network element to create the first application server or the first user plane function network element within the first area. In other words, the application function network element determines that the first application server or the first user plane function network element needs to be created within the first area, but a creation action is performed by the network management network element.

Figure 9A:
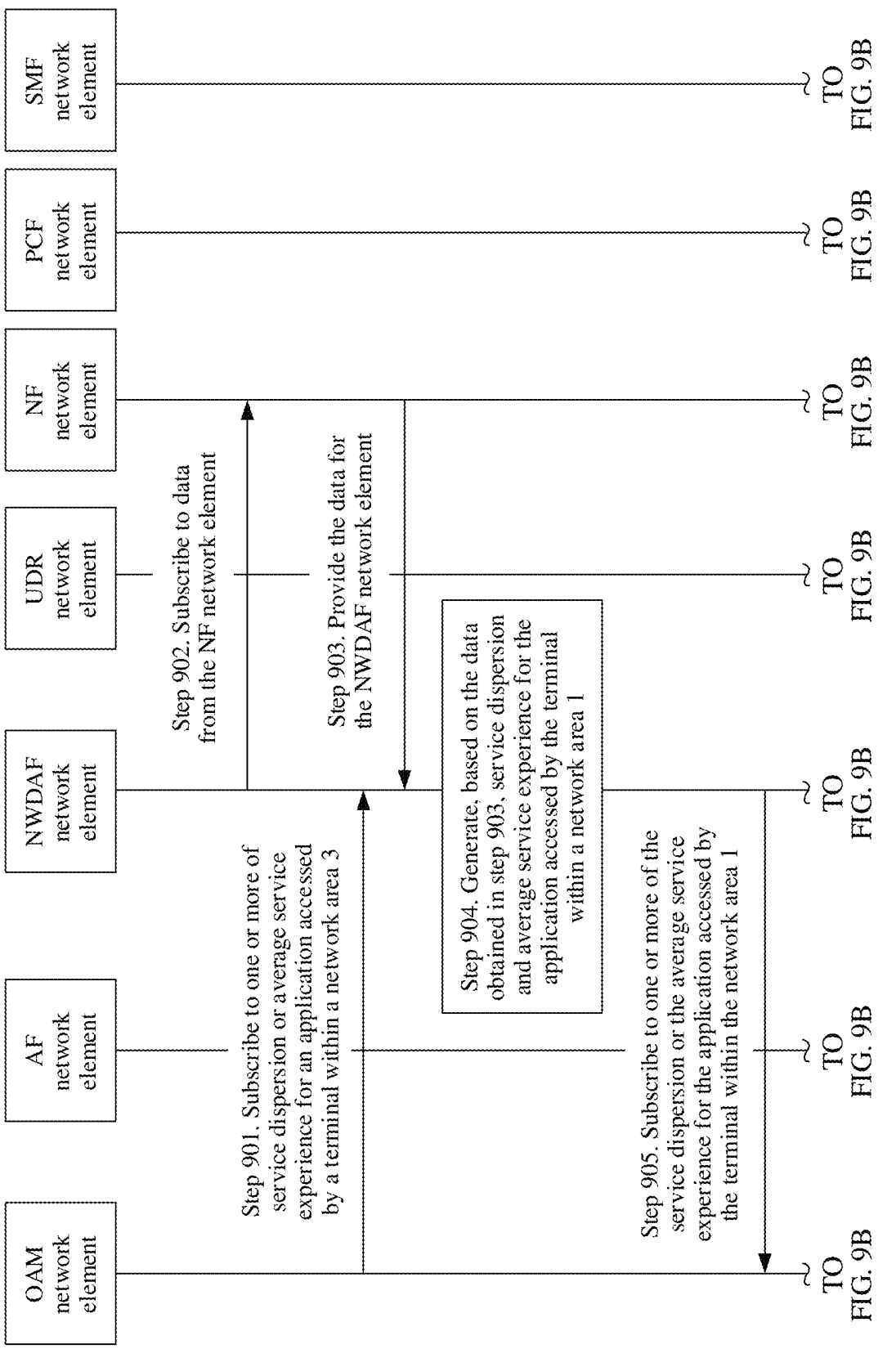
FIG. 9A to FIG. 13C are schematic flowcharts of specific embodiments of a communication method according to embodiments of this application.
Figure 9C:
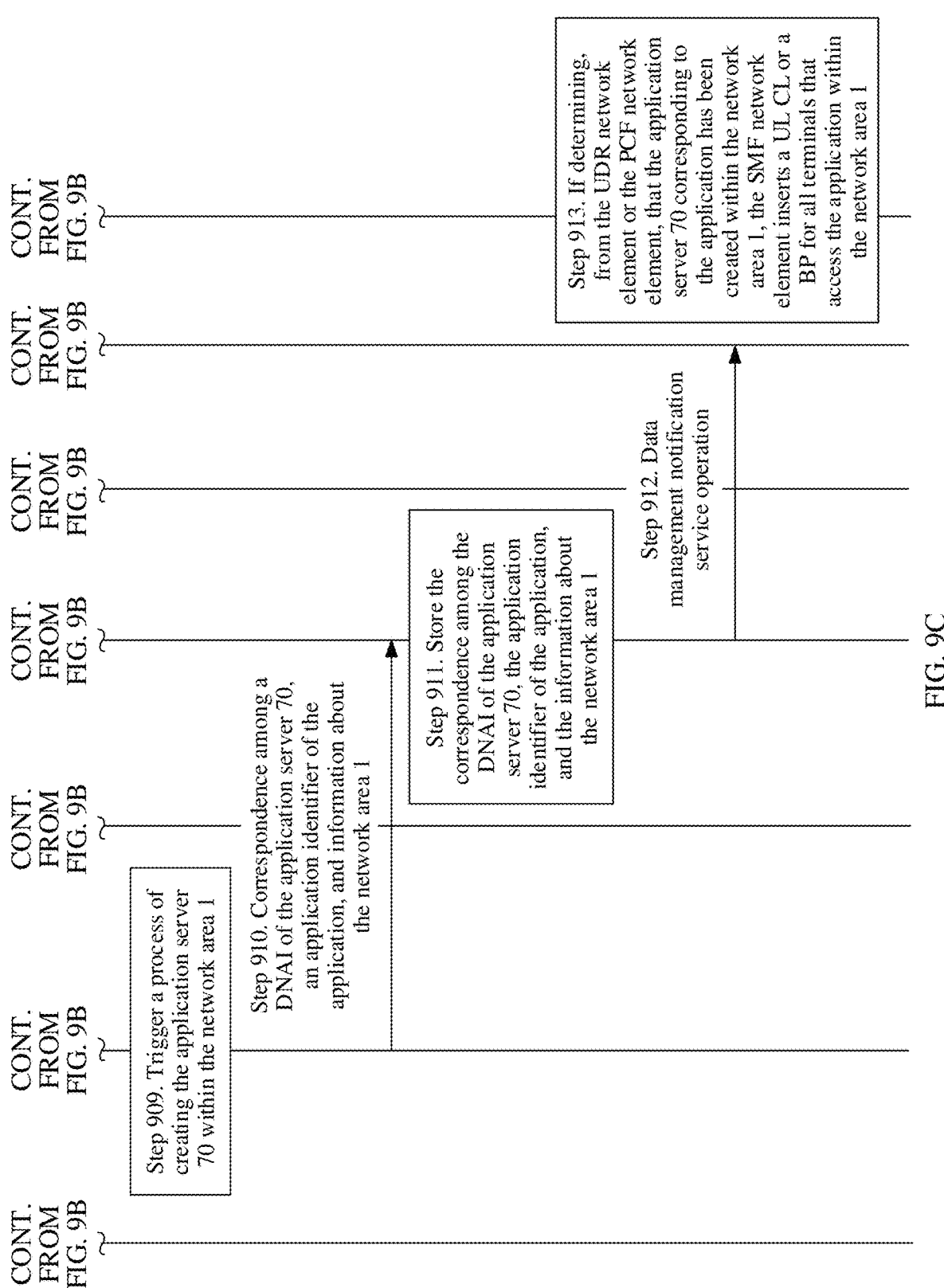

FIG. 9A to FIG. 9C specifically describe a method for cooperatively creating a network function according to an embodiment of this application by using an example in which a network management network element is an OAM network element, an application function network element is an AF network element, a data analytics network element is an NWDAF network element, a network storage network element is a UDR network element, and a control plane network element is an SMF network element. The method includes the following steps.

Step 901. An OAM network element subscribes to, from an NWDAF network element, one or more of service dispersion or average service experience for an application accessed by a terminal within a network area 3.

It should be understood that, in step 901, subscribing to the average service experience is used as an example.

In a specific implementation, the OAM network element triggers an analytics subscribe (Nnwdaf_AnalyticsSubscrip-tion_Subscribe) service operation to the NWDAF network element. Correspondingly, the NWDAF network element receives the analytics subscribe service operation from the OAM network element.

For example, the analytics subscribe service operation is for requesting to subscribe to one or more of the service dispersion or the average service experience for the appli-cation accessed by the terminal within the network area 3. For example, the analytics subscribe service operation car-ries indication information x, where the indication informa-tion x is for requesting to subscribe to one or more of the service dispersion or the average service experience for the application.

To narrow down a range of the service dispersion or the average service experience, for the application, determined by the NWDAF network element, the analytics subscribe service operation in this embodiment of this application may carry a filter criterion. For example, the filter criterion is used to define a range in which the NWDAF network element determines to collect data. For example, the filter criterion may be an application identifier (application ID) of the application or an identifier of the network area 3.

As shown in FIG. 1, the network area 3 in this embodi-ment of this application is an area in which the terminal is located, and the application is an application that is created on the application server 60 and that is accessed by the terminal within the network area 3 through a PDU session between the terminal and the UPF network element 50. In other words, the OAM network element subscribes to, from the NWDAF network element, one or more of the service dispersion or the average service experience for the appli-cation that is created on the application server 60 and that is accessed by the terminal within the network area 3. The application server 60 and the UPF network element 50 are created within the network area 2.

Step 902. The NWDAF network element subscribes to data from an NF network element, where the data is used to determine one or more of service dispersion or average service experience for the application accessed by the ter-minal within a network area 1.

The network area 1 is a sub-area of the network area 3, or the network area 1 is the network area 3. For example, the network area 3 is the same as the network area 1. For example, if the network area 3 is Shanghai, the network area 1 may also be Shanghai. For example, the network area 1 is a sub-area of the network area 3. For example, if the network area 3 is Shanghai, the network area 1 may be District A of Shanghai. If the network area 1 is a sub-area of the network area 3, the network area 1 may represent one or more sub-areas within the network area 3.

Figure 10:
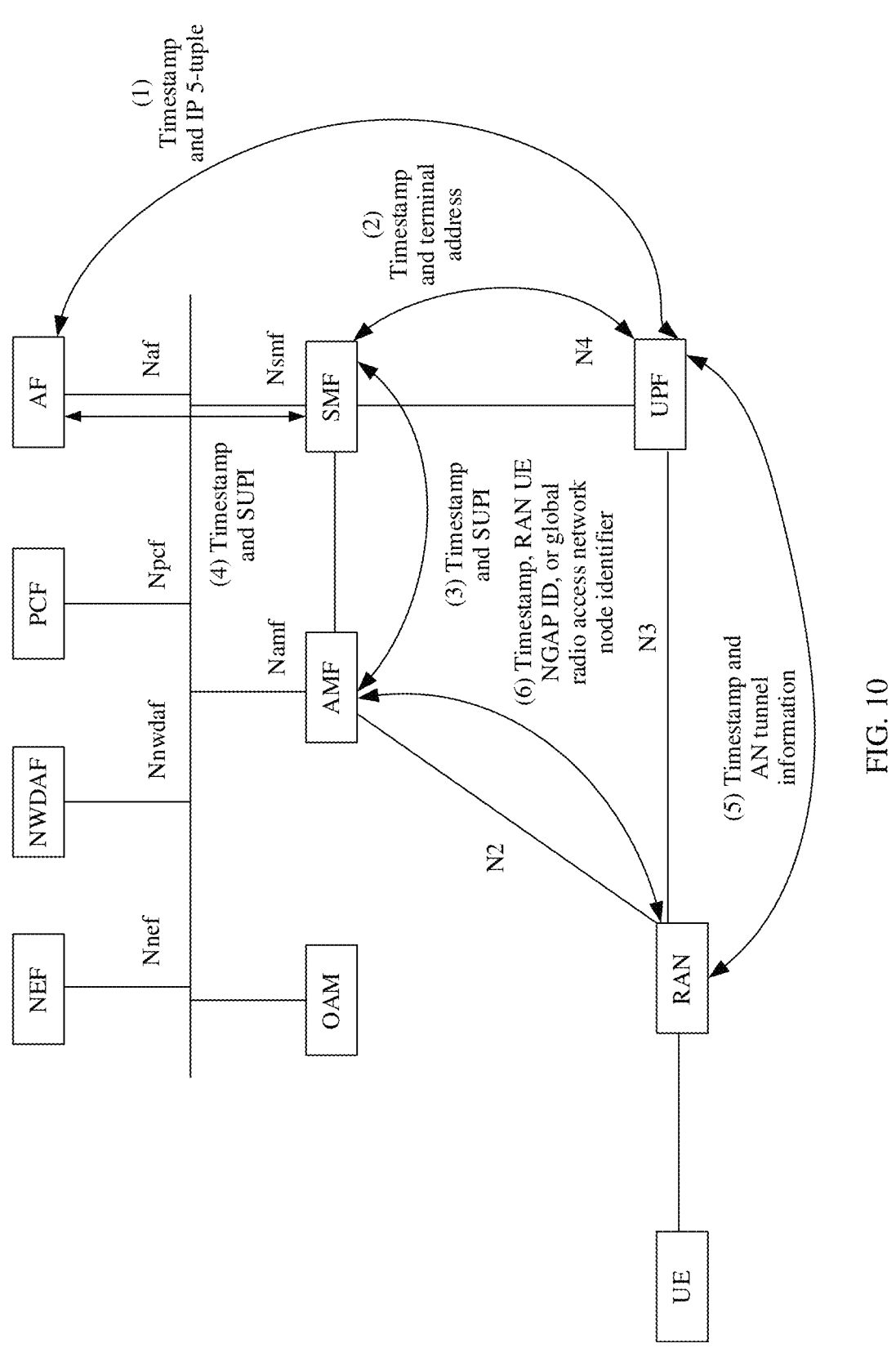

Specifically, as shown in FIG. 10, an example in which the NF network element is an AF network element is used. The data subscribed to by the NWDAF network element from the NF network element is service experience. Therefore, step 902 may be implemented in the following manner The NWDAF network element sends a subscription request message 1 to the AF network element. The subscription request message 1 is used to subscribe to service experience for the application accessed by the terminal within the network area 3. For example, the request message 1 carries an event identifier (Event ID) that is the service experience and an event filter that is the application identifier (applica-tion ID) of the application and information about the net-work area 1. In this way, the NWDAF network element collects service experience information at a flow level from the AF network element. The flow-based service experience information includes the application identifier, IP filter infor-mation (for example, an IP 5-tuple), a location of a service flow (locations of application), the service experience, and occurrence time (for example, a timestamp) of the service flow. As shown in FIG. 10, data provided by the AF network element for the NWDAF network element includes at least the timestamp and the IP 5-tuple.

For example, the NF network element is an AMF network element. In this case, the data subscribed to by the NWDAF network element from the NF network element is data of the terminal. Therefore, step 902 may be implemented in the following manner The NWDAF network element sends a subscription request message 2 to the AMF network ele-ment, where the subscription request message 2 is used to subscribe to data of the terminal within the network area 3. For example, the request message 2 carries an event iden-tifier that is location changes information and an event filter that is the identifier of the network area 3. In this way, the AMF network element provides the NWDAF network ele-ment with data of any terminal within the network area 3. The data of any terminal includes an identifier of the terminal, a location (UE Location) of the terminal, and a timestamp of the terminal at the location. In FIG. 10, the identifier of the terminal is an identifier allocated by a RAN to the terminal through an N2 interface, such as a RAN UE NGAP ID or a global radio access network node identifier (global RAN node ID). The data of any terminal provided by the AMF network element for the NWDAF network element includes at least the RAN UE NGAP ID or the global RAN node ID, and the timestamp of the terminal at the location.

For example, the identifier of the terminal may be one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), an IP address, and a mobile subscriber integrated services digital network number (MSISDN). For an identifier of a terminal in the following embodiments, refer to the descrip-tion herein. Details are not described subsequently again. The location of the terminal may be a TA or a cell in which the terminal is located.

For example, the NF network element is an SMF network element. In this case, the data subscribed to by the NWDAF network element from the NF network element is session information of a terminal that uses the application within the network area 1. Therefore, step 902 may be implemented in the following manner The NWDAF network element sends a subscription request message 3 to the SMF network element, where the subscription request message 3 is used to subscribe to session information of a terminal that uses the application within the network area 3. For example, the subscription request message 3 carries the identifier of the network area 3, the application identifier of the application, and an event identifier that is quality of service flow identifier allocation (QoS flow identifier, QFI allocation). In this way, the SMF network element may provide the NWDAF network element with the session information of the terminal that uses the application within the network area 3. For example, the session information of the terminal includes an identifier of the terminal corresponding to the application, a session identifier (PDU session ID), a QoS flow identifier (QFI), the application identifier, a data network name (DNN), network slice information S-NSSAI, and session time (timestamp). In addition, as shown in FIG. 10, the session information of the terminal provided by the SMF network element for the NWDAF network element may further include an address (for example, an IP address) of the terminal.

For example, the NF network element is a UPF network element 50. In this case, the data subscribed to by the NWDAF network element from the NF network element is traffic information of all terminals that use the application within the network area 2. Therefore, step 902 may be implemented in the following manner The NWDAF network element sends a subscription request message 4 to the UPF network element 50, where the subscription request message 4 is used to subscribe to traffic information of a terminal that uses the application within the network area 3. For example, the subscription request message 4 carries traffic information that is used as an event identifier, the identifier of the network area 3, and the application identifier of the application. In this way, the UPF network element 50 may report, to the NWDAF network element based on the subscription request message 4, traffic information of a terminal that uses the application within the network area 2. For example, the traffic information includes a flow bit rate (QoS flow Bit Rate), a flow packet delay (QoS flow packet delay), flow packet transmissions (packet transmission), flow packet retransmissions (packet retransmission), and packet transmission time (timestamp). As shown in FIG. 10, the traffic information provided by the UPF network element for the NWDAF network element may further include an address (for example, an IP address) of the terminal and a timestamp.

For example, the NF network element is an OAM network element. In this case, the data subscribed to by the NWDAF network element from the NF network element is minimization of drive-test (MDT) data, from a RAN, of one or more terminals within the network area 3 Therefore, step 902 may be implemented in the following manner The NWDAF network element sends a subscription request message 5 to the OAM network element, where the subscription request message 5 is used to subscribe to MDT data, from the RAN, of one or more terminals within the network area 1. For example, the subscription request message 5 carries an event identifier that is an MDT service, and information about the network area 3. In this way, the OAM network element reports MDT data, from the RAN, of each of the one or more terminals to the NWDAF network element based on the subscription request message 5. The MDT data includes reference signal received power (reference signal received power, RSRP), reference signal received quality (RSRQ), a signal-to-noise-plus-interference ratio (SNIR), a timestamp when the terminal is in the RAN, and the like. In addition, the MDT data of the terminal may further include the timestamp, a RAN UE NGAP ID, or a global radio access network node identifier.

It should be noted that an example in which the NWDAF network element requests the data within the network area 3 from the NF network element is used. Certainly, the NWDAF network element may alternatively request the data within the network area 1 from the NF network element. In this case, the network area 3 in various descriptions of step 902 may be replaced with the network area 1.

Step 903. The NF network element provides the data for the NWDAF network element.

In an example, step 903 in this embodiment of this application may be implemented in the following manner The NF network element triggers an event exposure notification (Nnf_EventExposure_Notify) service to the NWDAF network element.

For example, if the NF network element is an AF network element, the AF network element provides flow-based service experience information for the NWDAF network element.

For example, if the NF network element is an AMF network element, the AMF network element provides data (for example, a UE location) of the terminal for the NWDAF network element, and the event exposure notification service is Namf_EventExposure_Notify.

For example, if the NF network element is an SMF network element, the SMF network element provides the NWDAF network element with session information of all terminals that use the application within the network area 1, and the event exposure notification service is Nsmf_EventExposure_Notify.

For example, if the NF network element is a UPF network element 50, the UPF network element 50 reports, to the NWDAF network element, traffic information of all terminals that use the application within the network area 2, and the event exposure notification service is Nupf_EventExposure_Notify.

For example, if the NF network element is an OAM network element, the OAM network element reports MDT data, from a base station, of all terminals to the NWDAF network element.

In a process in which the NF reports the data to the NWDAF, for a type of the reported data, refer to descriptions in step 902. Details are not described herein again.

Step 904. The NWDAF network element generates, based on the data obtained in step 903, service dispersion or average service experience for the application accessed by the terminal within the network area 1.

Details are as follows:

A process in which the NWDAF network element generates the service dispersion (that is, a quantity of all terminals accessing the application within the network area 3) for the application is as follows:

This is mainly related to statistics. Within the network area 1, the AMF network element has terminal identifiers, time, and location information of one or more terminals within the network area 1. The SMF network element has session information (including an identifier of the terminal, an application identifier of the application accessed by the terminal, and time) of one or more terminals within the network area 1. Based on the identifier of the terminal and the time, the NWDAF network element may obtain, through association, whether a terminal requested by the OAM network element accesses the application within the network area 1. Further, the NWDAF network element obtains, through statistics, the quantity of all the terminals that access the application within the network area 1.

It should be noted that the preceding statistics may be based on a quantity of terminals that access the application within the network area 1 in a specific time period.

A process in which the NWDAF network element generates the average service experience (that is, average service experience for all terminals accessing the application within the network area 1) is as follows:

The NWDAF network element first associates every two pieces of data from all network elements based on an association identifier, to obtain complete training data. It should be understood that, as described in step 902, the data collected by the NWDAF network element from each network element further needs to include the association identifier. The association identifier is used to associate data that is on each network element and that is collected by the NWDAF network element.

As shown in FIG. 10, (1) Data from the AF network element and data from the UPF network element may be associated based on an association identifier (for example, a timestamp or an internet protocol 5-tuple (IP 5-tuple)).

(2) Data from the SMF network element and the data from the UPF network element may be associated based on an association identifier (for example, a timestamp or a terminal address).

(3) Data from the AMF network element and the data from the SMF network element may be associated based on an association identifier (for example, a timestamp or an SUPI).

(4) The data from the AF network element and the data from the SMF network element may be associated based on an association identifier (for example, a timestamp or an SUPI).

(5) The data from the UPF network element and data from the RAN may be associated based on an association identifier (for example, a timestamp or access network (Access Network, AN) tunnel information).

(6) The data from the RAN and the data from the AMF network element may be associated based on an association identifier (for example, a timestamp, a RAN UE NGAP ID, or a global radio access network node identifier).

It should be understood that, data from any network element includes the association identifier.

A format of each piece of sample data in the training data is as follows: <service experience><network data, including UE location, QoS flow bit rate, and the like>.

Based on the foregoing training data and an appropriate machine learning algorithm, the NWDAF network element may obtain a service experience model through training, that is, a service MOS model. Linear regression is used as an example. The service MOS model may be represented as: $h(x)=w_0x_0+w_1X_1+w_2x_2+W_3x_3+w_4+x_4+ \ldots +w_Dx_D$.

$h(x)$ represents the service experience model, that is, service MOS; $x_i(i=0, 1, 2, \ldots, D)$ represents network data; $D$ represents a network data dimension; and $w_i(i=0, 1, 2, \ldots, D)$ is a weight of each piece of network data that affects service experience.

According to the foregoing service experience model, in an inference phase, the

NWDAF network element collects data generated when each terminal within the network area 3 accesses the application (referring to step 902), and inputs the data into the service experience model, to obtain service experience for the application accessed by the terminal. Then, the NWDAF network element averages service experience for accessing the application by all terminals, to obtain average service experience for the application accessed by the terminal within the network area 1.

It should be noted that the average service experience may be average service experience for accessing the application within the network area 1 in a specific time period (for example, a time period 1).

Step 905. The NWDAF network element sends, to the OAM network element, one or more of the service dispersion or the average service experience for the application accessed by the terminal within the network area 1. Correspondingly, the OAM network element receives, from the NWDAF network element, one or more of the service dispersion or the average service experience for the application accessed by the terminal within the network area 1.

In an example, step 905 may be implemented in the following manner The NWDAF network element triggers a data analytics result notify (Nnwdaf_Analytics Subscription_Notify) service to the OAM network element. The data analytics result notify service includes one or more of the service dispersion or the average service experience (Service Dispersion and Service Experience for the application within the Network Area 1) for the application accessed by the terminal within the network area 1.

If the average service experience or the service dispersion is based on the time period 1, the NWDAF network element further sends information about the time period 1 to the OAM network element. In this way, the OAM network element can determine that the service dispersion or the average service experience is service dispersion or average service experience for the application accessed by the terminal within the network area 1 in the time period 1. It may be understood that the average service experience or the service dispersion in this embodiment of this application may be based on a same time period, or the average service experience or the service dispersion may be based on different time periods. For example, the service dispersion is service dispersion for an application accessed by the terminal within the network area 1 in the time period 1. The average service experience is average service experience for an application accessed by the terminal within the network area 1 in a time period 2.

Step 906. The OAM network element determines, based on one or more of the service dispersion or the average service experience for the application accessed by the terminal within the network area 1, that an application access volume for the application is greater than or equal to a first threshold but the average service experience for the application is less than or equal to a second threshold, and there is no UPF network element serving the application within the network area 1. Therefore, the OAM network element triggers an operation of creating, within the network area 1, a UPF network element 80 serving the application.

It may be understood that step 906 in this embodiment of this application may be replaced in the following manner The OAM network element determines, based on the service dispersion or the average service experience for the application accessed by the terminal within the network area 1, that the application access volume for the application is greater than or equal to the first threshold but the average service experience for the application is less than or equal to a second threshold, in and a UPF network element 80 serving the application exists but an application server 70 serving the application does not exist within the network area 1. Therefore, the OAM network element determines to notify the AF network element to create, within the network area 1, the application server 70 serving the application.

For example, the OAM network element may determine, in the following manner, that the application server 70 serving the application does not exist within the network area 1. For example, the OAM network element receives a message from the AF network element, where the message indicates that the application server 70 serving the application does not exist within the network area 1. The message may be actively sent by the AF network element to the OAM network element, or the message may be sent by the AF network element based on triggering of the OAM network element. This is not limited in this embodiment of this application. For example, when the application server 70 serving the application exists within the network area 3, the OAM network element sends a query message to the AF network element, where the query message is used to query whether the application server 70 serving the application is created. If determining that the application server 70 serving the application is not created within the network area 1, the AF network element sends a query response to the OAM network element, where the query response indicates that the application server 70 serving the application is not created within the network area 1. In this way, the OAM network element can determine, based on the query response, that the application server 70 serving the application is not created within the network area 1.

The UPF network element 80 serving the application in this embodiment of this application may be created by the OAM network element, or may be created by another network element that can create a network function. This is not limited in this embodiment of this application.

In an example, the OAM network element may create, in the following manner within the network area 1, the UPF network element 80 serving the application: The OAM network element has some hardware resources (such as a CPU, a memory, or a hard disk) within the network area 1, and the hardware resources belong to the UPF network element 80.

Step 907. The OAM network element sends a notification message 1 to the AF network element. Correspondingly, the AF network element receives the notification message 1 from the OAM network element. The notification message 1 is used to notify the AF that the operation of creating the UPF network element 80 serving the application within the network area 1 has been triggered, or the notification message 1 is used to notify the AF that the UPF network element 80 serving the application is successfully created within the network area 1.

For example, the notification message 1 includes the application identifier of the application, the information about the network area 1, and a UPF network element creation indication. The UPF network element creation indication indicates that the UPF network element 80 has been successfully created. It may be understood that the notification message 1 carries the application identifier of the application, so that the AF network element determines the application served by the successfully created UPF network element 80. The notification message 1 carries the information about the network area 1, so that the AF network element determines that the UPF network element 80 is created within the network area 1.

For example, the OAM network element sends the notification message 1 to the AF network element via the NWDAF network element and an NEF network element.

Step 908. If finding that the application server 70 serving the application has not been created within the network area 1, the AF network element determines to create the application server 70 serving the application within the network area 1.

Step 909. The AF network element triggers a process of creating the application server 70 within the network area 1.

Step 909 may be implemented in the following manner The AF network element performs a process of creating, within the network area 1, the application server 70 serving the application. Alternatively, the AF network element notifies the OAM network element, and the OAM network element creates, within the network area 1, the application server 70 serving the application. Alternatively, the application server 70 serving the application is created within the network area 1 manually or automatically. This is not limited in this embodiment of this application.

The application server 70 in this embodiment of this application may be separately created for the application, or the application server 70 is shared by the foregoing application and another application. This is not limited in this embodiment of this application, provided that the terminal can access, via the UPF network element 80, the application created on the application server 70.

For example, the application server 70 may be an application server a that already exists within the network area 1. In this case, the AF network element or the OAM network element configures, through manual creation, the application server a as an application server 70 that can serve the application. Configuring the application server a as the application server 70 that can serve the application may mean: creating, on the application server 70, the application accessed by the terminal. Further optionally, the application server 70 may be an application server with lowest load, an application server with a lowest access volume, or an application server with a highest priority in a plurality of application servers within the network area 1. This is not limited in this embodiment of this application.

Step 910. When the application server 70 is successfully created, the AF network element sends a correspondence among a DNAI of the application server 70, the application identifier of the application, and the information about the network area 1 to a UDR network element. Correspondingly, the UDR network element receives, from the AF network element, the correspondence among the DNAI of the application server 70, the application identifier of the application, and the information about the network area 1.

For example, the AF network element may send the correspondence among the DNAI of the application server 70, the application identifier of the application, and the information about the network area 1 to the UDR network element via the NEF network element.

Step 911. The UDR network element stores the correspondence among the DNAI of the application server 70, the application identifier of the application, and the information about the network area 1.

Step 912. The UDR network element triggers a data management notification (Nudr_DM_Notify) service operation to a PCF network element. Correspondingly, the PCF network element receives the data management notification service operation from the UDR network element.

For example, the data management notification service operation carries the correspondence among the DNAI of the application server 70, the application identifier of the application, and the information about the network area 1.

Step 913. If the SMF network element determines, from the UDR network element or the PCF network element, that the application server 70 corresponding to the application has been created within the network area 1, the SMF network element inserts a UL CL or a BP for all terminals that access the application within the network area 1.

It may be understood that, in step 913, the terminals can locally access the application based on sessions between the terminals and the UPF network element 80, thereby ensuring service experience.

In the embodiment shown in FIG. 9A to FIG. 9C, the OAM network element determines, based on that the application access volume within the network area 1 is greater than the first threshold but service experience is poor, to create the UPF network element 80 within the network area 1, and then the AF network element creates, based on the notification message 1 from the OAM network element, the application server 70 serving the application within the network area 1, to cooperatively create the application server and the UPF network element 80. This ensures service experience when the terminal accesses the application.

Figure 11A:
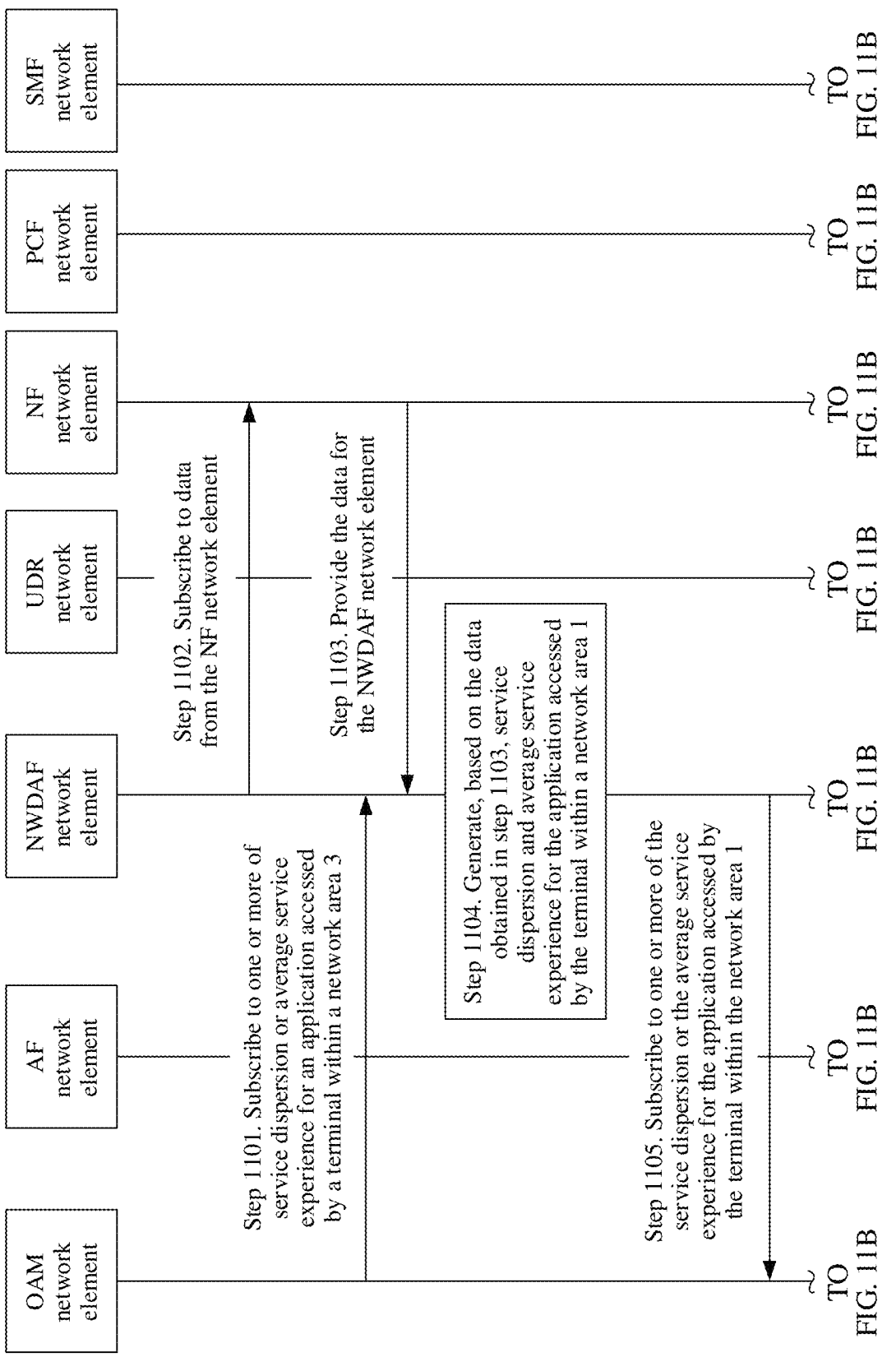
Figure 11C:
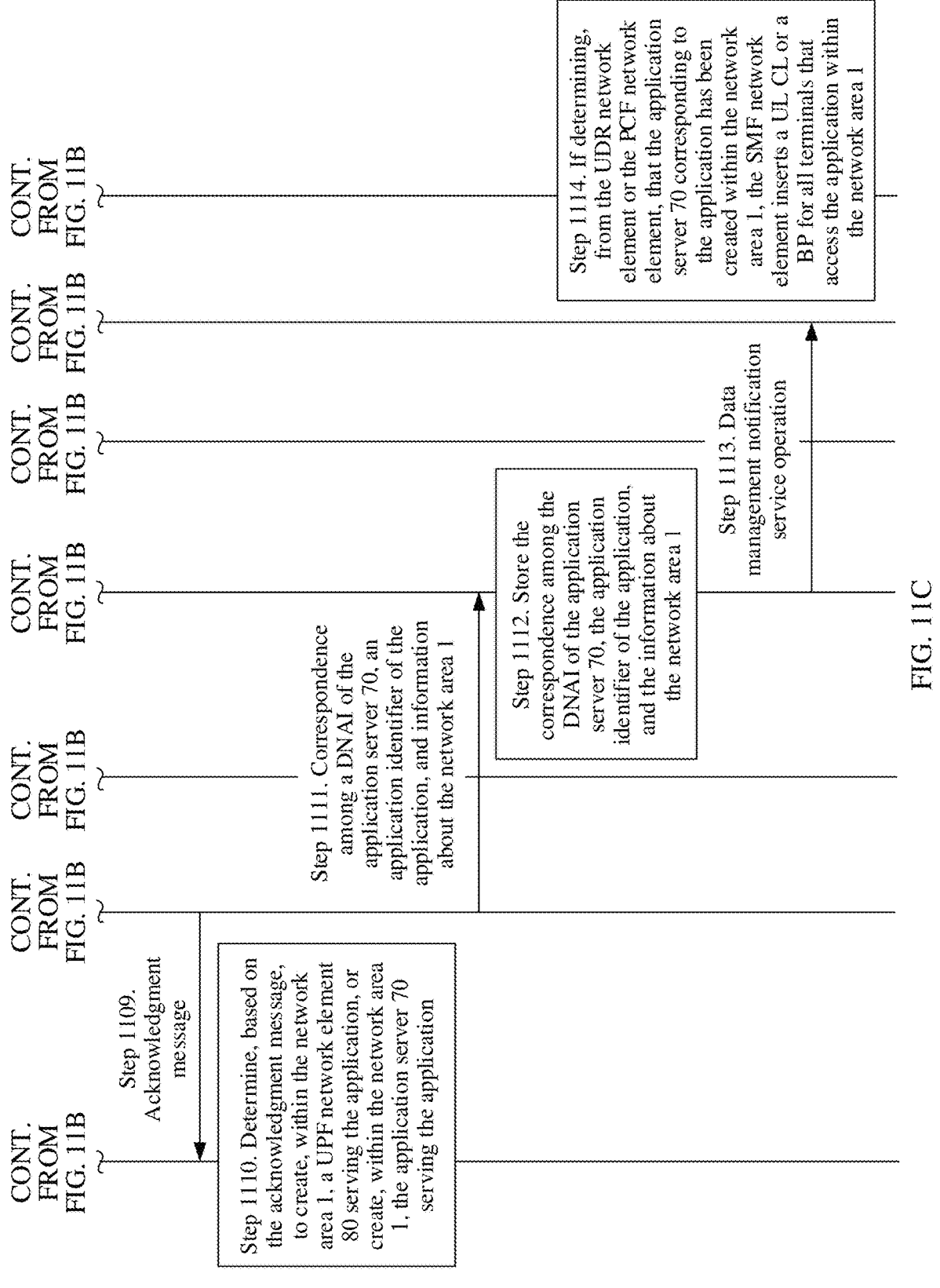

FIG. 11A to FIG. 11C show another method for cooperatively creating a network function according to this application. The method includes the following steps.

Step 1101 to step 1105 are the same as step 901 to step 905. Details are not described herein again.

Step 1106. The OAM network element determines, based on one or more of the service dispersion or the average service experience for the application accessed by the terminal within the network area 1, that an application access volume for the application is greater than or equal to a first threshold, but the average service experience for the application is less than or equal to a second threshold, and there is no UPF network element serving the application within the network area 1.

Step 1107. The OAM network element sends a notification message 2 to the AF network element. Correspondingly, the AF network element receives the notification message 2 from the OAM network element. The notification message 2 is used to negotiate, between the OAM network element and the AF network element, whether to create, within the network area 1, a UPF network element serving the application, or create, within the network area 1, an application server serving the application.

For example, the OAM network element may send the notification message 2 to the AF network element via the NWDAF network element and the NEF network element. The OAM network element sends the notification message 2 to the NWDAF network element, the NWDAF network element sends the notification message 2 to the NEF network element, and the NEF network element sends the notification message 2 to the AF network element. For example, the notification message 2 carries the application identifier of an application, the information about the network area 3, and indication information. The indication information indicates whether to create, within the network area 1, a UPF network element 80 serving the application.

Step 1108. If the AF network element finds that no application server 70 is created for the application within the network area 1, and determines that an application server 70 serving the application needs to be created, the AF network element triggers a process of creating the application server 70 within the network area 1. For implementation of step 1108, refer to the descriptions in step 909. Details are not described herein again.

Step 1109. The AF network element sends an acknowledgment message to the OAM network element. Correspondingly, the OAM network element receives the acknowledgment message from the AF network element. The acknowledgment message indicates that the AF network element allows the OAM network element to create, within the network area 1, the UPF network element 80 serving the application, or the acknowledgment message indicates that the AF network element allows the OAM network element to create, within the network area 1, the application server 70 serving the application.

Step 1110. The OAM network element determines, based on the acknowledgment message, to create, within the network area 1, the UPF network element 80 serving the application, or create, within the network area 1, the application server 70 serving the application.

Step 1111 to step 1114 are the same as step 910 to step 913. Details are not described herein again.

It should be noted that a difference between the embodiment shown in FIG. 9A to FIG. 9C and the embodiment shown in FIG. 11A to FIG. 11C lies in that: In the embodiment shown in FIG. 9A to FIG. 9C, the OAM network element autonomously determines that the UPF network element 80 serving the application needs to be created within the network area 1. In the embodiment shown in FIG. 11A to FIG. 11C, after determining to create, within the network area 1, the UPF network element 80 serving the application, the OAM negotiates with the AF network element based on the notification message 2. When the AF network element agrees to create, within the network area 1, the UPF network element 80 or the application server 70 serving the application, the OAM network element then triggers an operation of creating, within the network area 1, the UPF network element 80 or the application server 70 serving the application. In other words, the OAM network element negotiates with the AF network element before triggering the operation of creating the UPF network element 80 or the application server 70 within the network area 1, and creates the UPF network element 80 or the application server 70 within the network area 1 after the creation is confirmed by the AF network element.

It should be noted that, if the acknowledgment message further indicates that the AF network element allows the OAM network element to create, within the network area 1, the application server 70 serving the application, step 1108 may be omitted. Correspondingly, the embodiment shown in FIG. 11A to FIG. 11C may further include: The OAM network element creates, within the network area 1 based on the acknowledgment message, the application server 70 serving the application.

Figure 12A:
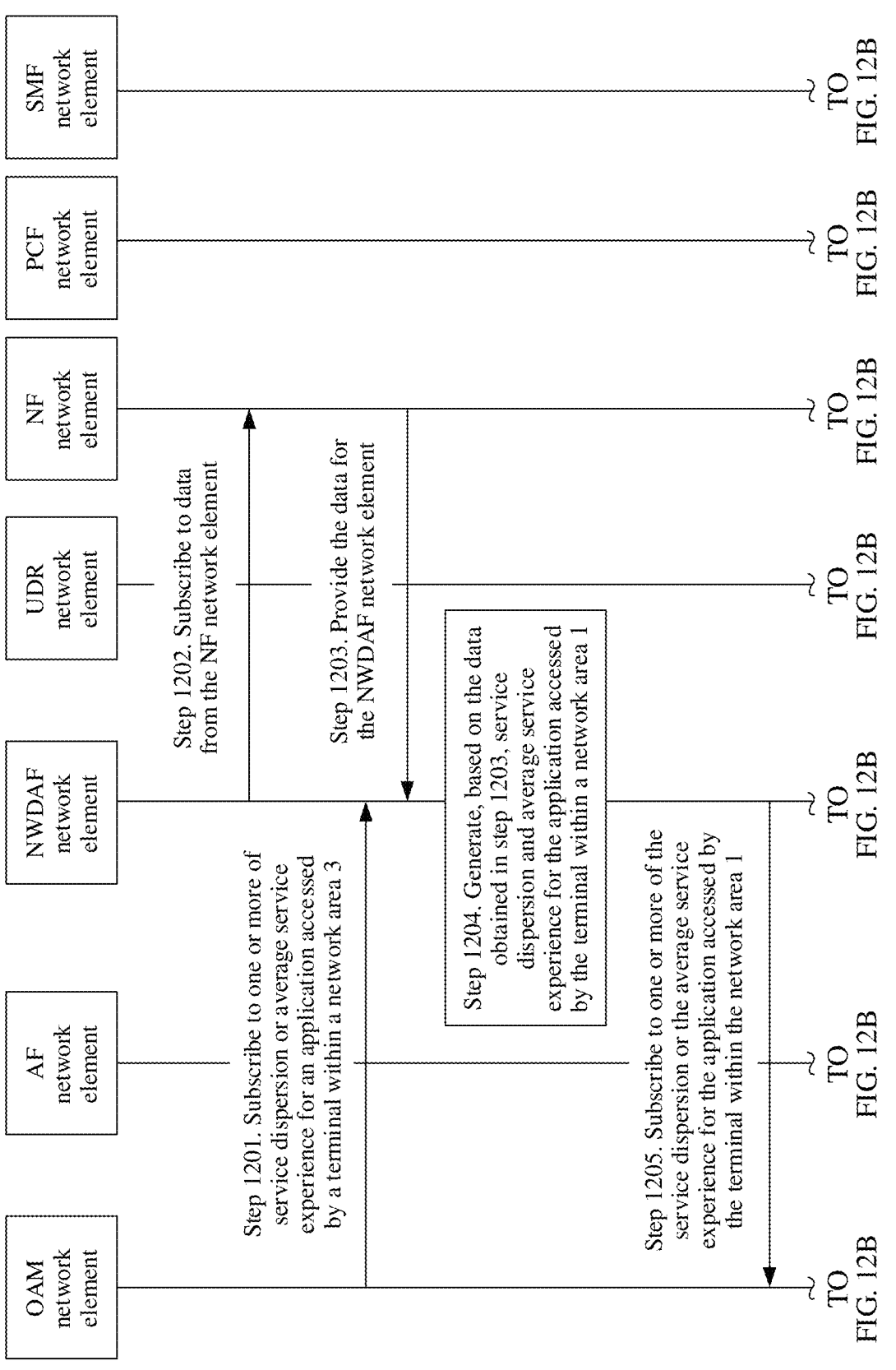
Figure 12B:
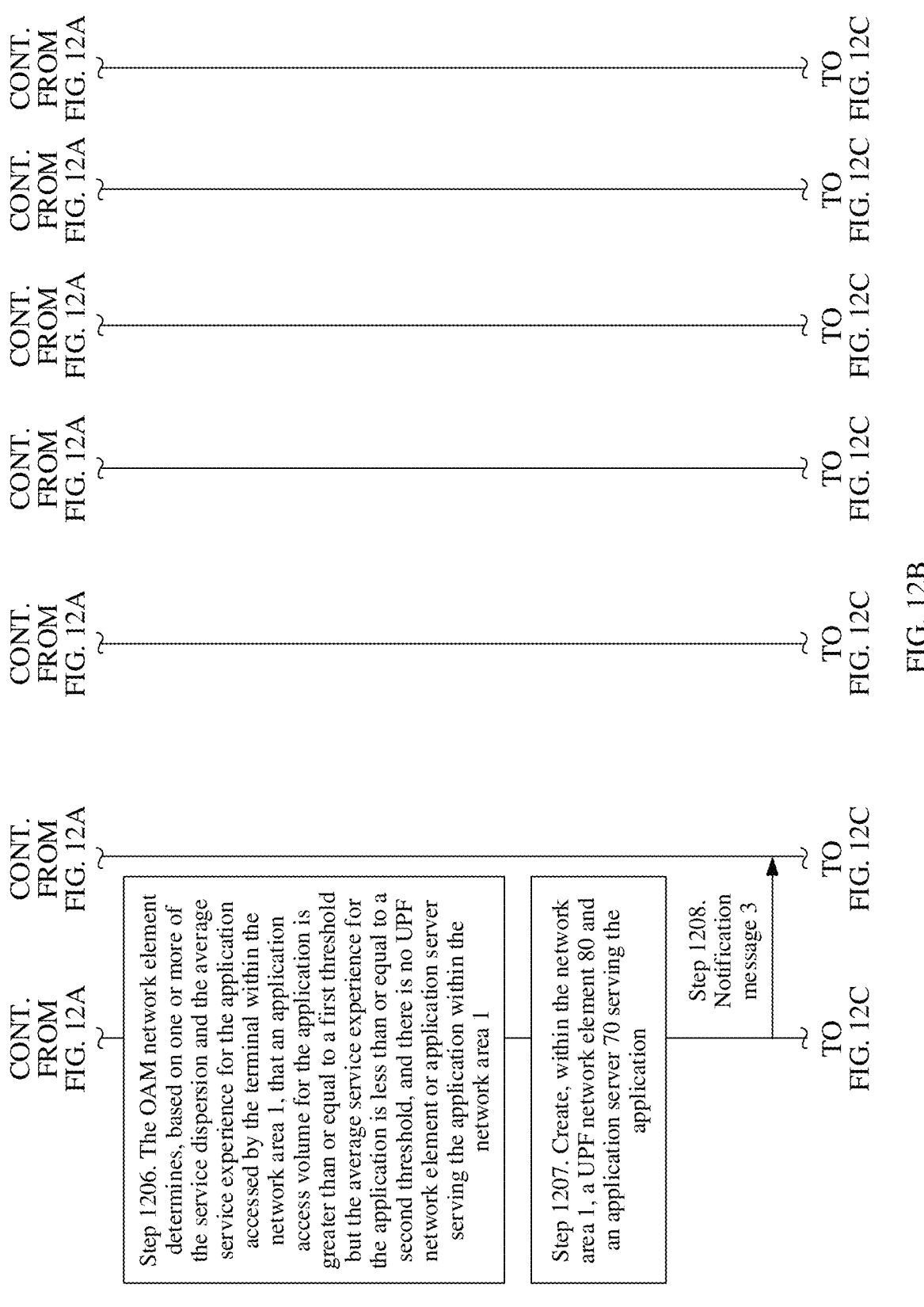

FIG. 12A to FIG. 12C show another method for cooperatively creating a network function according to this application. The method includes the following steps.

Step 1201 to step 1205 are the same as step 901 to step 905. Details are not described herein again.

Step 1206. The OAM network element determines, based on one or more of the service dispersion or the average service experience for the application accessed by the terminal within the network area 1, that an application access volume for the application is greater than or equal to a first threshold, but the average service experience for the application is less than or equal to a second threshold, and there is no UPF network element or application server serving the application within the network area 1.

Step 1207. The OAM network element creates, within the network area 1, a UPF network element 80 and an application server 70 serving the application.

Step 1208. The OAM network element sends a notification message 3 to the AF network element. Correspondingly, the AF network element receives the notification message 3 from the OAM network element. The notification message 3 is used to notify the AF network element that the application server 70 serving the application is created within the network area 1.

For example, the notification message 3 includes the information about the network area 1, information about the application server 70, and information about the UPF network element 80.

Step 1209 to step 1212 are the same as step 910 to step 913. Details are not described herein again.

In the embodiment shown in FIG. 12A to FIG. 12C, the OAM network element determines, based on one or more of the service dispersion or the average service experience for the application accessed by the terminal within the network area 1, that the application access volume for the application is greater than or equal to the first threshold, but the average service experience for the application is less than or equal to the second threshold. In addition, when there is no UPF network element serving the application within the network area 1, the OAM network element triggers an operation of creating the UPF network element 80 and the application server 70 within the network area 1, to implement collaboration between application access, network creation, and application creation, thereby improving service experience.

It should be understood that subsequent step 1209 to step 1212 may alternatively be performed by the OAM network element.

Figure 13A:
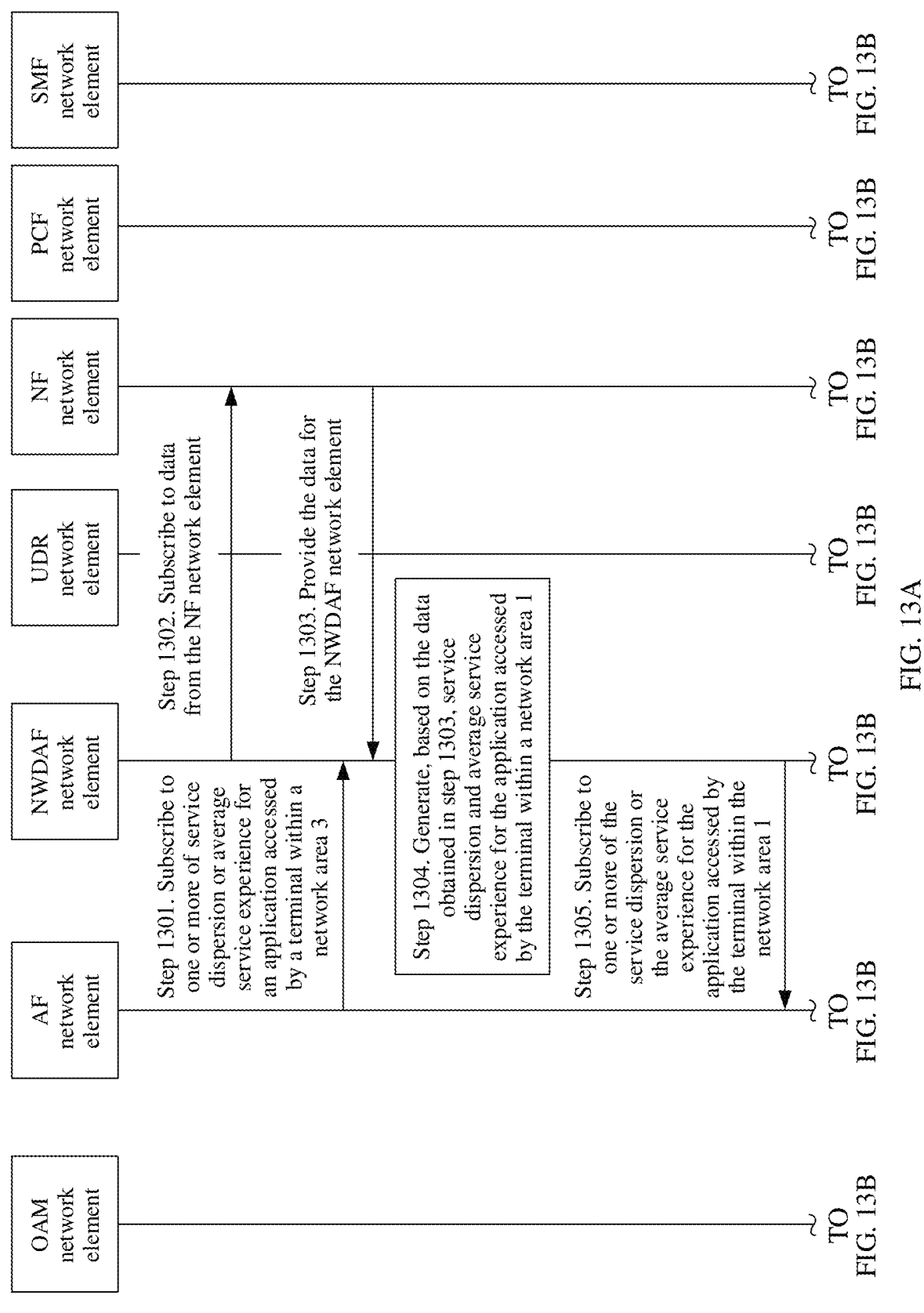

FIG. 13A to FIG. 13C show another method for cooperatively creating a network function according to this application. The method includes the following steps.

Step 1301. An AF network element subscribes to, from an NWDAF network element, one or more of service dispersion or average service experience for an application accessed by a terminal within a network area 3.

In a specific implementation, step 1301 may be implemented in the following manner The AF network element triggers an analytics subscribe (Nnwdaf_AnalyticsSubscription_Subscribe) service operation to the NWDAF network element. Correspondingly, the NWDAF network element receives the analytics subscribe service operation from the AF network element.

It should be noted that if the AF network element is a third-party network element rather than an operator network element, the AF network element first needs to send the analytics subscribe service operation to an NEF network element by using an Nnef_AnalyticsExposure_Subscribe service, and then the NEF network element triggers the analytics subscribe service operation to the NWDAF network element.

For example, the analytics subscribe service operation is for requesting the service dispersion or the average service experience for the subscribed application. For example, the analytics subscribe service operation carries indication information y, where the indication information y is for requesting to subscribe to the service dispersion or the average service experience for the application accessed by the terminal within the network area 3. For example, to narrow down a range in which the NWDAF network element determines the service dispersion or the average service experience for the application accessed by the terminal within the network area 3, the analytics subscribe service operation in this embodiment of this application may carry a filter criterion. For example, the filter criterion is used to define a range in which the NWDAF network element determines the service dispersion or the average service experience for the application. For example, the filter criterion may be an application identifier (Application ID) of the application or an identifier of the network area 3.

It may be understood that the network area 3 in this embodiment of this application is an area in which the terminal is located, and the application is an application that is created on an application server 60 and that is accessed by the terminal within the network area 3 through a PDU session between the terminal and a UPF network element 50. In other words, the AF network element subscribes to, from the NWDAF network element, the service dispersion or the average service experience for the application that is created on the application server 60 and that is accessed by the terminal within the network area 3.

Step 1302 to step 1304 are the same as step 902 to step 904. Details are not described herein again.

Step 1305. The NWDAF network element sends, to the AF network element, one or more of the service dispersion or the average service experience for the application accessed by the terminal within the network area 1. Correspondingly, the AF network element receives, from the NWDAF network element, one or more of the service dispersion or the average service experience for the application accessed by the terminal within the network area 1.

In an example, step 1305 may be implemented in the following manner The NWDAF network element triggers a data analytics result notify (Nnwdaf_Analytics Subscription_Notify) service to the AF network element. The data analytics result notify service includes one or more of the service dispersion or the average service experience (Service Dispersion and Service Experience for the application within the Network Area 1) for the application accessed by the terminal within the network area 1.

If the AF network element is a third-party network element rather than an operator network element, the AF network element needs to send the data analytics result notify service to the NEF network element, and then the NEF network element triggers an Nnef_AnalyticsExposure_Notify service to send the data analytics result notify service to the AF network element.

Step 1306. The AF network element determines, based on one or more of the service dispersion or the average service experience for the application accessed by the terminal within the network area 1, that an application access volume is greater than or equal to a first threshold but the average service experience is less than or equal to a second threshold, and there is no UPF network element serving the application within the network area 1. Therefore, the AF network element determines to trigger an operation of creating, within the network area 1, an application server 70 serving the application.

For a creation process of the application server 70 triggered by the AF in step 1306, refer to the description of step 906. Details are not described herein again.

Step 1307. When the application server 70 is successfully created, the AF network element sends a notification message 4 to the OAM network element. Correspondingly, the OAM network element receives the notification message 4 from the AF network element.

The notification message 4 is used to notify the OAM network element that the application server 70 serving the application has been successfully created locally. For example, the notification message 4 may carry the application identifier of the application, an identifier of the application server 70, and the information about the network area 1. The notification message 4 carries the application identifier of the application, the identifier of the application server 70, and the information about the network area 1, so that the OAM network element determines that the application server 70 serving the application has been successfully created within the network area 1. Providing the information about the network area 1 not only helps the OAM network element determine that the application server 70 serving the application is locally created, but also enables the OAM network element to determine to create, within the network area 1 or a subnet area included within the network area 1, a UPF network element 80 serving the application.

Step 1308. The OAM network element creates, based on the notification message 4, the UPF network element 80 serving the application within the network area 1.

Step 1309 to step 1312 are the same as step 910 to step 913. Details are not described herein again.

In this embodiment of this application, after the OAM network element creates, within the network area 1, the UPF network element 80 serving the application, the OAM network element may send indication information z to the AF network element. The indication information z indicates that the UPF network element 80 serving the application has been successfully created within the network area 1. The AF network element may determine, based on the indication information z, that the OAM network element has successfully created, within the network area 1, the UPF network element 80 serving the application. Then, the AF network element performs step 1309.

It may be understood that, in the embodiment shown in FIG. 13A to FIG. 13C, the AF network element first creates the application server 70, and then the OAM network element creates the UPF network element 80 serving the application. However, in the embodiments shown in FIG. 9A to FIG. 9C and FIG. 11A to FIG. 11C, the OAM network element first creates the UPF network element 80 serving the application, and then the AF network element creates the application server 70.

In the embodiments shown in FIG. 9A to FIG. 13C, the network area 1 may correspond to the first area described above, the network area 3 corresponds to the third area described above, the application server 70 may correspond to the first application server described above, the UPF network element 80 may correspond to the first user plane function network element described above, the application server 60 may correspond to the second application server described above, the UPF network element 1 may correspond to the second user plane function network element described above, the network area 2 corresponds to the second area described above, the notification message 1 corresponds to the first message in the embodiment described in FIG. 5A and FIG. 5B, and the notification message 2 corresponds to the first message in the embodiment described in FIG. 6A and FIG. 6B.

The foregoing mainly describes the solutions in embodiments of this application from a perspective of interaction between network elements. It may be understood that, to implement the foregoing functions, the network elements such as the network management network element, the data analytics network element, and the application function network element each include a corresponding hardware structure and/or a software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network management network element, the data analytics network element, and the application function network element may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this application, division into the units is an example, and is merely a logical function division. In actual implementation, another division manner may be used.

The foregoing describes the methods in embodiments of this application with reference to FIG. 4 to FIG. 13C. The following describes communication apparatuses that are provided in embodiments of this application and that perform the foregoing methods. A person skilled in the art may understand that the method and the apparatus may be mutually combined and referenced. The communication apparatuses provided in embodiments of this application may perform the steps performed by the network management network element, the data analytics network element, and the application function network element in the foregoing communication methods.

Figure 14:
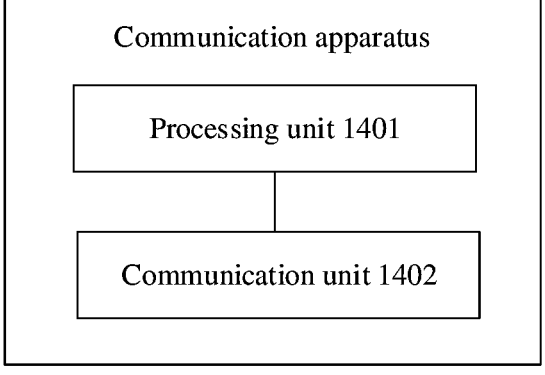
FIG. 14 is a schematic diagram of a structure of a communication apparatus according to an embodiment of this application.

When an integrated unit is used, FIG. 14 shows a communication apparatus in the foregoing embodiments. The communication apparatus may include a communication unit 1402 and a processing unit 1401. The communication unit 1402 is configured to perform an action of receiving or sending information, and the processing unit 1401 is configured to perform an action of processing information.

In an example, the communication apparatus is a data analytics network element, or a chip used in the data analytics network element. In this case, the communication unit 1402 is configured to support the communication apparatus in performing the sending action performed by the data analytics network element in step 402 in FIG. 4 in the foregoing embodiment. The processing unit 1401 is further configured to support the communication apparatus in performing step 401 in the foregoing embodiment.

In a possible embodiment, the communication unit 1402 is further configured to support the communication apparatus in performing the receiving action performed by the data analytics network element in step 501 in the foregoing embodiment. The processing unit 1401 is configured to support the communication apparatus in performing step 502 in the foregoing embodiment. The communication unit 1402 is further configured to support the communication apparatus in performing the sending action performed by the data analytics network element in step 503 in the foregoing embodiment.

In an example, the communication apparatus is a data analytics network element, or a chip used in the data analytics network element. In this case, the communication unit 1402 is configured to support the communication apparatus in performing the sending action performed by the data analytics network element in step 802 in FIG. 8 in the foregoing embodiment. The processing unit 1401 is further configured to support the communication apparatus in performing step 801 in the foregoing embodiment.

In another example, the communication apparatus is a network management network element, or a chip used in the network management network element. In this case, the communication unit 1402 is configured to support the communication apparatus in performing the receiving action performed by the network management network element in step 402 in FIG. 4 in the foregoing embodiment. The processing unit 1401 is further configured to support the communication apparatus in performing step 403 in the foregoing embodiment. The communication unit 1402 is configured to support the communication apparatus in performing the sending action performed by the network management network element in step 403 in FIG. 4 in the foregoing embodiment.

In a possible embodiment, the communication unit 1402 is configured to support the communication apparatus in performing the receiving action performed by the network management network element in step 503 in the foregoing embodiment. The processing unit 1401 is configured to support the communication apparatus in performing step 504, step 505, and step 506 in the foregoing embodiment.

In a possible embodiment, the communication unit 1402 is configured to support the communication apparatus in performing the receiving action performed by the network management network element in step 603 in the foregoing embodiment. The processing unit 1401 is configured to support the communication apparatus in performing step 604, step 605, and step 610 in the foregoing embodiment. The communication unit 1402 is configured to support the communication apparatus in performing the receiving action performed by the network management network element in step 609 in the foregoing embodiment.

In a possible embodiment, the communication unit 1402 is configured to support the communication apparatus in performing the receiving action performed by the network management network element in step 703 in the foregoing embodiment. The processing unit 1401 is configured to support the communication apparatus in performing step 704, step 705, step 706, and step 707 in the foregoing embodiment. The communication unit 1402 is configured to support the communication apparatus in performing the receiving action performed by the network management network element in step 708 in the foregoing embodiment.

In another example, the communication apparatus is an application function network element, or a chip used in the application function network element. In this case, the communication unit 1402 is configured to support the communication apparatus in performing the receiving action performed by the application function network element in step 404 in the foregoing embodiment. The processing unit 1401 is configured to support the communication apparatus in performing step 405 in the foregoing embodiment.

In a possible implementation, the processing unit 1401 is further configured to support the communication apparatus in performing step 508, step 509, and step 510 in the foregoing embodiment. The communication unit 1402 is configured to support the communication apparatus in performing the sending actions performed by the application function network element in step 511 and step 512 in the foregoing embodiment.

In a possible implementation, the processing unit 1401 is further configured to support the communication apparatus in performing step 607, step 608, and step 611 in the foregoing embodiment. The communication unit 1402 is configured to support the communication apparatus in performing the sending actions performed by the application function network element in step 612 and step 613 in the foregoing embodiment.

In still another example, the communication apparatus is an application function network element, or a chip used in the application function network element. In this case, the communication unit 1402 is configured to support the communication apparatus in performing the receiving action performed by the application function network element in step 708 in the foregoing embodiment. The communication unit 1402 is configured to support the communication apparatus in performing the sending actions performed by the application function network element in step 709 and step 710 in the foregoing embodiment.

In still another example, the communication apparatus is an application function network element, or a chip used in the application function network element. In this case, the processing unit 1401 is configured to support the communication apparatus in performing the action performed by the application function network element in step 803 in the foregoing embodiment. The communication unit 1402 is configured to support the communication apparatus in performing the sending action performed by the application function network element in step 804 in the foregoing embodiment.

In a possible implementation, the processing unit 1401 is further configured to support the communication apparatus in performing step 806 in the foregoing embodiment. The communication unit 1402 is configured to support the communication apparatus in performing the sending actions performed by the application function network element in step 807 and step 808 in the foregoing embodiment.

In still another example, the communication apparatus is a network management network element, or a chip used in the network management network element. In this case, the communication unit 1402 is configured to support the communication apparatus in performing the receiving action performed by the network management network element in step 804 in the foregoing embodiment. The processing unit 1401 is configured to support the communication apparatus in performing the action performed by the network management network element in step 805 in the foregoing embodiment.

In a possible embodiment, the communication apparatus may further include a storage unit, configured to store program code and data of the communication apparatus.

Figure 15:
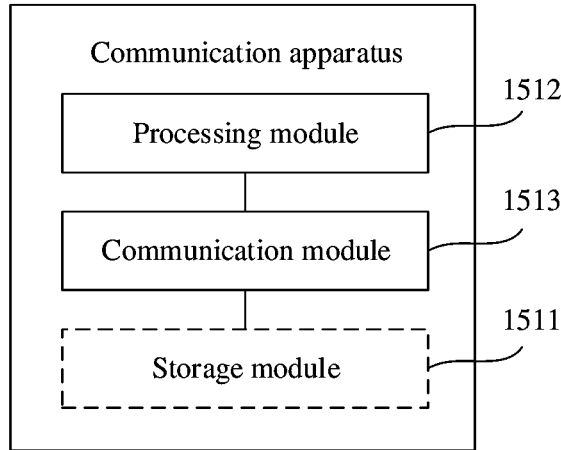
FIG. 15 is a schematic diagram of a structure of another communication apparatus according to an embodiment of this application.

When an integrated unit is used, FIG. 15 is a schematic diagram of a possible logical structure of the communication apparatus in the foregoing embodiments. The communication apparatus includes a processing module 1512 and a communication module 1513. The processing module 1512 is configured to control and manage actions of the communication apparatus. For example, the processing module 1512 is configured to perform an information/data processing step performed by the communication apparatus. The communication module 1513 is configured to support the communication apparatus in performing an information/data sending or receiving step.

In a possible embodiment, the communication apparatus may further include a storage module 1511, configured to store program code and data of the communication apparatus.

In an example, the communication apparatus is a data analytics network element, or a chip used in the data analytics network element. In this case, the communication module 1513 is configured to support the communication apparatus in performing the sending action performed by the data analytics network element in step 402 in FIG. 4 in the foregoing embodiment. The processing module 1512 is further configured to support the communication apparatus in performing step 401 in the foregoing embodiment.

In a possible embodiment, the communication module 1513 is further configured to support the communication apparatus in performing the receiving action performed by the data analytics network element in step 501 in the foregoing embodiment. The processing module 1512 is configured to support the communication apparatus in performing step 502 in the foregoing embodiment. The communication module 1513 is further configured to support the communication apparatus in performing the sending action performed by the data analytics network element in step 503 in the foregoing embodiment.

In an example, the communication apparatus is a data analytics network element, or a chip used in the data analytics network element. In this case, the communication module 1513 is configured to support the communication apparatus in performing the sending action performed by the data analytics network element in step 802 in FIG. 8 in the foregoing embodiment. The processing module 1512 is further configured to support the communication apparatus in performing step 801 in the foregoing embodiment.

In another example, the communication apparatus is a network management network element, or a chip used in the network management network element. In this case, the communication module 1513 is configured to support the communication apparatus in performing the receiving action performed by the network management network element in step 402 in FIG. 4 in the foregoing embodiment. The processing module 1512 is further configured to support the communication apparatus in performing step 403 in the foregoing embodiment. The communication module 1513 is configured to support the communication apparatus in performing the sending action performed by the network management network element in step 403 in FIG. 4 in the foregoing embodiment.

In a possible embodiment, the communication module 1513 is configured to support the communication apparatus in performing the receiving action performed by the network management network element in step 503 in the foregoing embodiment. The processing module 1512 is configured to support the communication apparatus in performing step 504, step 505, and step 506 in the foregoing embodiment.

In a possible embodiment, the communication module 1513 is configured to support the communication apparatus in performing the receiving action performed by the network management network element in step 603 in the foregoing embodiment. The processing module 1512 is configured to support the communication apparatus in performing step 604, step 605, and step 610 in the foregoing embodiment. The communication module 1513 is configured to support the communication apparatus in performing the receiving action performed by the network management network element in step 609 in the foregoing embodiment.

In a possible embodiment, the communication module 1513 is configured to support the communication apparatus in performing the receiving action performed by the network management network element in step 703 in the foregoing embodiment. The processing module 1512 is configured to support the communication apparatus in performing step 704, step 705, step 706, and step 707 in the foregoing embodiment. The communication module 1513 is configured to support the communication apparatus in performing the receiving action performed by the network management network element in step 708 in the foregoing embodiment.

In another example, the communication apparatus is an application function network element, or a chip used in the application function network element. In this case, the communication module 1513 is configured to support the communication apparatus in performing the receiving action performed by the application function network element in step 404 in the foregoing embodiment. The processing module 1512 is configured to support the communication apparatus in performing step 405 in the foregoing embodiment.

In a possible implementation, the processing module 1512 is further configured to support the communication apparatus in performing step 508, step 509, and step 510 in the foregoing embodiment. The communication module 1513 is configured to support the communication apparatus in performing the sending actions performed by the application function network element in step 511 and step 512 in the foregoing embodiment.

In a possible implementation, the processing module 1512 is further configured to support the communication apparatus in performing step 607, step 608, and step 611 in the foregoing embodiment. The communication module 1513 is configured to support the communication apparatus in performing the sending actions performed by the application function network element in step 612 and step 613 in the foregoing embodiment.

In still another example, the communication apparatus is an application function network element, or a chip used in the application function network element. In this case, the communication module 1513 is configured to support the communication apparatus in performing the receiving action performed by the application function network element in step 708 in the foregoing embodiment. The communication module 1513 is configured to support the communication apparatus in performing the sending actions performed by the application function network element in step 709 and step 710 in the foregoing embodiment.

In still another example, the communication apparatus is an application function network element, or a chip used in the application function network element. In this case, the processing module 1512 is configured to support the communication apparatus in performing the action performed by the application function network element in step 803 in the foregoing embodiment. The communication module 1513 is configured to support the communication apparatus in performing the sending action performed by the application function network element in step 804 in the foregoing embodiment.

In a possible implementation, the processing module 1512 is further configured to support the communication apparatus in performing step 806 in the foregoing embodiment. The communication module 1513 is configured to support the communication apparatus in performing the sending actions performed by the application function network element in step 807 and step 808 in the foregoing embodiment.

In still another example, the communication apparatus is a network management network element, or a chip used in the network management network element. In this case, the communication module 1513 is configured to support the communication apparatus in performing the receiving action performed by the network management network element in step 804 in the foregoing embodiment. The processing module 1512 is configured to support the communication apparatus in performing the action performed by the network management network element in step 805 in the foregoing embodiment.

The processing module 1512 may be a processor or a controller. For example, the processing module may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication module 1513 may be a transceiver, a transceiver circuit, a communication interface, or the like. The storage module 1511 may be a memory.

Figure 16:
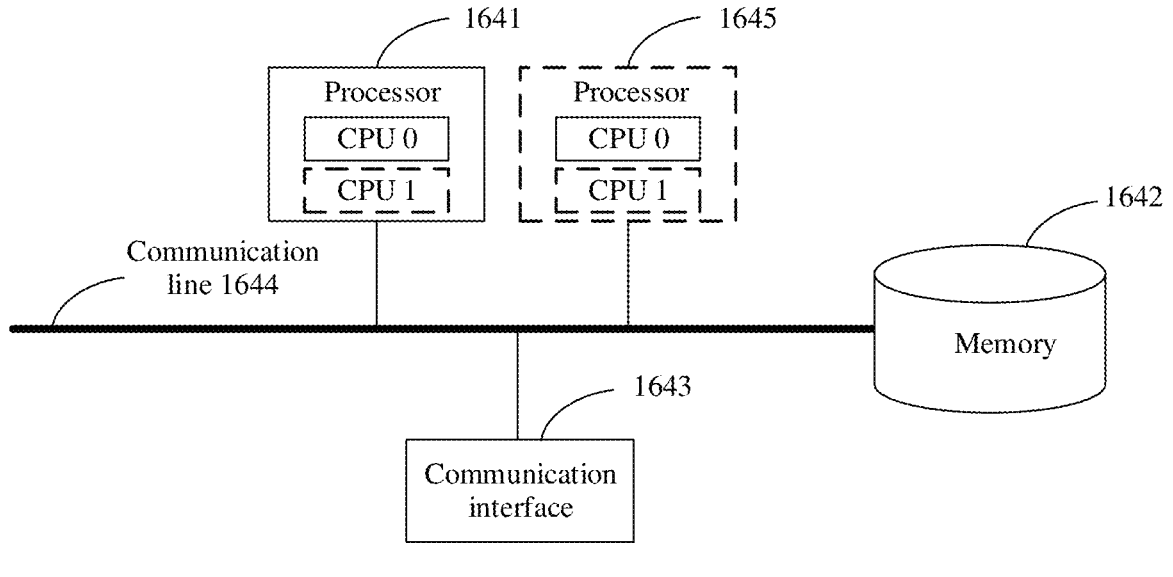
FIG. 16 is a schematic diagram of a structure of a communication device according to an embodiment of this application.

When the processing module 1512 is a processor 1641 or a processor 1645, the communication module 1513 is a communication interface 1643, and the storage module 1511 is a memory 1642, the communication apparatus in this application may be a communication device shown in FIG. 16.

FIG. 16 is a schematic diagram of a structure of the communication device according to an embodiment of this application. The communication device includes the processor 1641, the communication line 1644, and at least one communication interface (descriptions are provided merely by using an example in which the communication device includes the communication interface 1643 in FIG. 16).

Optionally, the communication device may further include the memory 1642.

The processor 1641 may be a general-purpose central processing unit (CPU), a microprocessor, an application-specific integrated circuit (ASIC), or one or more integrated circuits configured to control program execution of the solutions of this application.

The communication line 1644 may include a path for transmitting information between the foregoing components.

The communication interface 1643 is any apparatus such as a transceiver, and is configured to communicate with another device or a communication network such as the Ethernet, a radio access network (RAN), or a wireless local area network (WLAN).

The memory 1642 may be a read-only memory (ROM) or another type of static storage device that can store static information and instructions, or a random access memory (RAM) or another type of dynamic storage device that can store information and instructions. The memory may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible by a computer, but is not limited thereto. The memory may exist independently, and is connected to the processor through the communication line 1644. The memory may alternatively be integrated with the processor.

The memory 1642 is configured to store computer-executable instructions for performing the solutions in this application, and the processor 1641 controls execution. The processor 1641 is configured to execute the computer-executable instructions stored in the memory 1642, to implement the communication method provided in the foregoing embodiment of this application.

Optionally, the computer-executable instructions in this embodiment of this application may also be referred to as application program code. This is not specifically limited in this embodiment of this application.

During specific implementation, in an embodiment, the processor 1641 may include one or more CPUs, for example, a CPU 0 and a CPU 1 in FIG. 16.

During specific implementation, in an embodiment, the communication device may include a plurality of processors, for example, the processor 1641 and the processor 1645 in FIG. 16. Each of the processors may be a single-core (single-CPU) processor, or may be a multi-core (multi-CPU) processor. The processor herein may be one or more devices, circuits, and/or processing cores configured to process data (for example, computer program instructions).

In an example, the communication device is a data analytics network element, or a chip used in the data analytics network element. In this case, the communication interface 1643 is configured to support the communication device in performing the sending action performed by the data analytics network element in step 402 in FIG. 4 in the foregoing embodiment. The processor 1641 or the processor 1645 is further configured to support the communication device in performing step 401 in the foregoing embodiment.

In a possible embodiment, the communication interface 1643 is further configured to support the communication device in performing the receiving action performed by the data analytics network element in step 501 in the foregoing embodiment. The processor 1641 or the processor 1645 is configured to support the communication device in performing step 502 in the foregoing embodiment. The communication interface 1643 is further configured to support the communication device in performing the sending action performed by the data analytics network element in step 503 in the foregoing embodiment.

In an example, the communication device is a data analytics network element, or a chip used in the data analytics network element. In this case, the communication interface 1643 is configured to support the communication device in performing the sending action performed by the data analytics network element in step 802 in FIG. 8 in the foregoing embodiment. The processor 1641 or the processor 1645 is further configured to support the communication device in performing step 801 in the foregoing embodiment.

In another example, the communication device is a network management network element, or a chip used in the network management network element. In this case, the communication interface 1643 is configured to support the communication device in performing the receiving action performed by the network management network element in step 402 in FIG. 4 in the foregoing embodiment. The processor 1641 or the processor 1645 is further configured to support the communication device in performing step 403 in the foregoing embodiment. The communication interface 1643 is configured to support the communication device in performing the sending action performed by the network management network element in step 403 in FIG. 4 in the foregoing embodiment.

In a possible embodiment, the communication interface 1643 is configured to support the communication device in performing the receiving action performed by the network management network element in step 503 in the foregoing embodiment. The processor 1641 or the processor 1645 is configured to support the communication device in performing step 504, step 505, and step 506 in the foregoing embodiment.

In a possible embodiment, the communication interface 1643 is configured to support the communication device in performing the receiving action performed by the network management network element in step 603 in the foregoing embodiment. The processor 1641 or the processor 1645 is configured to support the communication device in performing step 604, step 605, and step 610 in the foregoing embodiments. The communication interface 1643 is configured to support the communication device in performing the receiving action performed by the network management network element in step 609 in the foregoing embodiment.

In a possible embodiment, the communication interface 1643 is configured to support the communication device in performing the receiving action performed by the network management network element in step 703 in the foregoing embodiment. The processor 1641 or the processor 1645 is configured to support the communication device in performing step 704, step 705, step 706, and step 707 in the foregoing embodiment. The communication interface 1643 is configured to support the communication device in performing the receiving action performed by the network management network element in step 708 in the foregoing embodiment.

In another example, the communication device is an application function network element, or a chip used in the application function network element. In this case, the communication interface 1643 is configured to support the communication device in performing the receiving action performed by the application function network element in step 404 in the foregoing embodiment. The processor 1641 or the processor 1645 is configured to support the communication device in performing step 405 in the foregoing embodiment.

In a possible implementation, the processor 1641 or the processor 1645 is further configured to support the communication device in performing step 508, step 509, and step 510 in the foregoing embodiments. The communication interface 1643 is configured to support the communication device in performing the sending actions performed by the application function network element in step 511 and step 512 in the foregoing embodiment.

In a possible implementation, the processor 1641 or the processor 1645 is further configured to support the communication device in performing step 607, step 608, and step 611 in the foregoing embodiment. The communication interface 1643 is configured to support the communication device in performing the sending actions performed by the application function network element in step 612 and step 613 in the foregoing embodiment.

In still another example, the communication device is an application function network element, or a chip used in the application function network element. In this case, the communication interface 1643 is configured to support the communication device in performing the receiving action performed by the application function network element in step 708 in the foregoing embodiment. The communication interface 1643 is configured to support the communication device in performing the sending actions performed by the application function network element in step 709 and step 710 in the foregoing embodiment.

In still another example, the communication device is an application function network element, or a chip used in the application function network element. In this case, the processor 1641 or the processor 1645 is configured to support the communication device in performing the action performed by the application function network element in step 803 in the foregoing embodiment. The communication interface 1643 is configured to support the communication device in performing the sending action performed by the application function network element in step 804 in the foregoing embodiment.

In a possible implementation, the processor 1641 or the processor 1645 is further configured to support the communication device in performing step 806 in the foregoing embodiment. The communication interface 1643 is configured to support the communication device in performing the sending actions performed by the application function network element in step 807 and step 808 in the foregoing embodiment.

In still another example, the communication device is a network management network element, or a chip used in the network management network element. In this case, the communication interface 1643 is configured to support the communication device in performing the receiving action performed by the network management network element in step 804 in the foregoing embodiment. The processor 1641 or the processor 1645 is configured to support the communication device in performing the action performed by the network management network element in step 805 in the foregoing embodiment.

Figure 17:
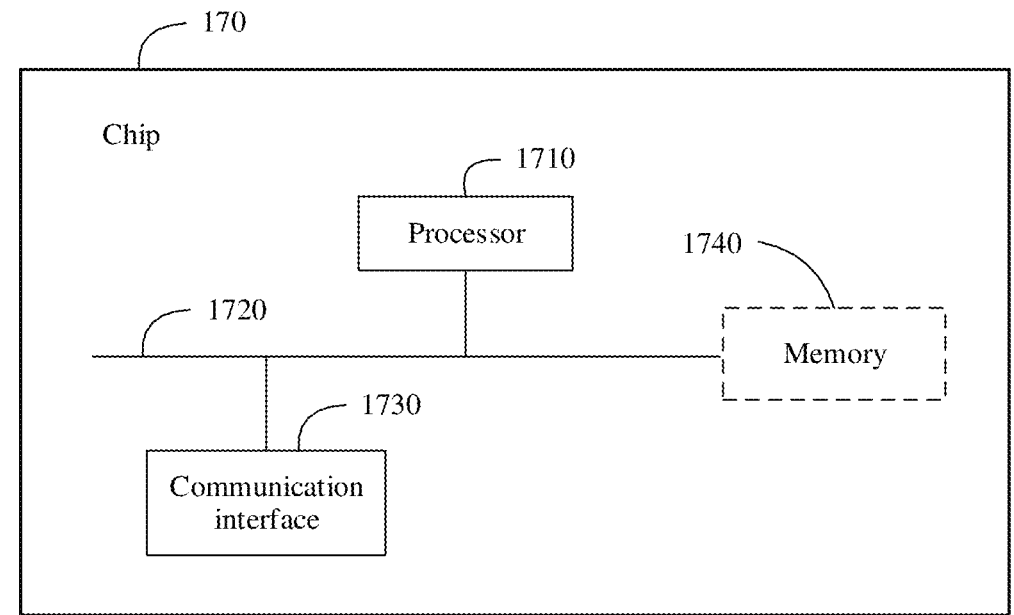
FIG. 17 is a schematic diagram of a structure of a chip according to an embodiment of this application.

FIG. 17 is a schematic diagram of a structure of a chip 170 according to an embodiment of this application. The chip 170 includes one or more (including two) processors 1710 and a communication interface 1730.

Optionally, the chip 170 further includes a memory 1740. The memory 1740 may include a read-only memory and a random access memory, and provide operation instructions and data for the processor 1710. A part of the memory 1740 may further include a non-volatile random access memory (NVRAM).

In some implementations, the memory 1740 stores the following elements: an executable module or a data structure, a subset thereof, or an extended set thereof.

In this embodiment of this application, the operation instructions stored in the memory 1740 (where the operation instructions may be stored in an operating system) are invoked to perform a corresponding operation.

In a possible implementation, structures of chips used in an application function network element, a data analytics network element, and a network management network element are similar, and different apparatuses may use different chips to implement respective functions.

The processor 1710 controls a processing operation of any one of the application function network element, the data analytics network element, and the network management network element. The processor 1710 may also be referred to as a central processing unit (CPU).

The memory 1740 may include a read-only memory and a random access memory, and provide instructions and data to the processor 1710. The part of the memory 1740 may further include the NVRAM. For example, in an application, the memory 1710, the communication interface 1730, and the memory 1740 are coupled together by using a bus system 1720, where the bus system 1720 may further include a power bus, a control bus, a status signal bus, and the like in addition to a data bus. However, for clear descriptions, various buses are marked as the bus system 1720 in FIG. 17.

The methods disclosed in embodiments of this application may be applied to the processor 1710 or may be implemented by the processor 1710. The processor 1710 may be an integrated circuit chip and has a signal processing capability. In an implementation process, steps in the foregoing methods may be completed with an integrated logic circuit of hardware in the processor 1710 or instructions in a form of software. The processor 1710 may be a general-purpose processor, a digital signal processor (DSP), an ASIC, a field-programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished with a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1740. The processor 1710 reads information from the memory 1740, and completes the steps of the foregoing methods in combination with hardware of the processor 1710.

In a possible implementation, the communication interface 1730 is configured to perform the receiving and sending steps of the data analytics network element in the embodiments shown in FIG. 4 to FIG. 8. The processor 1710 is configured to perform the processing steps of the data analytics network element in the embodiments shown in FIG. 4 to FIG. 8.

In a possible implementation, the communication interface 1730 is configured to perform the receiving and sending steps of the application function network element in the embodiments shown in FIG. 4 to FIG. 8. The processor 1710 is configured to perform the processing steps of the application function network element in the embodiments shown in FIG. 4 to FIG. 8.

In a possible implementation, the communication interface 1730 is configured to perform the receiving and sending steps of the network management network element in the embodiments shown in FIG. 4 to FIG. 8. The processor 1710 is configured to perform the processing steps of the network management network element in the embodiments shown in FIG. 4 to FIG. 8.

The communication unit may be a communication interface of the apparatus, and is configured to receive a signal from another apparatus. For example, when the apparatus is implemented as a chip, the transceiver unit is a communication interface used by the chip to receive a signal from or send a signal to another chip or apparatus.

According to an aspect, a computer-readable storage medium is provided. The computer-readable storage medium stores instructions. When the instructions are run, functions performed by the data analytics network element in FIG. 4 to FIG. 8 are implemented.

According to an aspect, a computer-readable storage medium is provided. The computer-readable storage medium stores instructions. When the instructions are run, functions performed by the application function network element in FIG. 4 to FIG. 8 are implemented.

According to an aspect, a computer-readable storage medium is provided. The computer-readable storage medium stores instructions. When the instructions are run, functions performed by the network management network element in FIG. 4 to FIG. 8 are implemented.

According to another aspect, a computer program product including instructions is provided. The computer program product includes the instructions. When the instructions are run, functions performed by the data analytics network element in FIG. 4 to FIG. 8 are implemented.

According to another aspect, a computer program product including instructions is provided. The computer program product includes the instructions. When the instructions are run, functions performed by the application function network element in FIG. 4 to FIG. 8 are implemented.

According to another aspect, a computer program product including instructions is provided. The computer program product includes the instructions. When the instructions are run, functions performed by the network management network element in FIG. 4 to FIG. 8 are implemented.

According to an aspect, a chip is provided. The chip is used in a network management network element. The chip includes at least one processor and a communication interface. The communication interface is coupled to the at least one processor. The processor is configured to run instructions, to implement functions performed by the network management network element in FIG. 4 to FIG. 8.

According to another aspect, a chip is provided. The chip is used in a data analytics network element. The chip includes at least one processor and a communication interface. The communication interface is coupled to the at least one processor. The processor is configured to run instructions, to implement functions performed by the data analytics network element in FIG. 4 to FIG. 8.

According to another aspect, a chip is provided. The chip is used in a data analytics network element. The chip includes at least one processor and a communication interface. The communication interface is coupled to the at least one processor. The processor is configured to run instructions, to implement functions performed by the application function network element in FIG. 4 to FIG. 8.

An embodiment of this application provides a communication system. The communication system includes a network management network element, a data analytics network element, and an application function network element. The network management network element is configured to perform functions performed by the network management network element in the embodiments described in FIG. 4 to FIG. 7B. The data analytics network element is configured to perform steps performed by the data analytics network element in the embodiments described in FIG. 4 to FIG. 7B. The application function network element is configured to perform steps performed by the application function network element in the embodiments described in FIG. 4 to FIG. 7B.

An embodiment of this application provides a communication system. The communication system includes a network management network element, a data analytics network element, and an application function network element. The network management network element is configured to perform functions performed by the network management network element in the embodiments described in FIG. 8. The data analytics network element is configured to perform steps performed by the data analytics network element in the embodiments described in FIG. 8. The application function network element is configured to perform steps performed by the application function network element in the embodiments described in FIG. 8.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, the procedure or functions according to embodiments of this application are completely or partially generated. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Although this application is described with reference to embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
receiving, by a network management network element from a data analytics network element, first information of an application being accessed by a terminal located in a first area, wherein the terminal accesses the application in a first application server located in a second area via a first user plane function network element where the terminal is not located in the second area and wherein the first information comprises a quantity of access times and/or service experience for the application;
determining, by the network management network element based on the first information, to create, within the first area, a second user plane function network element serving the application;
creating by the network management network element, within the first area, the second user plane function network element serving the application;
creating a second application server in the first area to serve the application;
sending, by the network management network element, a first message to an application function network element, wherein the first message is usable to indicate that the network management network element triggers creation, within the first area, of the second user plane function network element for accessing the application in the second application server in the first area; and
based on the first information, offloading, by the network management network element, a service flow of the terminal to change accessing the application by the terminal via the first application server in the second area to accessing the application by the terminal via the second application server in the first area.

2. The method according to claim 1, wherein before the sending, by the network management network element, the first message to the application function network element, the method further comprises:
triggering, by the network management network element, an operation of creating, within the first area, the second user plane function network element serving the application.

3. The method according to claim 1, wherein after the sending, by the network management network element, the first message to the application function network element, the method further comprises:
receiving, by the network management network element, an acknowledgment message from the application function network element, wherein the acknowledgment message is usable to indicate that the network management network element is allowed to create, within the first area, the second user plane function network element serving the application, or the network management network element is allowed to create, within the first area, a second application server serving the application; and
triggering, by the network management network element, an operation of creating the second user plane function network element within the first area.

4. The method according to claim 1, wherein the determining, by the network management network element based on the first information, to create, within the first area, the second user plane function network element serving the application comprises:
determining, by the network management network element based on the first information, that the quantity of access times of the application is greater than or equal to a first threshold and/or the service experience of the application is less than or equal to a second threshold; and
determining, by the network management network element, to create, within the first area, the second user plane function network element serving the application.

5. The method according to claim 1, wherein the method further comprises:
triggering, by the network management network element based on the first information, an operation of creating, within the first area, a second application server serving the application.

6. The method according to claim 1, wherein
the first information is information about the application on the first application server and that is accessed from the second area by the terminal in the first area via the first user plane function network element; and
the second user plane function network element and/or the second application server are/is created within the first area, and the first area and the second area are different areas.

7. The method according to claim 1, wherein the method further comprises:
sending, by the network management network element, a first request to the data analytics network element, wherein the first request is for requesting the first information of the application that is accessed by the terminal located in the first area.

8. The method according to claim 7, wherein the first request comprises one or more of the following information: an application identifier of the application and information about a third area, wherein the first area is a sub-area of the third area, or the first area is the third area.

9. The method according to claim 7, wherein the first request further comprises information about a first time period, wherein the first information comprises the quantity of access times and/or service experience for the application in a second time period, and the second time period is a sub-time period of the first time period, or the second time period and the first time period are a same time period.

10. A communication apparatus, comprising:

a memory storing computer-readable instructions; and at least one processor connected to the memory, wherein the at least one processor is configured to execute the computer-readable instructions stored in the memory, to:

receive, from a data analytics network element, first information about an application being accessed by a terminal located in a first area, wherein the terminal accesses the application in a first application server located in a second area where the terminal is not located via a first user plane function network element located in the second area, and wherein the first information comprises a quantity of access times and/or service experience for the application;

determine, based on the first information, to create, within the first area, a second user plane function network element serving the application;

create, within the first area, the second user plane function network element serving the application;

create a second application server in the first area to serve the application;

send a first message to an application function network element, wherein the first message is usable to indicate that the network management network element triggers creation, within the first area, of the second user plane function network element for accessing the application in the second application server in the first area; and based on the first information, offload, by the network management network element, a service flow of the terminal to change accessing the application by the terminal via the first application server in the second area to accessing the application by the terminal via the second application server in the first area.

11. The communication apparatus according to claim 10, wherein the processor is further configured to, before the sending the first message to the application function network element, trigger an operation of creating, within the first area, the second user plane function network element serving the application.

12. The communication apparatus according to claim 10, wherein the processor is further configured to, after the sending the first message to the application function network element, receive an acknowledgment message from the application function network element, wherein the acknowledgment message is usable to indicate that the network management network element is allowed to create, within the first area, the second user plane function network element serving the application, or the network management network element is allowed to create, within the first area, the second application server serving the application, and to trigger an operation of creating the second user plane function network element within the first area.

13. The communication apparatus according to claim 10, wherein the processor is further configured to determine, based on the first information, to create, within the first area, the second user plane function network element serving the application by determining, based on the first information, that the quantity of access times is greater than or equal to a first threshold and/or the service experience is less than or equal to a second threshold, and determining to create, within the first area, the second user plane function network element serving the application.

14. The communication apparatus according to claim 10, wherein the processor is further configured to:

trigger, based on the first information, an operation of creating, within the first area, the second application server serving the application.

15. The communication apparatus according to claim 10, wherein:

the first information is information about the application that is created on a second application server and that is accessed from the first area via the second user plane function network element; and the second user plane function network element and/or the second application server are/is created within the first area, and the first area and the second area are different areas.

16. The communication apparatus according to claim 10, wherein the processor is further configured to send a first request to the data analytics network element, wherein the first request is for requesting the first information about the application that is accessed by the terminal located in the first area.

17. The communication apparatus according to claim 16, wherein the first request comprises one or more of the following information: an application identifier of the application and information about a third area, wherein the first area is a sub-area of the third area, or the first area is the third area.

18. The communication apparatus according to claim 16, wherein the first request further comprises information about a first time period, wherein the first information comprises the quantity of access times and/or service experience for the application in a second time period, and the second time period is a sub-time period of the first time period, or the second time period and the first time period are a same time period.

19. A communication system, comprising:

a network management network element; and an application function network element;

wherein the network management network element is configured to receive, from a data analytics network element, first information about an application being accessed by a terminal located in a first area, wherein the terminal accesses the application in a first application server located in a second area via a first user plane function network element where the terminal is not located in the second area, and wherein the first information comprises a quantity of access times and/or service experience for the application, determine, by the network management network element based on the first information, to create, within the first area, a second user plane function network element serving the application, create by the network management network element, within the first area, the second user plane function network element serving the application, create a second application server in the first area to serve the application, and send, by the network management network element, a first message to an application function network element, wherein the first message is usable to indicate that the network management network element triggers creation, within the first 5 area, of the second user plane function network element for accessing the application in the second application server in the first area; and wherein the network management network element, based on the first information, is configured to offload a 10 service flow of the terminal to change accessing the application by the terminal via the first application server in the second area to accessing the application by the terminal via the second application server in the first area. 15

\* \* \* \* \*